Nov. 30, 1965 R. A. CLARK, JR 3,221,101

TELEPHONE SYSTEMS AND THE LIKE

Filed Feb. 20, 1961 21 Sheets-Sheet 1

Inventor:
Robert A. Clark, Jr.,
by Geo. B. Kauwing Jr. Atty.

Key: —— Shows operation which also includes
- - - which designates Operator Controlled Line used to discontinue special signal.

Block Diagram:
Call placed through Exchange by Exchange Operator using present facilities in part.

Inventor:
Robert A. Clark, Jr.,
by [signature]
Atty.

Nov. 30, 1965 R. A. CLARK, JR 3,221,101

TELEPHONE SYSTEMS AND THE LIKE

Filed Feb. 20, 1961 21 Sheets-Sheet 3

Inventor:
Robert A. Clark, Jr.,
by [signature] Atty.

TELEPHONE SYSTEMS AND THE LIKE

Filed Feb. 20, 1961 21 Sheets-Sheet 4

Inventor: Robert A. Clark, Jr.,
by [signature] Atty.

See Figure 3.

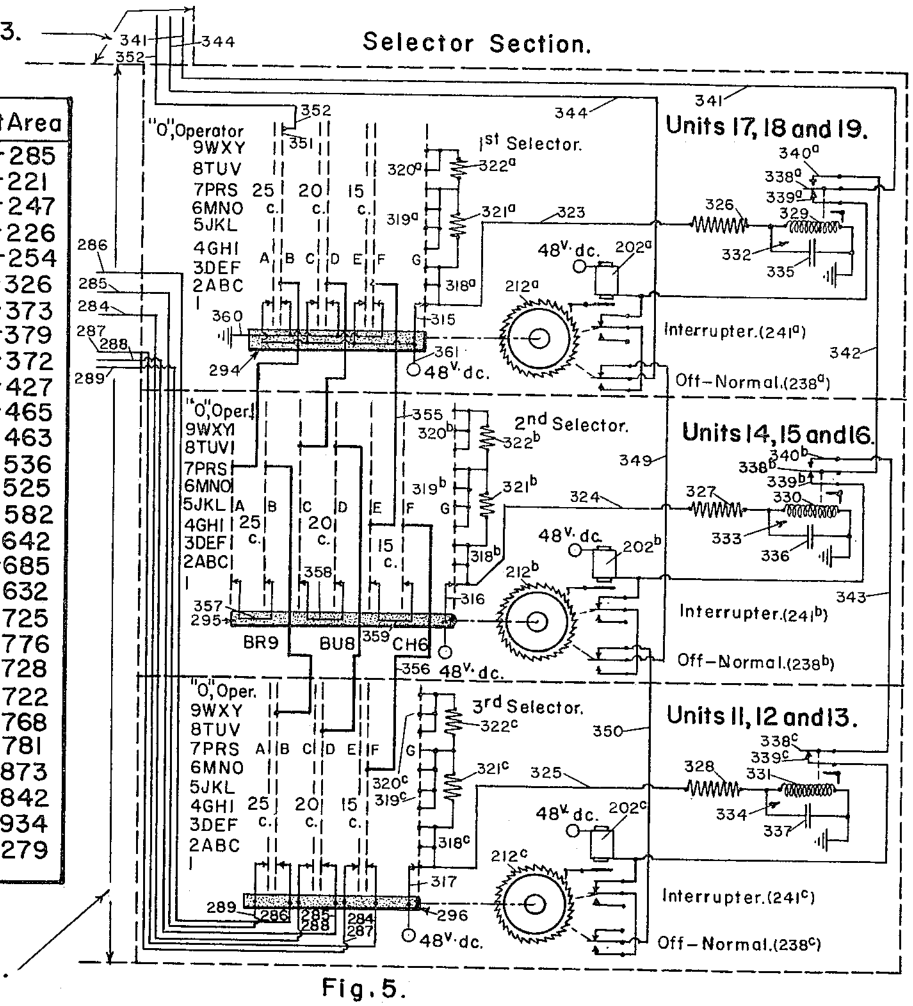

Fig. 5.

See Figure 4.

Strapping Schedule.

| 10 Cent Area X | 15 Cent Area | 20 Cent Area | 25 Cent Area |
|---|---|---|---|
| AM2-262 | ARI-271 | AR6-276 | AT5-285 |
| AU7-287 | AV2-282 | AV6-286 | BAI-221 |
| BE3-233 | BE7-237 | BI 2-242 | BI 7-247 |
| BO3-263 | BO8-268 | BUI-281 | CA6-226 |
| CA8-228 | CE6-236 | CH3-243 | CL4-254 |
| COI-261 | CO7-267 | CR7-277 | DA6-326 |
| DE2-332 | DE7-337 | DO3-363 | DR3-373 |
| EA7-327 | EO4-334 | ES5-375 | ES9-379 |
| EV4-384 | FA4-324 | FI 6-346 | FR2-372 |
| FR6-376 | GR6-476 | HAI-421 | HA7-427 |
| HE4-434 | HE6-436 | HI 5-445 | HO5-465 |
| HU3-483 | HU9-489 | HY3-493 | IN 3-463 |
| IR 8-478 | JU3-583 | JU8-588 | KE6-536 |
| KE 8-538 | KI 5-545 | LA2-522 | LA5-525 |
| LI 8-548 | LI 9-549 | LOI-561 | LU2-582 |
| LU 5-585 | MA6-626 | ME7-637 | MI 2-642 |
| MI 3-643 | MO4-664 | MO6-666 | MU5-685 |
| MU4-684 | NA2-622 | NA5-625 | NE2-632 |
| NE8-638 | NO7-667 | OA4-624 | PA5-725 |
| PE6-736 | PL2-752 | PO7-767 | PR6-776 |
| PR9-779 | PU5-785 | RA3-723 | RA8-728 |
| REI-731 | RE7-737 | SAI-721 | SA2-722 |
| SE3-733 | SE8-738 | SH3-743 | SO8-768 |
| SP4-774 | SP7-777 | ST2-782 | STI-781 |
| SU4-784 | SU7-787 | TA9-829 | TR3-873 |
| TR4-874 | UN8-868 | VA6-826 | VI 2-842 |
| VI 7-847 | WA4-924 | WA8-928 | WE4-934 |
| WE5-935 | WH3-943 | WH5-945 | BR9-279 |
| | CH6-246 | BU8-288 | |

Note: X designates no strapping used.

Fig. 5A

Inventor:
Robert A. Clark, Jr., by [signature] Atty.

Inventor:
Robert A. Clark, Jr.,
by [signature] Atty.

Inventor:
Robert A. Clark, Jr.,
by [signature]
Atty.

Inventor:
Robert A. Clark, Jr.,
by [signature]
Atty.

Inventor:
Robert A. Clark, Jr.,
by [signature]
Atty.

TELEPHONE SYSTEMS AND THE LIKE

Filed Feb. 20, 1961 21 Sheets-Sheet 10

Inventor:
Robert A. Clark, Jr.,
by [signature]
Atty.

Inventor:
Robert A. Clark, Jr.,
by
Atty.

Inventor:
Robert A. Clark, Jr.,
by [signature]
Atty.

Nov. 30, 1965 R. A. CLARK, JR 3,221,101

TELEPHONE SYSTEMS AND THE LIKE

Filed Feb. 20, 1961 21 Sheets-Sheet 13

Inventor:
Robert A. Clark, Jr.,
by [signature] Atty.

Inventor:
Robert A. Clark, Jr.,
by [signature]
Atty.

Nov. 30, 1965 R. A. CLARK, JR 3,221,101
TELEPHONE SYSTEMS AND THE LIKE
Filed Feb. 20, 1961 21 Sheets-Sheet 15

Inventor:
Robert A.Clark,Jr.,
by [signature]
Atty.

Inventor:
Robert A. Clark, Jr.,
by [signature] Atty.

Inventor:
Robert A. Clark, Jr.,
by [signature]
Atty.

Nov. 30, 1965 R. A. CLARK, JR 3,221,101

TELEPHONE SYSTEMS AND THE LIKE

Filed Feb. 20, 1961 21 Sheets-Sheet 18

Inventor:
Robert A. Clark, Jr.,
by [signature] Atty.

Inventor:
Robert A. Clark, Jr.,
by [signature] Atty.

Inventor:
Robert A. Clark, Jr.,
by [signature]
Atty.

Inventor:
Robert A. Clark, Jr.,
by Chas. L. Lovercheck
Atty.

United States Patent Office 3,221,101
Patented Nov. 30, 1965

3,221,101

TELEPHONE SYSTEMS AND THE LIKE

Robert A. Clark, Jr., River Forest, Ill. (% Communication Equipment & Engr. Co., 5646 W. Race St., Chicago, Ill.)

Filed Feb. 20, 1961, Ser. No. 99,976
8 Claims. (Cl. 179—6.31)

INDEX

| | Column |
|---|---|
| Preamble; Objectives | 2 |
| Timer | 3 |
| Pulser unit | 4 |
| Comparison of pre-paid amount with amount of base-pay charge to called zone | 5 |
| Operator intervened call | 6 |
| Comparator equipment | 6 |
| Brief description of the drawings | 7 |
| General | 11 |
| Pulser unit with pulse lock-out | 11 |
| Stromberg-Carlson embodiment | 14 |
| North Electric Company embodiment | 14 |
| Timer unit-general construction | 14 |
| Timer-internal connections | 23 |
| Coin counting and control equipment | 25 |
| Comparison relays and functions | 26 |
| Protection against false signal from relay of lower pre-pay zone than the zone of pre-pay | 27 |
| The zone selector stepping switches | 28 |
| Sequential delivery of groups of pulses to the selectors in sequence | 31 |
| Pulsing the selectors to starting positions | 32 |
| Ten cent call produces ground connection | 33 |
| The stepped positions of the selectors must produce a circuitry matching the code identification of the station being called | 34 |
| Strapping between selectors and functions thereof | 35 |
| Non-equality of pre-paid amount with dialed positions of selectors grounds line **364** | 36 |
| Direct result of grounding of line **364** | 36 |
| Examples of strapping between selectors and ancillary equipment | 37 |
| Grounding of line **364** also resets units **6** and **7** | 38 |
| Ten cent deposit removes short from across pulsing contacts of dialing unit | 39 |
| Pulsing circuitry | 39 |
| Ten cent call | 40 |
| Call not answered (not completed) calling party restores his receiver to its hook | 40 |
| Called party takes his receiver from its hook. Call completed | 41 |
| Call terminated. Called party hangs his receiver on its hook | 41 |
| Pre-pay zone operations; general statement | 42 |
| Pre-pay zone subsequent operations | 43 |
| Original over-payment beyond base charge to called zone | 43 |
| Delivery of pulses to timer for added time payments | 44 |
| Control of timer motor operations | 45 |
| Operation of clutch of timer drive | 45 |
| Operations of 'intervened' call | 46 |
| Coin denomination signals | 47 |
| Coin return or collect operations | 48 |
| Operator call to calling party in case of deficiency of prepayment | 49 |
| Additional functions, including additional pay during course of conversation with called party | 49 |
| Cutoff signal from timer prevents further conversation between calling party and called station, and terminates connections | 50 |

*Preamble * * * objectives*

This invention relates to improvements in plural zone, time-control, pre-pay telephone systems, and the like. The improvements hereinafter disclosed have been devised particularly with reference to dial type calling systems, and/or to systems which include time measuring units for registering and indicating the elapsed time of the call after the call is completed, with provision for producing a warning signal at a prescribed interval before completion of the time for which pay has been made; and with further provision to enable the calling party to make further prepayment for extra or overtime, with corresponding extension of the time at which cutoff of the connection will be produced.

Briefly stated the present invention comprises a self-contained pre-pay telephone station at which calls to conventional receiving telephones located within a plurality of zones around the calling station may be directly dialed by the calling party upon making prepay at such calling station in amount at least equal to the base charge for a call to a receiver included in one of such pre-pay zones, the base pay amounts for the calls from such pre-pay station to receivers in the different zones differing from each other.

In connection with the foregoing objectives it is a further prime object of the invention to design and produce sending or calling station equipment incorporating such objectives, and of characteristics such that such calling station equipment may be used in connection with conventional exchange equipment, and substantially or wholly without need of any changes in such exchange equipment. Thereby the features of the present invention may be incorporated into telephone systems of the pre-pay dial calling type, or other systems, by mere substitution of the herein disclosed calling station equipment in place of all or a portion of the calling station equipment presently in conventional use.

Specifically, it is a further object of the present invention to provide calling station equipment designed and constructed for use in calling stations from which pre-pay calls are to be made to called parties within what may be termed "pre-pay charge local zones," being zone areas distant from the calling station an amount such that the charges for "base time" calls exceed the usual "local" call charge (e.g., ten cents); but not so distant from the calling station as to be termed "long distance" calls, within the conventionally understood meaning of that term. It is here noted, however, that the present calling station equipment is such that, when desired, a call to any long distance station, as conventionally termed, may be made from such calling station, by the intervention of the services of the operator at the exchange through which such calling station operates. In the case of such a long distance call, the exchange operator is called through use of the present calling station equipment, and is given instructions concerning the identity or name of the person to be called, and the location of such person (in conventional manner); and the operator at the exchange of the calling station informs the calling party of the charge for base time of the desired call; which charge amount can then be prepaid by the calling party at the calling station of the presently disclosed equipment. Provision is also made for informing the exchange operator as to the denominations and numbers of the pre-pay coins thus prepaid by the calling party. When the proper total amount of prepay has been made the exchange operator may complete such long distance call. Provision is also made for giving the warning signal a predetermined time interval prior to completion of the interval for which such long distance prepay has been made, so that, if desired, the calling party may make further deposit of money needed for an extension of the total called time.

In connection with the foregoing objectives it is a further object to make provision for automatically comparing the total value of coins inserted into the coin counting and denomination determining equipment, with the amount of the base charge for the call then being made. Then, if at the proper operation in the calling sequence a sufficient amount (in value) of the coins has not been inserted into the coin receiving mechanism, to equal the base charge (or exceed such charge), the inserted coins will be returned to the calling party, and the circuitry will not be completed. If, on the other hand a sufficient amount of coins (in value) has been inserted to match the base charge for the call, such circuitry may be conditioned for completion by a later operation. If the call is completed by answer of the called party the timer which comprises a portion of the present equipment, will commence to count time against such call, and such time count will then proceed. At a predetermined interval prior to expiration of the base time for which prepay has been made, a "warning signal" will be given to the calling party. Such warning signal may then be followed by insertion of further coins corresponding to further or extension time, measured after lapse of the base time for which prepay was originally made. Such warning signals will also be given prior to completion of the extension times for a series of additional pre-pay operations, up to the full capacity of the timing equipment to function. For example, if the base time is five minutes, a warning signal will be given forty-five seconds prior to expiration of the base time of five minutes; and further warning signals will in like manner be given, each at such interval prior to expiration of the total time for which prepayment has been made, including such additional pre-pay amounts. The maximum total time counting ability, is for example, and as shown on the equipment presently to be described in full detail, thirty-five minutes.

*Timer*

In connection with the foregoing features it is an object to provide a timer of such construction and characteristics that it may correctly and accurately serve the several base charge areas or zones referred to. In this connection the timer construction hereinafter described in full detail includes a time count element which operates, when properly signalled, to commence time count and continue such time count at a uniform rate, and to advance a contact carrying element at such uniform rate, during the time counting operation. Such contact carrying element carries contacts corresponding to the fifteen cent zone, the twenty cent zone, and the twenty-five cent zone. Corresponding to such so-carried and movable contacts which thus move at uniform rate during the time counting operation, there is a set of stationary contacts corresponding to each of such three zones, and which stationary contacts are regularly and successively engaged by the corresponding movable contacts, for signal producing or circuit conditioning operations. When, under the stated example of base charge, and base time, such base time is five minutes, it is evident that a base prepay of twenty-five cents corresponds to time cost of five cents per minute; that a base prepay of twenty cents corresponds to time cost of four cents per minute; and that a base prepay of fifteen cents corresponds to time cost of three cents per minute. Inversely, each added nickel of prepay (for excess time), corresponds to an added minute of prepaid time for the twenty-five cent zone; each added nickel corresponds to an addition of one and one-fourth minutes of pre-paid time for the twenty-cent zone; and that each added nickel corresponds to an addition of one and two-thirds minutes of pre-paid time for the fifteen cent zone.

Accordingly, the time spacings of the various groups of stationary contacts of the timing unit are located one minute apart (for the twenty-five cent zone called stations); and are located one and one-quarter minutes apart (for the twenty cent zone called stations); and are located one and two-thirds minutes apart (for the fifteen cent zone called stations). Correspondingly, the maximum pre-pay provision for the twenty-five cent zone called stations, is $1.75; the maximum provision for the twenty cent zone called stations, is $1.40; and the maximum provision for the fifteen cent zone called stations, is $1.05. These stated values and time intervals, are of course given merely by way of example.

It is here noted that the timing unit thus briefly defined, makes provision for addition of time units (for the several base pre-pay zones), corresponding to added amounts of prepay or uniform value (for example, nickels). Thus, the unit so far referred to operates on the basic principles of added amounts of pre-paid time (excess), for the several zones, corresponding to equal added money values, no matter which zone contains the called station. I also contemplate the use, in my present equipment, of timing units operating on the principle of varying amounts of added money (prepay) for equal added pre-pay time values. Thus, on the specification of five cents/min. for the twenty-five cent zone, and four cents/min. for the twenty cent zone, and three cents/min. for the fifteen cent zone, the timing unit may be provided with stationary contacts spaced at five minute intervals of movement of the movable contacts, for all three of the suggested zones.

*Pulser unit*

The equipment herein disclosed embodies a caller operated pulsing unit, conveniently of conventional form, but modified to make possible the calling of the exchange operator by a special signal, to enable the caller to request the exchange operator to intervene in the calling operation. I have previously referred to such a call to the exchange operator to request such operator to place a long distance call. When the pulsing unit includes ten numerical digital positions, 1, 2, 3, . . . 9, and 0, I reserve one of such positions (e.g., the 0 position) for delivery of the signal to the exchange operator to call her attention for the placement of such intervening call. Normally the equipment is so incorporated into the present circuitry, and the stations included in the several zones, are so designated (e.g., JU3, or ME7, or PA5), that such 0 is not used in any of such designations. Such 0 is then reserved for use in the calling of the exchange operator. The pulsing unit is then provided with means, additional to the conventional elements thereof, whereby, when the pulsing unit is dialed full over to the 0 position, without prior dialing, a special switch element is shifted to position such as to bridge or short circuit the pulsing contacts of such dial unit, so that the returning movement of the dialing element to its normal position will not produce pulses on such operation. Additionally, the circuitry is such that, under these conditions, the exchange operator will be called to receive the instructions from the caller, to enable such operator to make the call from such exchange. The modified pulsing unit is also so arranged, as respects such means which is additional to the conventional elements thereof, that when such returning movement of the dialing element is completed to its normal position, such bridging operation is discontinued, to place such pulsing elements in their normal condition, the exchange operator having been thus called. This will be further expained hereinafter. By this arrangement the exchange operator is then enabled to proceed with her intervening operations, to call the desired party under long distance operation.

It will presently appear that such modification of the dial pulse unit when calling the operator to intervene, is desirable for the following reasons: When a local call is to be made requiring deposit of the conventional charge for such call (e.g. ten cents) provision must be made for dialing such local call after the payment has been made. In the present equipment provision has been made for conditioning the dialing circuitry to enable such local call to be made after such deposit.

*Comparison of pre-paid amount with amount of base charge to called zone*

When such calling party dials his dial unit to produce the pulses required corresponding to the number of the called party, such number lies in or is included in one of the zones for which provision has been made in such calling party's station equipment. The base charge which such calling party must prepay in order to secure a completed circuitry to the desired called party depends on which zone includes such called party's receiver. The exchange to which the called party's receiver is connected is identified by the first three numbers or letters of such called party's number. Such called party's exchange is included in one of the pay zones (15 cent, 20 cent, or 25 cent). The calling party may be advised as to the amount of the base pay to each zone in any convenient manner. For example, the base pay to each zone may be posted near the dialing unit, and the identifying letters or numerals of the exchanges within each zone, may also be posted near such dialing unit for ready examination by the calling party. Such information may be in the form of a tabulation of the type shown in FIGURE 5A. It is necessary to provide, in the present equipment, means to compare the total amount of money inserted into the pre-pay equipment, with the base charge for the minimum time value of such zone (e.g., twenty-five cents, or twenty cents, or fifteen cents, as the case may be).

I have provided a relay corresponding to each of the three zones served by the equipment of the calling station. Upon deposit of money in amount equal to or more than the base pay to the zone which includes the called station, the relay for the base pay amount to such zone is set. I have also made provision for producing response of suitable equipment according to the three successive digits which were first dialed by the calling party and which three digits identify the zone which includes the receiver of the called party, to bring into proper functioning a circuitry to the relay which corresponds to the fifteen cent, or the twenty cent, or the twenty-five cent base call. Such circuitry, produces a comparison of the signal delivered by the coin receiving equipment, with the signal delivered by the zone number which corresponds to the dialed first three digits. By such comparison a determination is made as to whether or not there has been inserted into such coin receiving equipment enough money to pay the pre-pay base amount for the zone which contains the called station.

In case the amount of coins previously inserted into the coin receiving equipment is not sufficient to correspond to the base amount prescribed for such zone, a signal is delivered to such coin equipment to return the inserted coins and at the same time to discontinue the signalling operations from the dial unit. On the contrary, if the amount of such so-inserted coins is equal to or more than the prescribed pre-pay amount for such zone the operation may proceed to the next stage normally produced by the continued dialing operation. Such next stage comprises the signalling of the digital number of the called station.

At this point it is noted that the pulses thus delivered by the dialing operation are communicated not only to the equipment so far referred to in the calling station but also to the equipment provided in the exchange which serves such calling station. This is true in any case as respects the pulses corresponding to the first three digits, being those which identify the exchange and the zone of the called station. After such first three digits have been pulsed, and on the assumption that the prescribed base pre-pay amount has been inserted into the coin receiving equipment, further pulsing of the dial unit of the calling station produces groups of pulses corresponding to the four digits of the called number. These groups of pulses are in any case communicated to the equipment of the calling exchange of the calling party to produce the calling of the desired number. It will be understood that the pulsing of the first three exchange identifying groups of pulses has actuated the corresponding equipment of the exchange of the calling station, so that the pulsing of the four additional groups of pulses corresponding to the four additional numbers of the called station serves to deliver corresponding pulses to the exchange of the called station, being the pulses corresponding to the number of the called station or called party.

*Operator intervened call*

Referring again to the feature of provision to enable the exchange operator to make the call for the calling party, by the operation of dialing once completely to the 0 dial position, the following features are deserving of further and additional explanation:

Having called the exchange operator, and supplied the exchange operator with data concerning name and location of the party to be called such operator will inform the calling party stating the charge for such intervened call, usually long distance. Upon the operation of the calling party comprising insertion of the pre-pay amount, the exchange operator will receive signals corresponding to the several coins inserted into the coin receiving equipment, as such insertions are made. Such signals will be of characteristic sound values, corresponding to the denominations of the coins inserted into the coin receiving equipment, one such sound value corresponding to each such coin insertion. When the proper numbers and denominations of the coins have been thus inserted, the exchange operator will proceed to establish the desired long distance connection, and call the desired party. When such party answers the exchange operator may pass a signal to the equipment of the calling station, to inform the calling party to proceed with the call. During such call the timing unit will function to time such long distance call, and to pass a warning signal prior to expiration of the prepaid time interval. If further money is then inserted into the coin receiving equipment prior to expiration of the previously paid for time interval, that interval will be correspondingly extended. At the expiration of the time for which all payment has been made, the coin receiving equipment will function to collect the coins. If, on the other hand, the call is not completed, all nonused coins will be returned to the calling party; and in any case the returning of the receiver at the calling station to its hook with corresponding shift of the hook contacts, the prepaid coins will be returned to the calling party, or will be collected, depending upon noncompletion or completion of the call as intended.

*Comparator equipment*

Referring again to the feature of comparing the value of inserted coins with the base pre-pay amount for the zone to which the call is to be made, I have hereinafter shown and will describe in detail one embodiment of elements for comparing as aforesaid. In this embodiment I have shown three stepping switches which are successively stepped to positions corresponding to the dialed digits which identify the exchange of the called party. The three switches then stand in moved positions corresponding to the first three letters or digits of the called station. These are the three indicia identifying the zone of the called station. Strapping connections are made between the contacts of the first and second switches, and between the contacts of the second and third switches, for each of the three pay zones. These connections are so made that when the switches have been stepped to positions corresponding to the three successive indicia of the called station, a series connection will be established through the contacts of the three switches which contacts correspond to the zone of the dialed station; but series connections will not be established through contacts of the three switches, corresponding to the other two zones. It is possible to establish for each zone or base pay many sets of such strappings through the three switches, corresponding to a large number of identifying letter (or digital) groups. Thus a large number of individual exchanges in each base pay zone may be handled through such three stepping switches. I have hereinafter illustrated three sets of such strappings corresponding to the three base pre-pay amounts of fifteen cents, twenty cents, and twenty-five cents, respectively. I have also included the tabulation of numerous strapping combinations which may be produced by the above mentioned system of switching and strapping. Since local calls are conventionally not limited as to duration of time, such calls may be made through the presently disclosed equipment, and without need of using the timing equipment and other units presently to be explained.

Other objects and uses of the invention will appear from a detailed description of the same, which consists in the features of construction and combinations of parts hereinafter described and claimed.

*Brief description of the drawings*

In the drawings:

FIGURE 3 shows the calling station's conventional telephone unit, including its speaker and its receiver, the dialing unit incorporating the modifications previously referred to; and the portion of the wiring circuitry shown in this figure including the special sound signal producing means by which the exchange operator determines the kind and number of coins inserted by the caller at the calling station; and this figure also includes in its showing various of the relays to be hereinafter referred to;

FIGURE 4 shows the timing unit, the coin receiving elements and unit, including the amount of money (value) determining and signalling elements, the coin collect and coin return control elements, and the comparator elements by which the amount of money inserted into the coin receiving unit is compared with the base time pre-pay amount for the called station; and this figure also shows the warning light by which the forthcoming termination of the prepaid time interval is signalled to the caller;

FIGURE 5 shows the portion of the wiring diagram directly to the right of that portion shown on FIGURE 4, and directly below the lower right-hand corner portion of FIGURE 3; and FIGURE 5 shows the three stepping switch selectors by which the wipers are successively moved, during a dialing operation, to their positions corresponding to the digital values thus dialed during the first three dialing operations by the caller; and this figure shows a typical strapping between the contacts of the successive selectors, being a portion of the circuitry by which the total value of the inserted coins is compared with the base time pre-pay amount for the zone in which the called station is contained (when called from the presently being considered calling station); and this figure also shows, at its left-hand location a tabulation of a typical strapping schedule which might be used with the three base time prepay called stations; this strapping schedule being based on the three base time pre-pay amounts of fifteen cents, twenty cents, and twenty-five cents;

FIGURE 5A shows a tabulation of the three call letters of exchanges which may be called from a typical station provided with the equipment hereinafter disclosed, such called exchanges being tabulated as "fifteen cent area," "twenty cent area," and "twenty-five cent area," respectively, measured from the illustrated calling station;

Figures 26, 27:
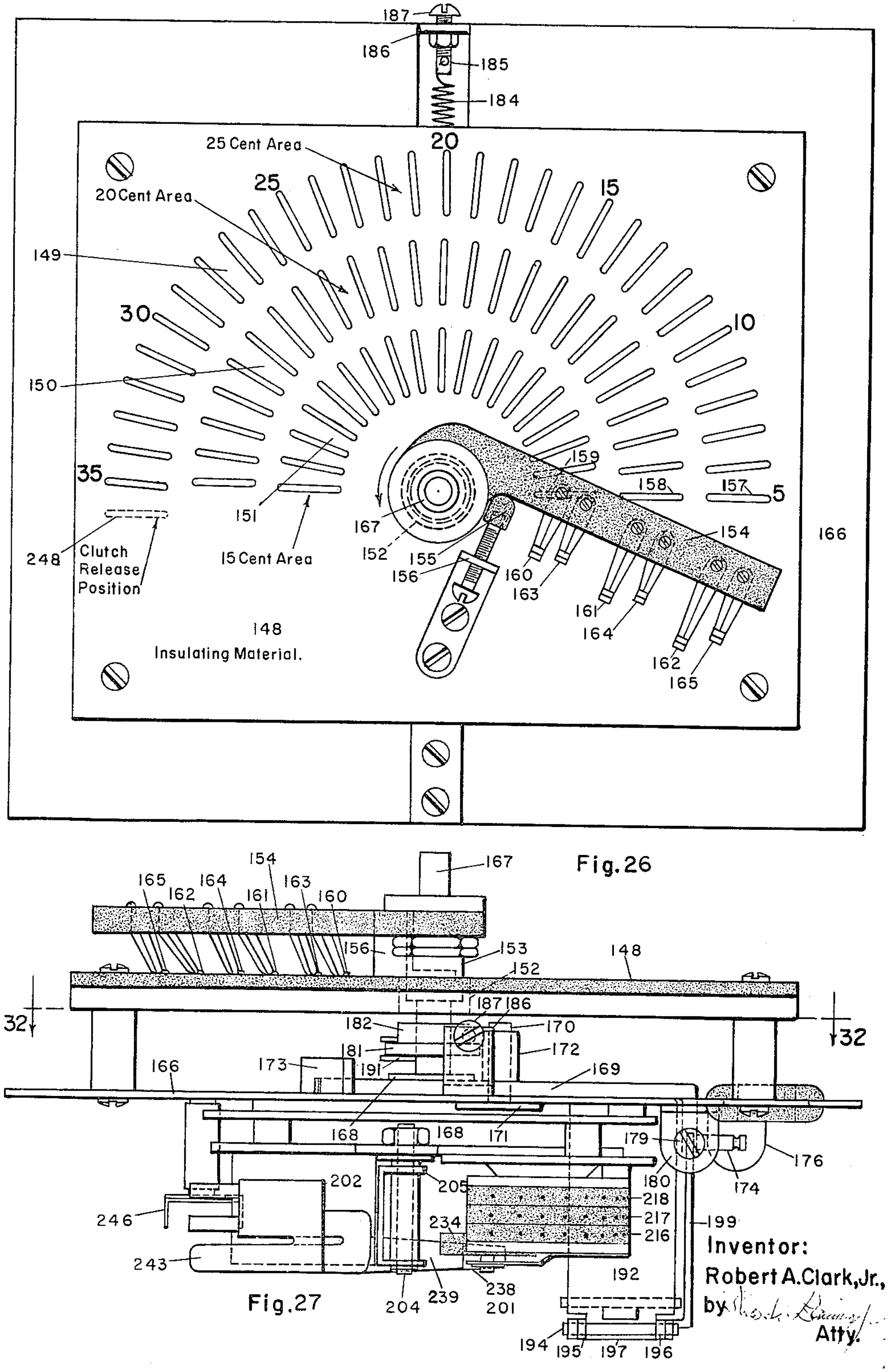
Figure 28:
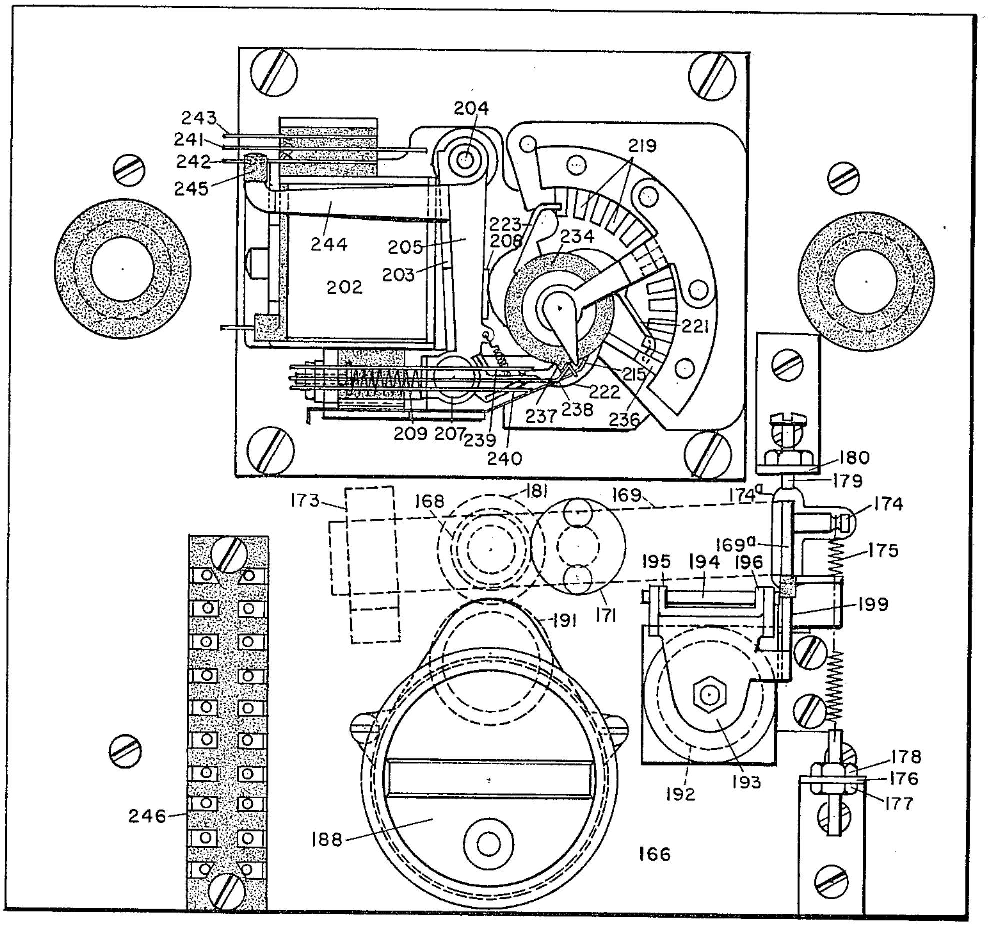
Figure 29:
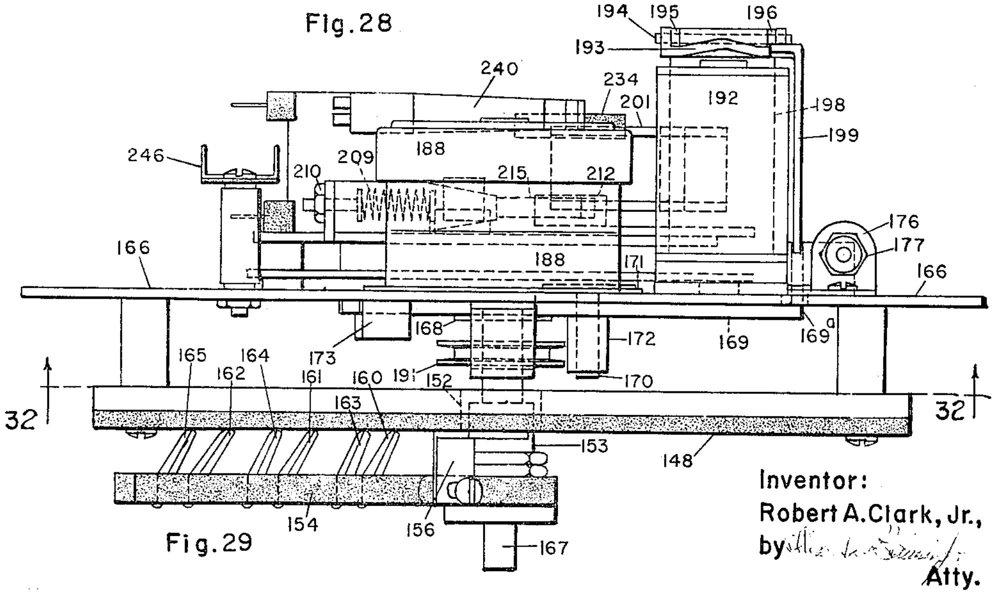
Figure 30:
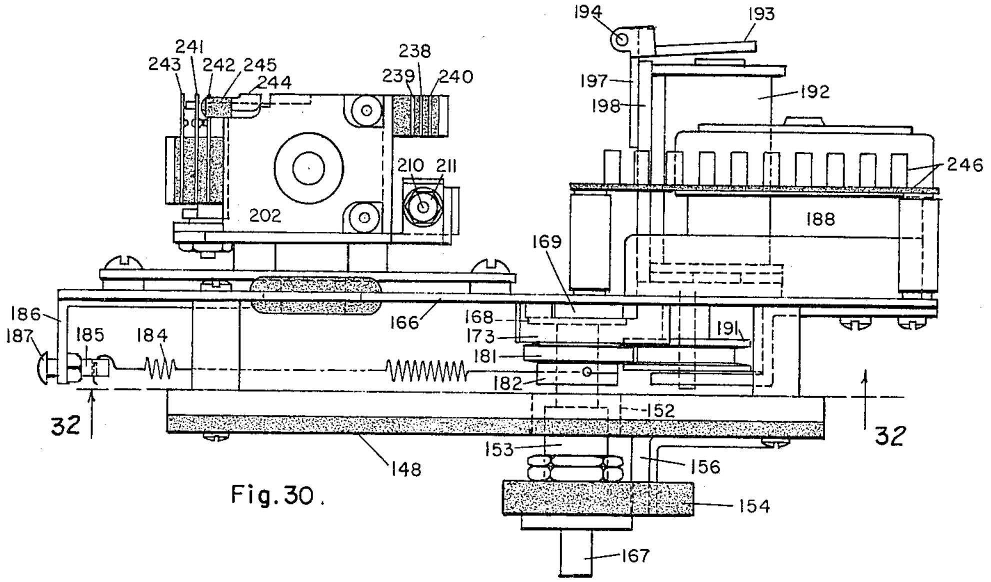
Figure 31:
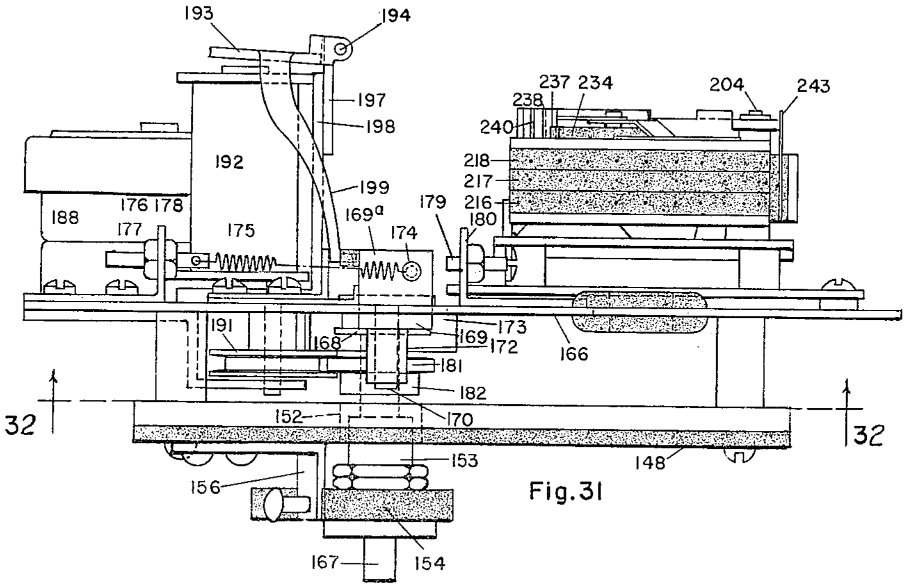
Figures 32, 33, 34, 35, 36:
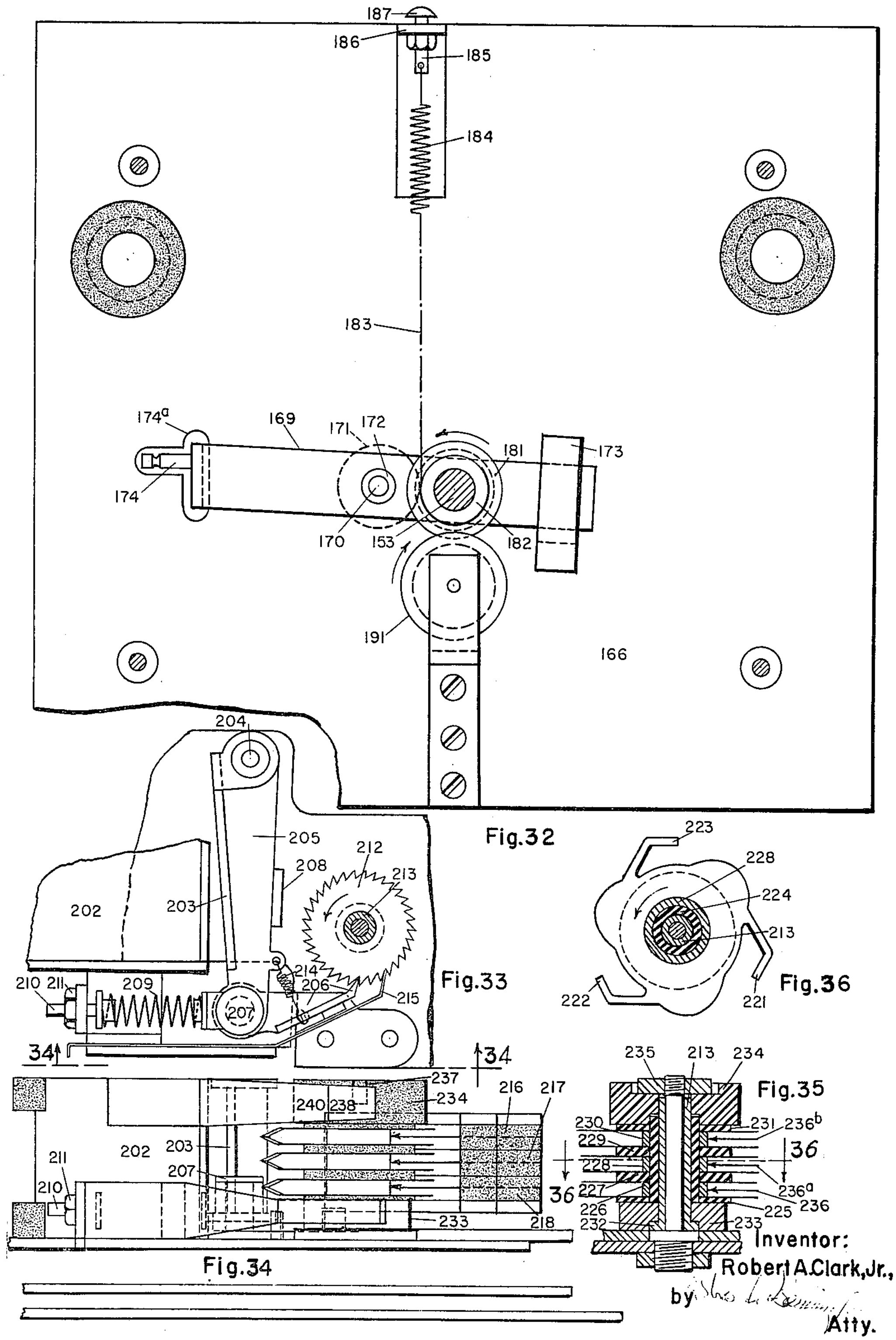
Figure 37:
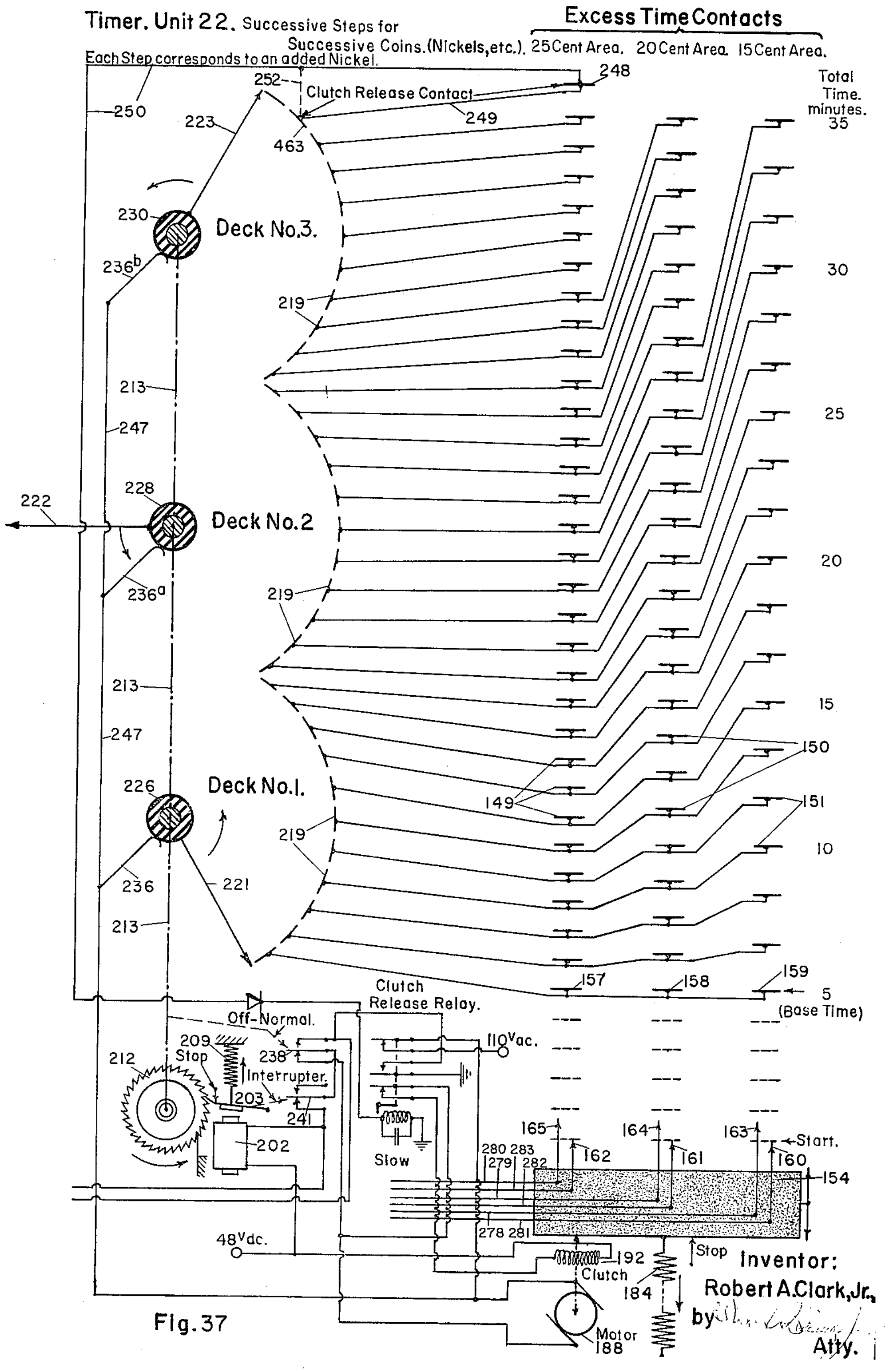
Figure 39:
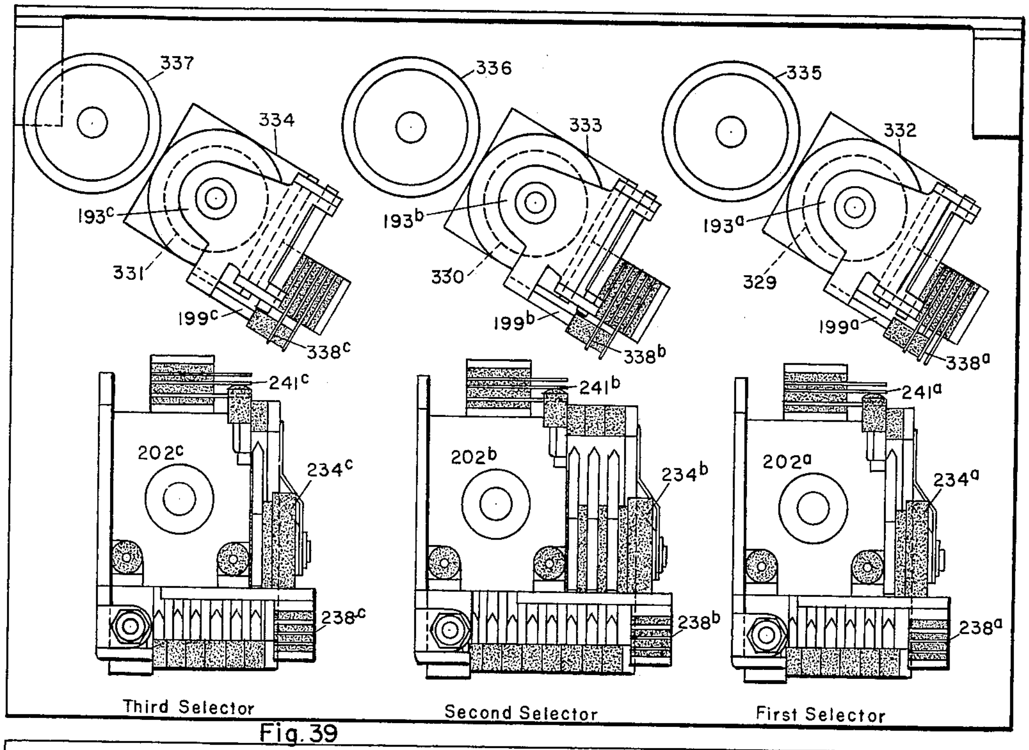
Figure 38:
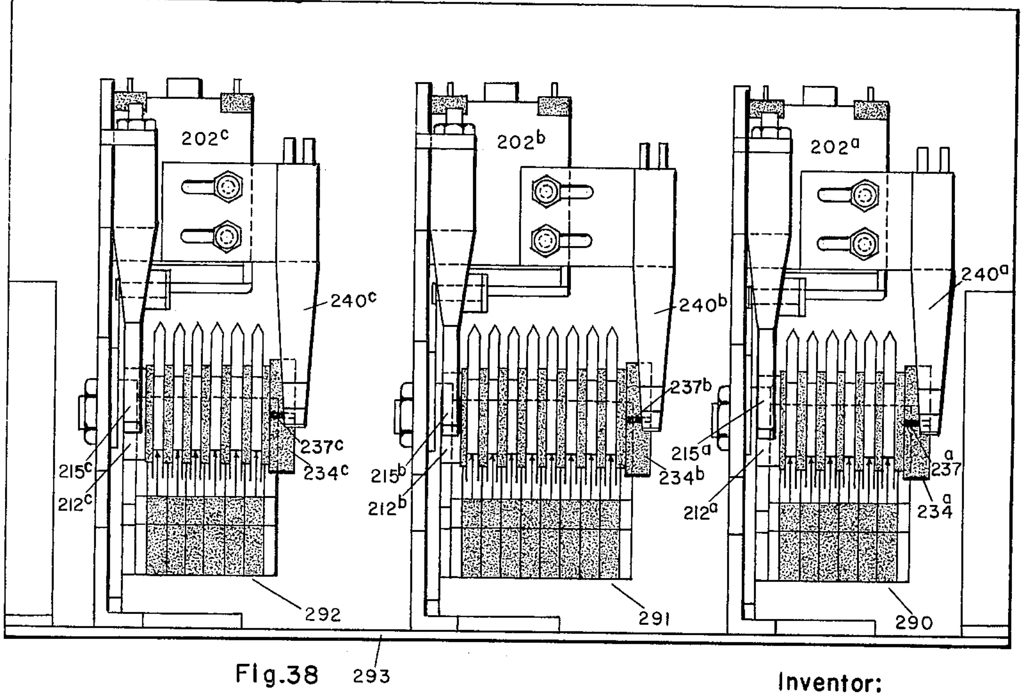
Figure 40:
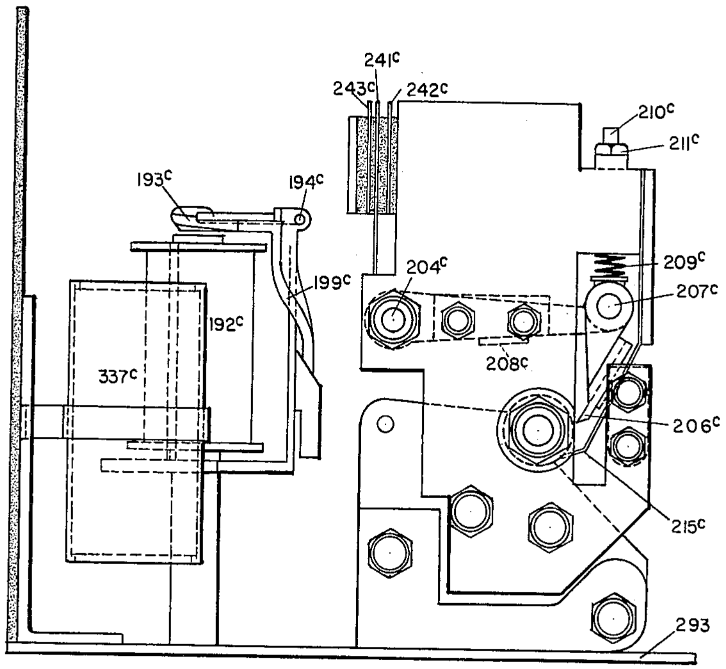
Figure 41:
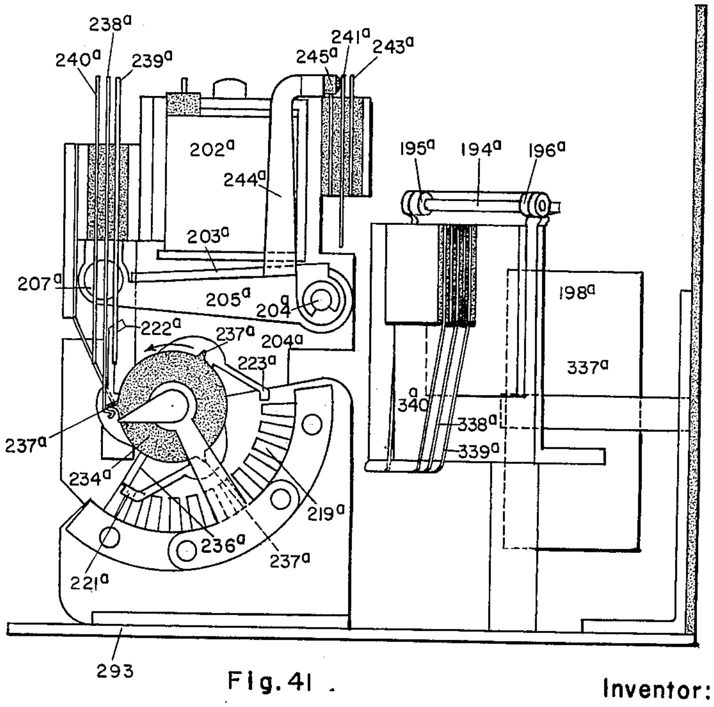
Figure 42:
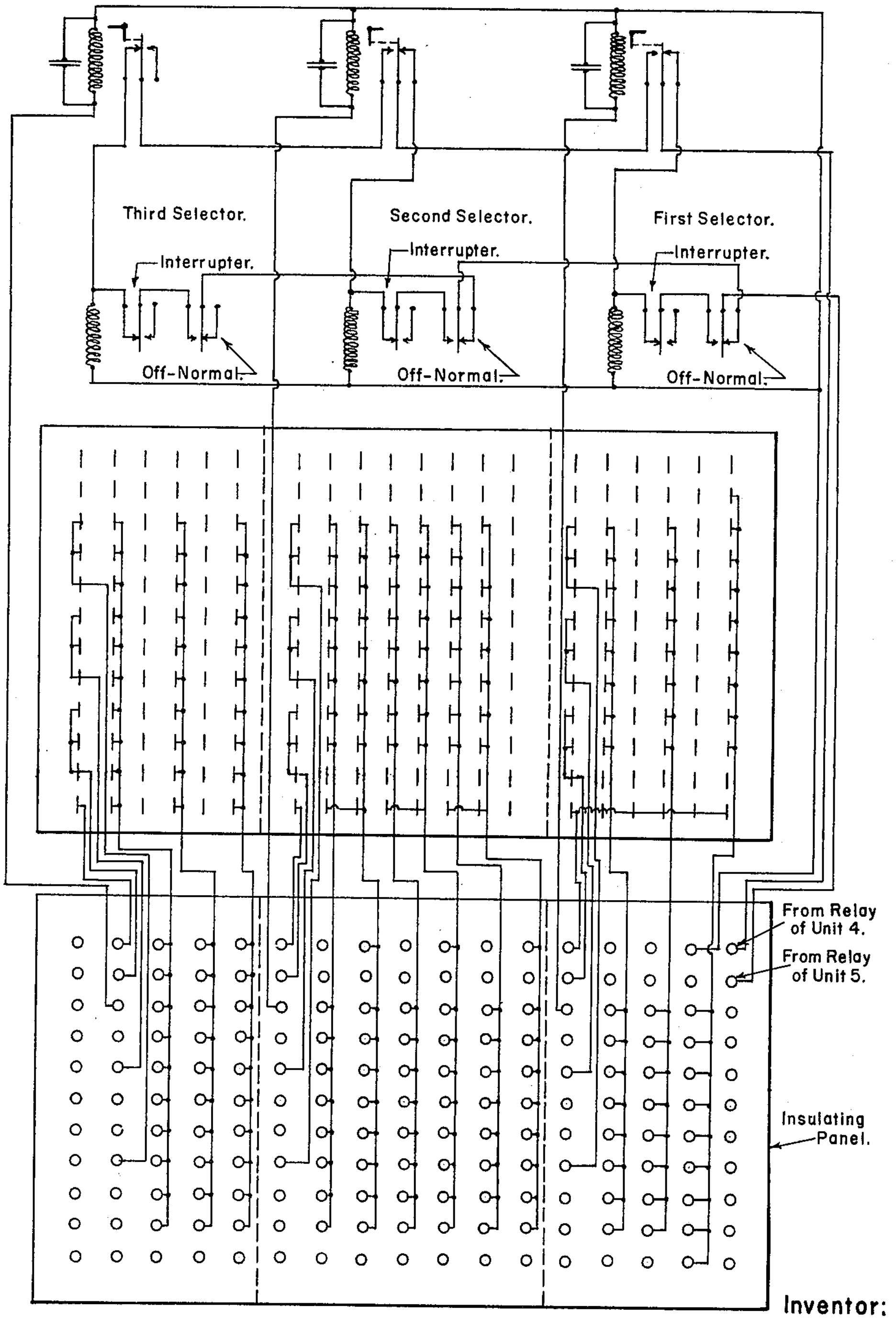
Figure 43:
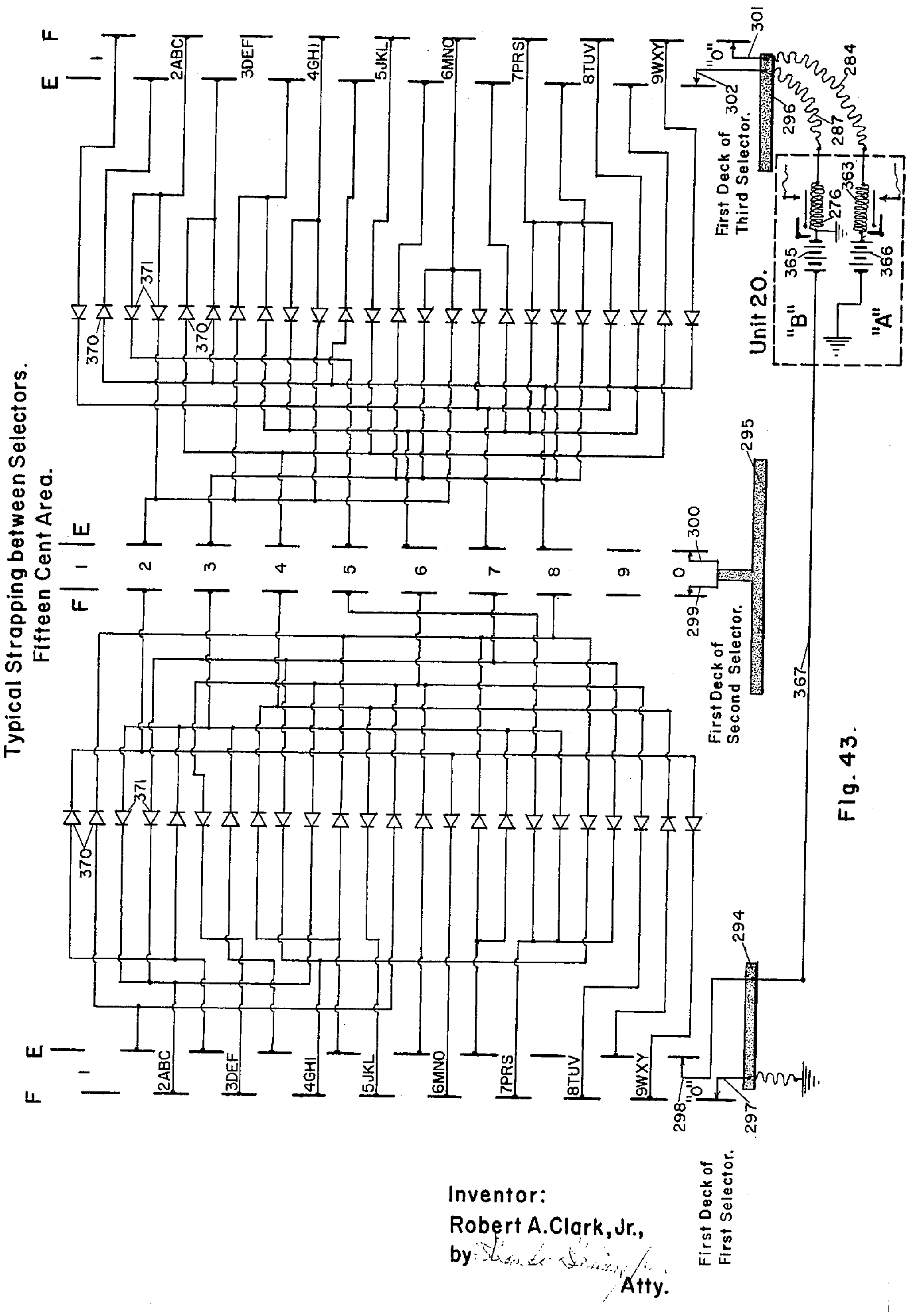
Figure 44:
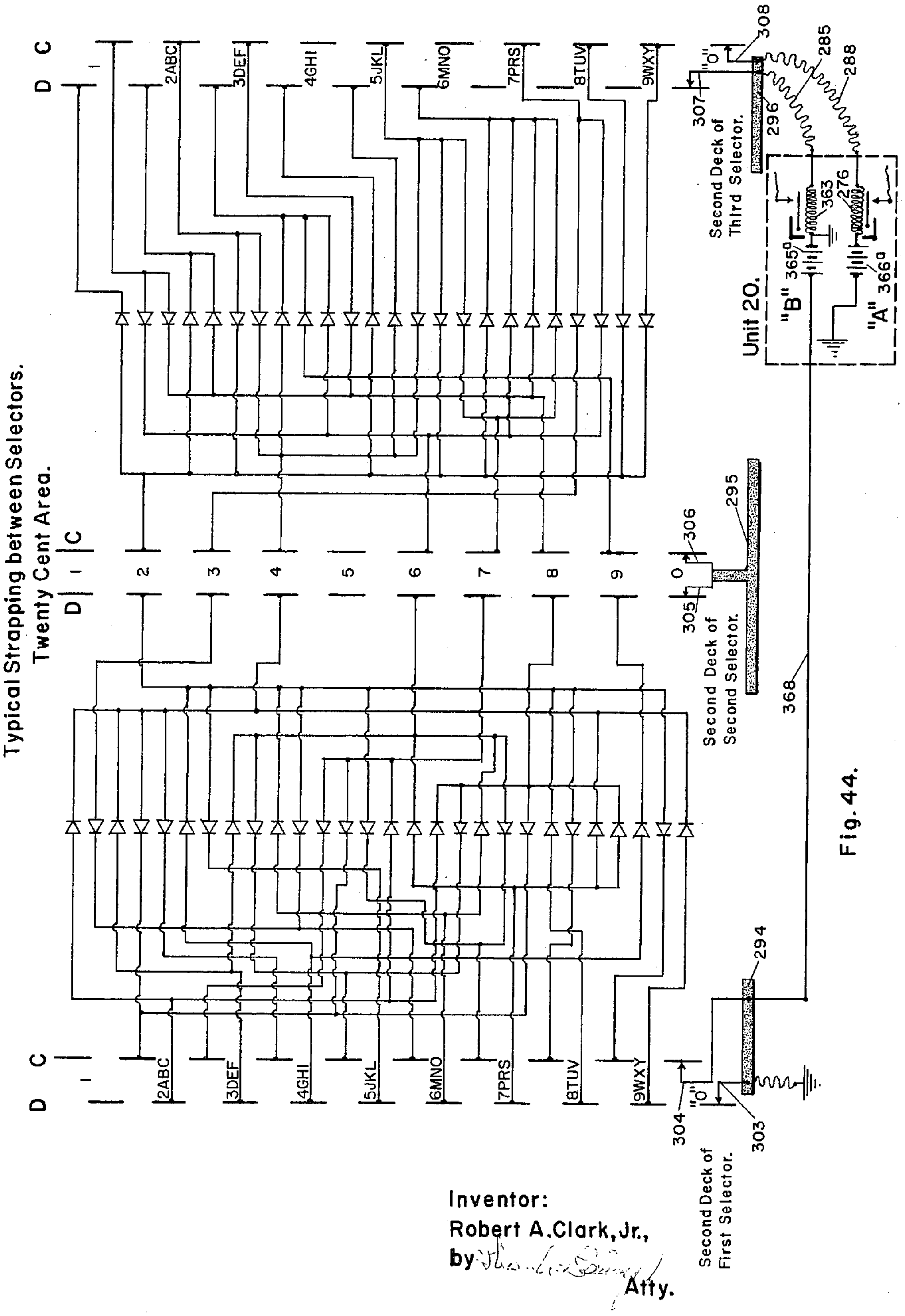
Figure 45:
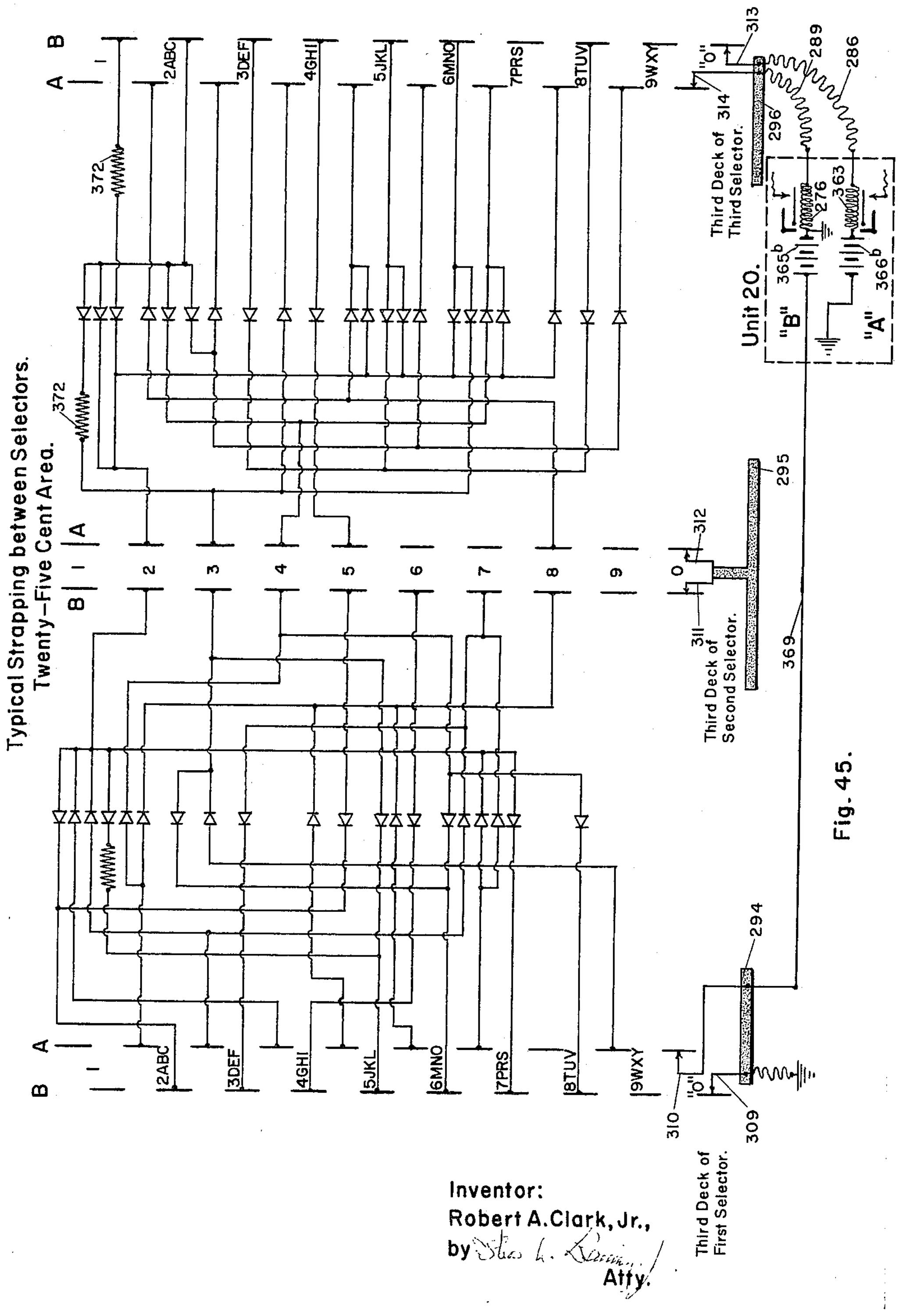

FIGUURE 26 shows a top plan or face view of the timer unit, with the swinging contact carrier fully restored to its base or zero time position by spring retraction, presently to be explained; and the timer unit shown includes stationary contacts corresponding to a fifteen cent zone, a twenty cent zone and a twenty-five cent zone; and the swinging contact carrier carries contacts, corresponding to all three such zones, and for producing the warning signal and also for producing the final cutoff signal;

FIGURE 27 shows an edge view corresponding to FIGURE 26, but looking at the edge of the unit which is at the top of FIGURE 26, so that the right-hand edge of FIGURE 27 corresponds to the left-hand edge of FIGURE 26, and the left-hand edge of FIGURE 27 corresponds to the right-hand edge of FIGURE 26; it being here noted that various of the operating elements of this timer are supported from a plate beneath and connected to the top or contact carrying plate of the timer;

FIGURE 28 shows a bottom face view of the timer unit, being a face view produced by rotation of the showing of FIGURE 27 about an axis extending across FIGURE 27, horizontally, and with rotation through 180 degrees; and FIGURE 28 shows the stepping switch element which is advanced step-by-step corresponding to additional money insertions into the coin receiving unit and according to the denominations of such money insertions, the successive contacts of such switch being connected to the successive stationary contacts shown in FIGURE 26; and FIGURE 28 also shows the time count, uniform speed motor, by which time is counted; together with the clutch element by which such motor's drive is communicated to the swinging contact carrying arm to advance such arm, during count of time, by motor drive, and against the urge of a retracting spring, with clutch release at completion of the time count, to permit the arm to be returned to its initial or base position, shown in FIGURE 29;

FIGURE 29 shows an edge view corresponding to FIGURE 28, loking towards the lower edge of the unit shown in FIGURE 28;

FIGURE 30 shows a left-hand edge view corresponding to FIGURE 28;

FIGURE 31 shows a right-hand edge view corresponding to FIGURE 28;

FIGURE 32 shows a horizontal section, looking down, taken on the line 32—32 of FIGURE 27, looking in the directions of the arrows; and FIGURE 32 is also a horizontal section, loking upwardly, taken on the lines 32—32 of FIGURES 29, 30 and 31; and FIGURE 32 shows the rock arm which carries the stub shaft by which the swinging arm is carried; such rock arm and stub shaft being capable of slight back and forth shift between a normally unclutching position and a clutching position in which the swinging arm is driven and rocked during the time count interval;

FIGURE 33 shows a fragmentary plan view of the ratchet drive and holdback elements, by which the stepping switch is advanced step-by-step according to pulses delivered by and corersponding to successive coins introduced into the coin receiving unit; FIGURE 33 being on enlarged scale as compared to other views of the timer unit;

FIGURE 34 is a fragmentary detail elevation taken on the line 34—34 of FIGURE 33, looking in the directions of the arrows;

FIGURE 35 is a fragmentary vertical section through the central or shaft portion of the stack of contact decks and corresponding movable contacts, of the stepping switch shown in various figures, including FIGURES 33 and 34;

FIGURE 36 is a fragmentary horizontal section taken on the line 36—36 of FIGURE 35, looking down, in the direction of the arrows; and FIGURE 36 shows the three wiper contacts corresponding to the three decks of stationary contacts, which three wiper contacts engage corresponding deck stationary contacts in sequence, each sequence of engagement of a wiper contact occurring through approximately one hundred twenty degrees of advance of the wiper contacts;

FIGURE 37 shows in schematic form the relationships of the principal operating elements of the timer contact system, including the stationary contacts, the movable (rockable) contact caryring arm, the drive motor and clutch for driving such contact arm at uniform rate during the time counting interval, the stepping switch advancing ratchet and pawl arrangement, for producing stepping, the three wiper contacts for the three decks, the "Interrupter" contacts for advancing the stepping switch by a self-pulsed operation to restore the wipers to their normal or zero positions when a time counting operation has been completed; and the "Off-Normal" contacts which modify circuitry as soon as the stepping switch moves forward from its normal or zero position, and for restoring such circuitry at final return of the wipers to their normal or zero position; and FIGURE 40 shows stationary contacts corresponding to insertion of coins of successive equal denominational values for successive extra time intervals of equal time values, the successive stationary contacts for the three zones (fifteen cent, twenty cent and twenty-five cent) being progressively spaced to correspond to the respective extra time values for such extra time coin insertions;

FIGURE 38 shows a front elevation of the selector unit comprising three selectors, corresponding to the three charge amount zones, for fifteen cent basic charge, twenty cent basic charge and twenty-five cent basic charge, respectively; each of the selectors comprising a stepping switch with contacts of sufficient number to accommodate the pulses delivered by the maximum number of pulses which may be produced by the dialing operation (plus, in certain selectors, additional pulses for specified functions); and each selector being provided with a sufficient number of decks of stationary contacts to accommodate the "strapping" and other circuitry presently to be disclosed;

FIGURE 39 shows a plan view corresponding to FIGURE 38; and FIGURE 39 also shows certain relay components which are introduced into the circuitry corresponding to each of the selector elements;

FIGURE 40 shows a left-hand elevation corresponding to FIGURE 38 and 39;

FIGURE 41 shows a right-hand elevation corresponding to FIGURES 38 and 39;

FIGURE 42 shows a schematic wiring diagram of typical connections between the various elements and relays comprising the illustrated selector unit;

FIGURE 43 shows schematically, a typical strapping of the stationary contacts of the first decks of the three selectors of the selector unit, with strapping between such first decks from selector to selector, corresponding to a typical group of stations to be called from the calling station, all of such stations to be called lying within the fifteen cent zone;

FIGURE 44 shows, schematically, and in manner similar to the showing of FIGURE 43, the strapping of the second decks of the three selectors, and corresponding to called stations all lying within the twenty cent zone; and FIGURE 45 shows, schematically, and in manner similar to the showings of FIGURES 43 and 44, the strapping of the third decks of the three selectors, and corresponding to called stations all lying within the twenty-five cent zone;

*General*

As already stated, a principal object of the present invention relates to the provision of an improved form of self-contained calling station, including various components whereby new and useful objectives may be attained; and, as a more specific object, to accomplish the foregoing objective in such manner, and by use of such components, properly interrelated and interconnected, to enable such improved calling station to be operated in connection with exchanges including presently conventional equipment, and substantially wtihout change or modification of the equipment of such exchange, or modification of its circuitry. I have also mentioned that a further object of the invention is to make use of conventional components, such as relays, stepping switches, dial caller's unit, and other units of equipment; but with such modifications of such components as may be needed to adapt them to the specific operations and problems presented when such components are introduced and connected into the circuitry presently to be explained. In order to simplify a detailed understanding of the circuitry and related functions of the units which are included in the calling station, I shall first describe certain of the components in sufficient detail to enable ready understanding of their functioning, and the relations which they bear to other components under various of the intended operations which may be produced by the calling party. To this end the following descriptions are included:

*Pulses unit with pulse lock-out*

In FIGURES 7 to 11, inclusive, and FIGURES 22 to 26, inclusive, I have shown one conventional form of dial type, pulse producing unit, modified to include additional or substitute elements, to enable such unit to meet with certain of the operating functions and requirements imposed on such unit when incorporated into the present calling station; and in FIGURES 9 to 18, inclusive, I have shown certain of the contacts of such dial type unit, in conventional form, and the conventional means to produce pulsing movements of such contacts; and I have also shown additional elements which are used in connection with such conventional elements, to enable a dialing operation to be produced which will call the exchange operator so that she may be informed by the calling party concerning a call; or so that such exchange operator may intervene in the call, to complete such call, and monitor it, as in the case of a long distance call which cannot be, or is not intended to be, directly dialed. This illustrated dialing unit is a product of Kellog Switchboard & Supply Co., located at Chicago, Cook County, Illinois, and designated as Switch 1sx1–T. This unit includes a conventional dial plate 100, pivotally mounted with respect to a base element 101, and in position to face the calling party.

Figure 7:
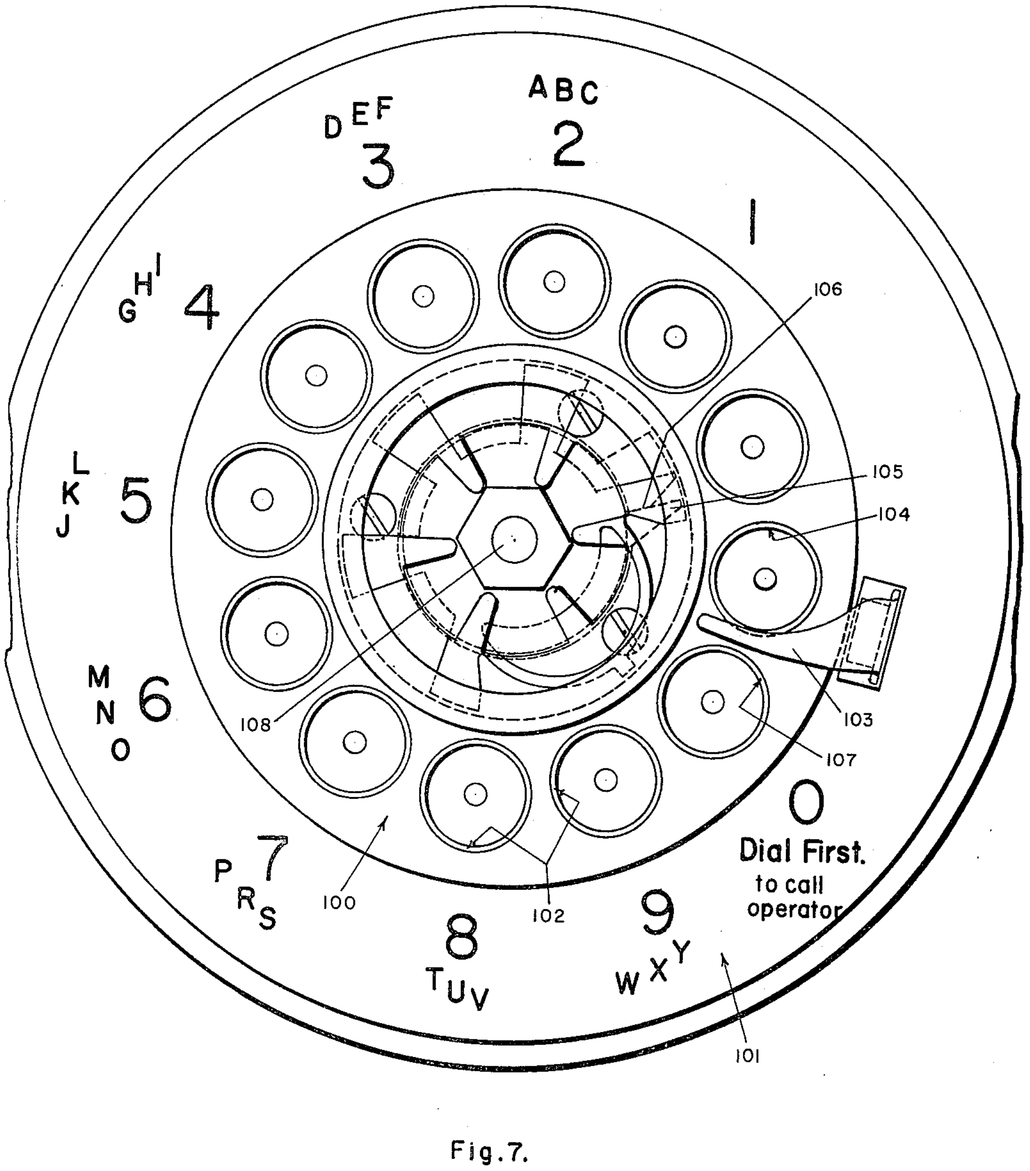
FIGURE 7 shows a face view of a typical dialing unit, showing the 0 or high dialed position which brings into operation the special switching feature presently to be described.
Figure 8:
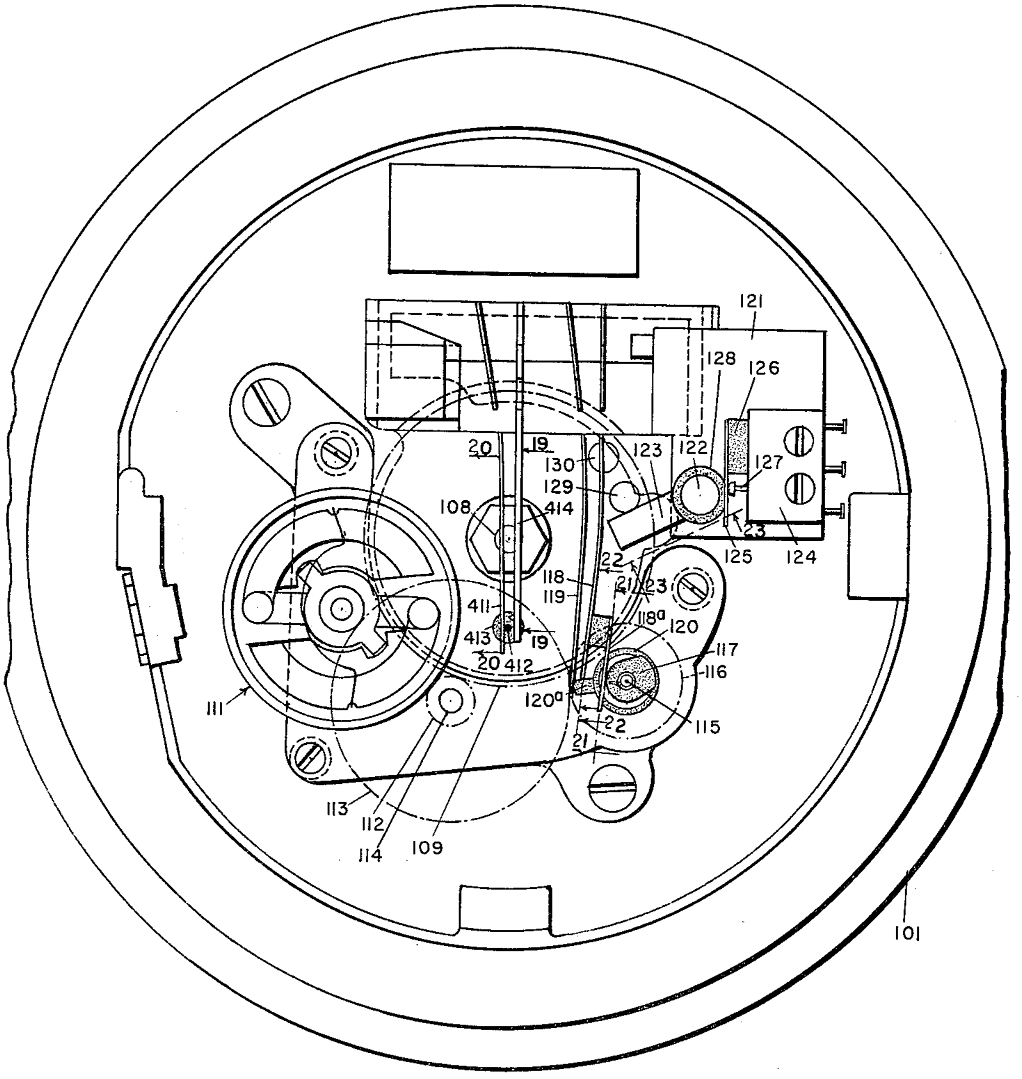
FIGURE 8 shows an inverted or bottom view corresponding to FIGURE 7, the inversion having been made by rotating the dialing unit 180 degrees about an axis extending from top to bottom of FIGURE 7.

Conventionally there are twelve of the finger openings 102, located at 30 degree spacings progressively around the dial plate as shown in FIGURE 7. Usually only eleven of these openings may be used, the first opening being located close to the prong 103, being the normal or "home" position of the dial plate when it is returned to its home position by spring urge. It is understood that such returning movement is conventionally in the counterclockwise direction, the finger produced operation having been in the clockwise direction until limited by the stop prong 103. Such spring urged counterclockwise returning movement is limited at a zero or home position (where the finger opening 104 has just moved beneath the stop prong to the position shown in FIGURE 7), by engagement of a lug 105 which is connected to the dial plate and moves therewith, with a stationary lug 106 extending across the path of returning movement of such lug 105, being the home position shown in FIGURE 7. The details of the supports for these coacting lugs are not illustrated, as they are of conventional form.

The returning movement of the dial plate is accompanied by corresponding movements of pulse generating elements and contacts.

The foregoing elements of structure are conventional, but include modifications, now to be described. These modifications are as follows:

An extension support 121 is connected to a stationary part at position close to the main gear 109. Such main gear rotates at the same rate as the finger dial plate. Such main gear is exposed at its location proximate to the extension 121. A stud 122 is secured to such extension 121; and the rock arm 123 is journalled, not too freely, on such stud, so that such rock arm will remain in either of two positions of rock to which it may be moved. A microswitch element 124 is mounted on the extension element 121 with its actuating pin (or an extension thereof) projecting towards the stud 122. Conveniently, a spring leaf 125 is secured to a block 126, and overlies the actuating pin 127 of the microswitch. This arrangement is such that the bias of such spring leaf normally carries it leftwardly (in FIGURE 8) to allow the microswitch pin to be shifted leftwardly under bias urge of the microswitch leaf contact; but rightward movement of the spring leaf will depress the microswitch pin, thus reversing such switch's contact, as long as such rightward moved condition is maintained.

Figures 9, 10, 11, 12, 13, 14, 15, 16:
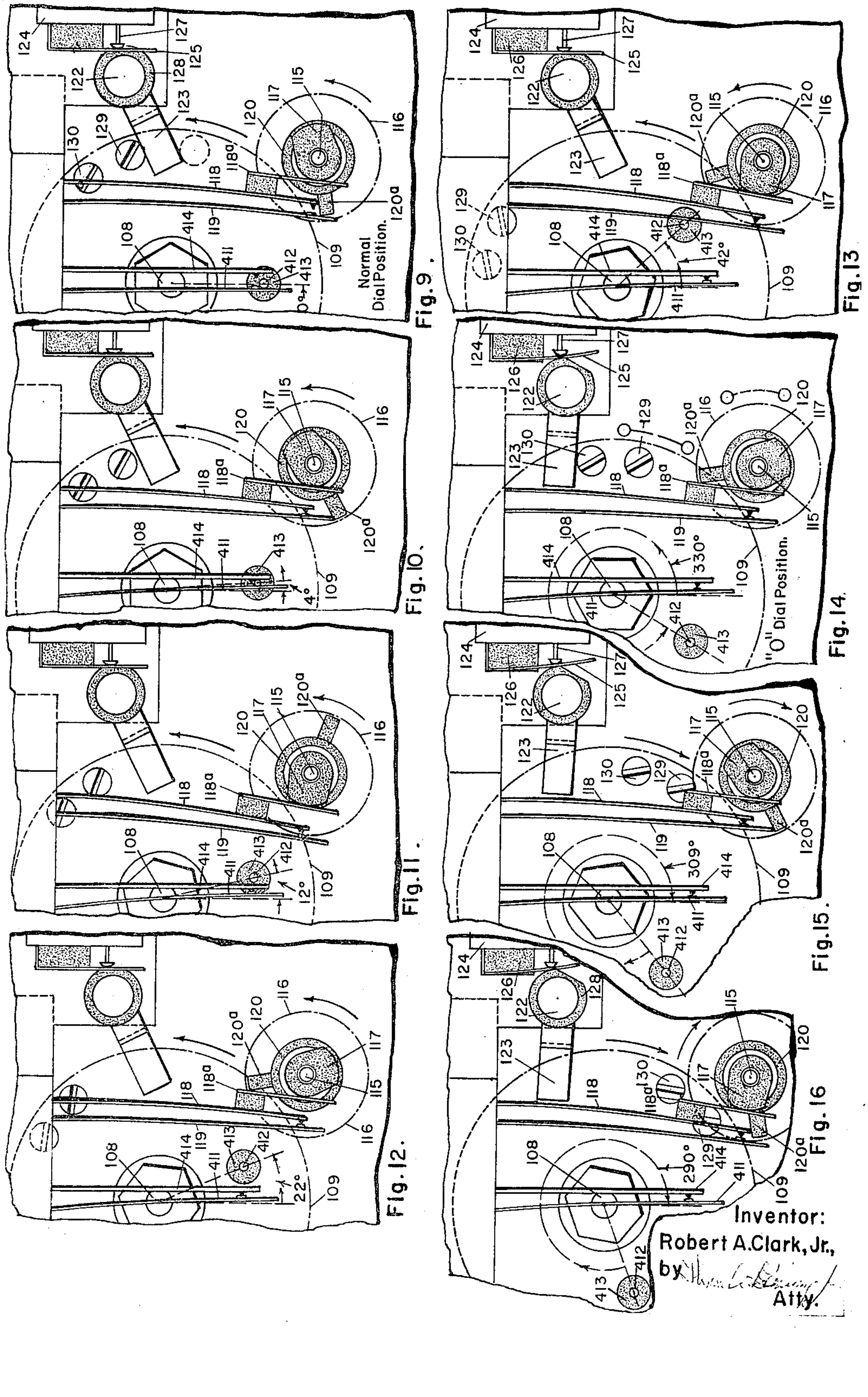
FIGURE 9 shows an enlarged detail view of a portion of the unit, more or less in schematic form; and this figure shows the principal contact elements of the dial unit, including the modifications previously referred to; together with the cam and related elements by which the pulsing contacts are operated only during the returning rotational movement when the finger dial element is released; and in this figure all of the parts are shown in their normal or fully retracted position, corresponding to the finger released and retracted position of the finger dial shown in FIGURE 7; and the directions of rotational movement of certain parts are shown by the arrows, being the movements during the operation of moving the actuating finger from the 0 or Dial First to Call Operator position clockwise, in FIGURE 7.
FIGURES 10, 11, 12 and 13 show successive positions of the operating parts therein shown, corresponding to microswitch setting rotary movements of substantially 4, 12, 22 and 42 degrees from the Dial First to Call Operator position of the finger dial 101 shown in FIGURE 7 with corresponding 4, 12, 22 and 42 degree counter-clockwise movements of the wheel 109, and corresponding counterclockwise movements of the cam shaft 115, as shown in FIGURES 12 to 21, inclusive.
FIGURE 14 shows another view corresponding to the views of FIGURES 9 to 13, inclusive; but in FIGURE 14 the parts have been further moved from the "Dial First" position of the finger disk 101 to the 330 degree stopping position of rotation of said finger dial 101, above referred to; this 330 degree position being the terminus of the finger presetting rotary movement, and being limited by a stop, presently to be described such pre-setting rotary movement of 330 degrees clockwise of the finger dial 101 shown in FIGURE 7, serving to preset the microswitch which cuts out the sending of pulses during the returning rotational movement of the finger dial 101 counterclockwise in FIGURE 7, to its position shown in that figure.
FIGURES 15, 16, 17 and 18 show successive positions of the parts therein shown, corresponding to returning rotary movements of the finger dial 101, wheel 109 and cam shaft 115, to substantially the 309, 290, 275 and 260 degree positions (being positions of those angular values measured from the normal or fully returned position)
Figure 17:
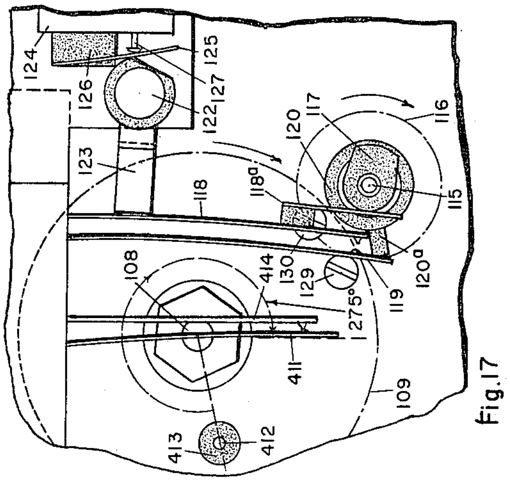
Figure 18:
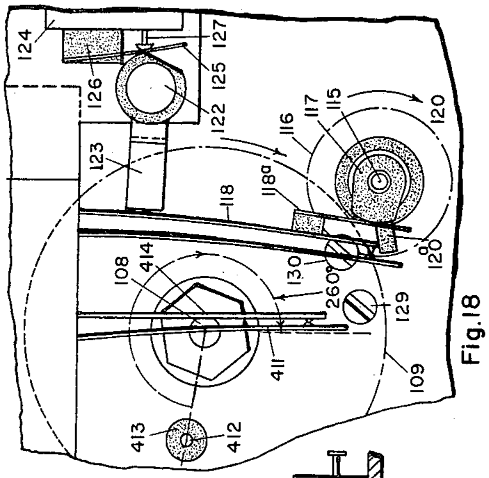
Figure 19:
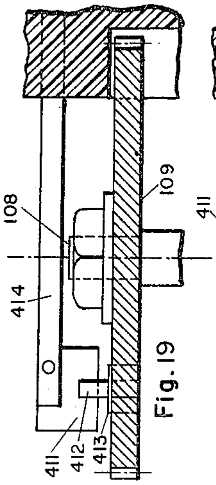
FIGURE 19 shows a fragmentary vertical section taken on the line 19—19 of FIGURE 8, looking in the direction of the arrows; and this figure is a detail face view of the two contacts which separate and remain separated during the full rotary movement of the finger dial, beginning immediately at the commencement of such rotary movement; and such contacts again come together upon completion of the returning rotary movement of the finger dial.
Figure 20:
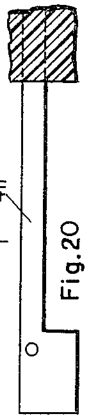
FIGURE 20 shows a fragmentary vertical section taken on the line 20—20 of FIGURE 8, looking in the direction of the arrows; and this figure shows the left-hand contact of the pair which is shown in FIGURE 19.
Figure 21:
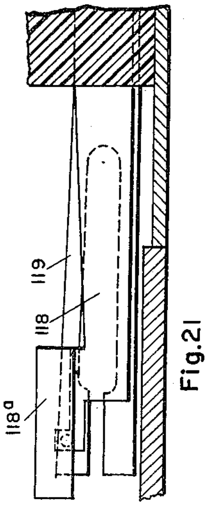
FIGURE 21 shows a fragmentary vertical section taken on the line 21—21 of FIGURE 8, looking in the direction of the arrows; and this figure is a face view looking at the right-hand contact of the pair of contacts which produce the pulsing during the return rotary movement of the finger dial being counterclockwise in FIGURE 7.
Figure 22:
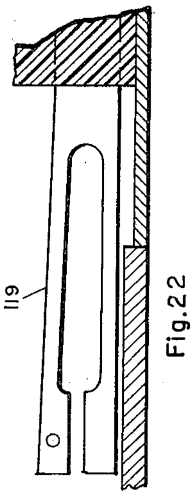
FIGURE 22 shows a fragmentary vertical section taken on the line 22—22 of FIGURE 8, looking in the direction of the arows; and this figure is a face view of the left-hand contact of the pair shown in FIGURE 21.
Figure 23:
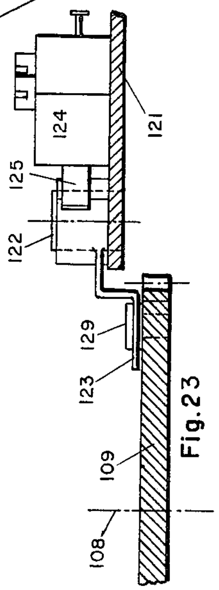
FIGURE 23 shows a fragmentary vertical section taken on the line 23—23 of FIGURE 8, looking in the direction of the arrows; and this figure shows the vertical face of the cam element which, at the proper phase of the rotary movements already refered to, acts to shift the microswitch to its nonbiased contact position, thus producing a desired operation, presently to be referred to; and in this figure the elevational view of the microswitch is shown in substantialy forty-five degree projection.

The rock arm 123 includes a hub portion 128 having a flattened portion facing the spring leaf 125, the parts being so proportioned that such spring leaf will follow leftwardly from a position of the rock arm in which the spring leaf is engaged with the hub portion of the rock arm (as in FIGURES 14 to 18, inclusive) to the rock arm position in which the flattened portion of the hub receives the spring leaf (as in FIGURES 9 to 12, inclusive). Thus, by rocking the rock arm through a few degrees of rock the microswitch is thrown into reversed switching position. The contacts of such microswitch are thus thrown into either of their intended positions, according to the position of rock of the rock arm. The rock arm is rocked back and forth on occasion by the following means:

To the bottom face of the main gear (top face as shown in FIGURES 8 and 9 to 18, inclusive) there are secured two studs 129 and 130 at radial positions on such main gear that said studs will engage the rock arm to rock the same from its position at the commencement of such engagement to another position. The direction of such rock will depend on the direction of main gear rotation at the time of such engagement. The parts are so arranged and the pins or studs 129 and 130 are so positioned angularly on the main gear that the following sequence of operations will occur:

When the parts, including the main gear and the rock arm, are in their normal or fully returned positions, being the positions which they occupy when the dial plate is in its position shown in FIGURE 7, wherein such dial plate is fully returned under urge of its returning spring, the stud 129 will have engaged the far edge of the rock arm, and will have rocked such arm into the position shown in FIGURE 9, wherein the spring leaf has shifted leftwardly against the flattened portion of the rock arm hub, thus allowing the microswitch contacts to move under bias of the microswitch spring leaf contact, to one switching position. The microswitch will then remain in that switching position until the rock arm is rocked clockwise (in FIGURES 8 and 9 to 18) far enough to shift the spring leaf 125 to position to reverse the microswitch contacts. Such position will then be maintained until a returning rock of the rock arm is produced. Such returning rock will occur when the other stud 130 has come into engagement with the near edge of the rock arm, so that the final rotational movement of the main gear in counterclockwise direction to its fully rotated position (corresponding to a full rotation of the dial plate clockwise) has been produced, by finger movement with the finger set into the opening 107 at the high or 0 position, and dial plate rotation then produced to bring the finger around to the stop 103. Then, when the finger is released from the dial plate, and as such dial plate returns under its spring urge to its normal or home position, the switch will remain in the position shown in FIGURE 14, through the succeeding positions of FIGURES 15, 16, 17, and 18, until finally the stud 120 again engages the far edge of the rock arm, so that the final rotating movement of the dial plate and main gear will be accompanied by rock of the rock arm back to its position shown in FIGURE 9.

For any dialing operation of rotational amount less than that produced when the finger is inserted into the opening 107 for the 0 position and corresponding rotation of the main gear, the stud 130 will not have engaged the rock arm, and such rock arm will not have been reversed. Thus, for any such dialing operation, the pulsing movements of the contact elements 118 and 119 will occur without change of circuitry which they control, due to the fact that the condition of the microswitch has not been reversed during such pulsing movements of such contact elements. On the contrary, whenever the dial plate is rotated by finger movement commencing at the opening 107 for the 0 position, the microswitch will have been reversed so that the circuitry of the pulsing circuit will be correspondingly changed, and the pulsing movements of the contact elements 118 and 119 will not deliver pulses to the circuitry in conventional manner. Specifically, the circuitry is such that reversal of the microswitch produced by such dial plate movement beginning with the opening 107 for the 0 position, will place a shorting or bridging connection across the contacts of the contact elements 118 and 119, so that separation of such contacts produced by the rotations of the shaft 115 will not produce pulses of current during the returning movement of the main gear. However, it is seen that just prior to termination of the returning movement of the dial plate at completion of such dialing from the "0" position, the microswitch will be restored to its normal position, under which the circuitry will function normally for production of pulses for subsequent dialing operations of less amount than that produced by dialing from the 0 position.

While I have above described one embodiment of a dialing unit modified to meet requirements of the present equipment, I do not intend to limit myself to such specific form of dialing unit so modified, except as I may do so in the claims. Other forms of conventional dialing units may also be modified to incorporate the features already disclosed, within the scope of one portion of my present invention. I have herein shown two other forms of conventional dialing unit, thus modified. These are as follows:

*Stromberg-Carlson embodiment*

Figure 24:
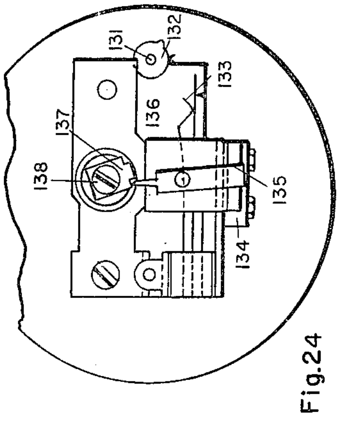
FIGURE 24 shows a bottom plan fragmentary detail view of a first modified embodiment of the microswitch operating elements.

In FIGURE 24 I have shown, more or less schematically, certain operating parts of a conventional dialing unit, being a product of Stromberg-Carlson Company of Chicago, Illinois. In this case the shaft 131 is rotated once for each digit dialed, thus causing the cam 132 to cause the switch leaf to function for production of a single pulse corresponding to each digit so dialed. Such leaf switch 133 is normally closed, and is moved to open circuit position once corresponding to each digit. The microswitch 134 is located on a convenient stationary part; and the rock arm 135 is pivoted to a stationary part (shown as pivoted to the microswitch carrier 136). A stud or finger 137 is pivoted for rock on a pivotal point 138; and suitable means are provided for rocking such element 137 in either direction with rock in one direction when a full rotational movement of the dial plate for 0 dialing is desired, to thus throw the microswitch into one switching position, and with rock back to the normal position of such element 137 at the completion of the returning movement of the dial plate from such 0 position, with return of the microswitch to its normal or original switching condition.

*North Electric Company embodiment*

Figure 25:
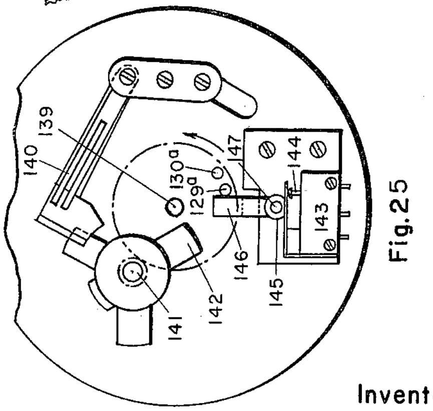
FIGURE 25 shows a bottom plan fragmentary detail view of a second modified embodiment of the microswitch operating elements.

In FIGURE 25 I have shown, more or less schematically, certain operating parts of another conventional dialing unit, being a product of North Electric Company of Chicago, Illinois. In this case the shaft 139 rotates in phase with the rotations of the dial plate, back and forth as already explained. The contacts shown at 140 comprise a portion of the pulsing circuitry, and are normally closed. Pulsing is produced by rotation of the three bladed wheel element 141, geared to the wheel 142 which is carried by the shaft 139. The microswitch element 143 is mounted close to such wheel 142 and with its leaf contact actuating pin extending towards such wheel 142, as shown at 144. The cam block 145 is carried by the rock arm 146 pivoted to a stationary part at 147; and the studs 129ª and 130ª are mounted on such wheel 142 in positions proper to ensure the shifting of the microswitch to its reversed position only when the dial plate is operated from its 0 position, and to thus bridge or short the pulsing switch contacts only when such 0 dialing position is used.

Evidently other forms of dialing and pulsing unit than those hereinabove described, may be modified to meet the requirements of the present invention. I include all such units when properly modified to meet the requirements of the present invention, as being within the scope of that portion of such invention which relates to or includes the bridging of the pulse producing contacts, when the dialing is effected from the 0 high position.

*Timer unit, general construction*

Reference is next made to FIGURES 26 to 37, inclusive, which illustrate an embodiment of timer unit suitable for use in connection with the presently disclosed improvements. This timer unit is provided with a movable element which carries at least one movable contact corresponding to each of the zones to be served. Preferably, also, such movable element carries another secondary contact for each such zone. This secondary contact is so disposed that it effects a circuit closing operation a predetermined time interval prior to the closing function produced by the corresponding primary contact for the zone in question.

This timer also carries a series of stationary contacts for each zone mounted in position for successive engagement by the movable contact or contacts for such zone; and when both a primary and a secondary contact are provided for each zone, they are so mounted on the movable element or carrier that the secondary contact for each zone will engage a specified stationary contact for such zone at the pre-determined warning time interval prior to engagement of such specified contact by the primary contact for such zone. Conveniently, such predetermined time interval is chosen as 45 seconds, being a warning time within which the calling party may, if desired, make prepayment for an extended time interval of his call. If such further payment is made the permitted interval will be extended an amount corresponding to such additional prepayment. At the warning time interval time prior to expiration of such extended interval a new warning signal will be given; and the calling party may make a further prepayment for a further extension of time. Otherwise, in case no such extension prepayment is made, either as first explained above, or as secondly explained above, the call will be cut off by functions instituted by engagement of the primary movable contact for such zone, with the stationary contact which corresponds to the original pre-paid time interval or the extended pre-paid interval, as the case may be.

Conveniently, the movable contact carrying element comprises an arm secured to and carried by a rock shaft, so that such arm sweeps over a stationary contact carrying element during the time count operation. Such arm carries the primary and secondary contacts for the several zones, at successive radial positions outwardly along such arm; and the stationary contacts for the several zones are located in or on the contact carrying element in circular segments coaxial with the rock shaft, within a slight departure from such coaxial condition during normal operations, as will presently appear.

Means are provided for driving the rock shaft, during a time count operation, at uniform rate from the zero or normal position of the rock shaft (and connected arm), thus causing the movable contacts for the several zones to successively engage the stationary contacts for their respective zones, during the continued rocking and arm sweeping operation. During this operation the secondary contact for each zone engages any given stationary contact for such zone at the predetermined interval prior to engagement of such stationary contact by the primary contact for such zone; and the engagements of the respective primary contacts with the successive stationary contacts for their zones occur after discontinuance of engagements of such stationary contacts by the secondary contacts which correspond to such primary contacts. Thus there is avoided circuitry interference between the signals produced by the engagements of the secondary contacts and the corresponding primary contacts, with the successive stationary contacts.

Conveniently the stationary contacts for each zone are spaced progressively from each other at uniform spacings, corresponding to successive and equal time intervals. With this arrangement, each secondary contact, and each primary contact for the respective zones, will engage a succeeding stationary contact at a time interval uniform for all such successive stationary contacts for such zone. Then, if the extra pre-pay amounts for successive extra time intervals are of equal values for any given zone, it follows that by making successive prepayments of equal amounts for successive extra time intervals, a proper relationship between the stationary contacts and such successive extra time intervals will be ensured. For example, if the pre-pay charge per minute for the twenty-five cent zone is five cents, then it follows that successive prepayments of five cents each, must correspond to engagement of successive stationary contacts for the twenty-five cent zone, at intervals of one minute each. Likewise, if the pre-pay charge per minute for the twenty cent zone is four cents, then it follows that successive prepayments of five cents each, must correspond to engagement of successive stationary contacts for the twenty cent zone, at intervals of one and one-quarter minute each; and if the pre-pay charge per minute for the fifteen cent zone is three cents, then it follows that successive pre-payments of five cents each, must correspond to engagement of successive stationary contacts for the fifteen cent zone, at intervals of one and two-thirds minutes each. Under this basic relationship, by making provision for successive advancements of a stepping switch, by steps which correspond to successive nickels introduced into the coin receiving unit, successive contacts of such stepping switch may be successively electrified. Then, by connecting each such stepping switch contact with one of the stationary contacts of the twenty-five cent zone, and with one of the stationary contacts of the twenty cent zone, and with one of the stationary contacts of the fifteen cent zone, it follows that, although the twenty-five cent contact just referred to is spaced ahead of the previous twenty-five cent contact by a spacing corresponding to one minute of movement of the rock shaft and movable contact carrying arm, the twenty cent contact of such so-connected group should be spaced ahead of the previous twenty cent contact by a spacing corresponding to one and one-quarter minute movement of such rock shaft and arm, and the fifteen cent contact of such so-connected group should be spaced ahead of the previous fifteen cent contact by a spacing corresponding to one and two-thirds minutes of movement of such rock shaft and arm. This spacing relationship between successive stationary contacts of the twenty-five cent zone group, and of the twenty cent zone group, and of the fifteen cent group, must be maintained for the full range of time movements of the rock shaft and the arm, for which provision has been made.

Conveniently, a base time of five minutes is provided for each of the three zones, corresponding, in the three cases to a base charge of twenty-five cents, a base charge of twenty cents for the twenty cent zone, and a base charge of fifteen cents for the fifteen cent zone. Under this arrangement, it is unnecessary to provide any of the stationary contacts for the three zones until the five minute position of the rock shaft and arm is reached, at which position the first stationary contact for each of the three zones is located. Thereafter successive step contacts of the stepping switch are connected to successive groups of the stationary contacts, according to the relationship already explained. Under this arrangement also, if the timer is designed to provide for a maximum of thirty minutes of extra time, by extra pre-payments, corresponding to thirty-five minutes from the starting position, it is evident that such thirty-five minute time lapse (including a maximum of thirty minutes of extra time) will require the insertion of $1.50 of extra-pay money, in the case of the twenty-five cent zone, and will require the insertion of $0.90 of extra pre-pay money, in the case of the fifteen cent zone, corresponding to 18 steps of the stepping switch. It will presently appear that provision has been made for producing one pulse for operation of the stepping switch, corresponding to each five cents of prepay money, whether such prepay be the original payment for the base time, or a prepay for extra time. Thus, insertion of a dime into the coin receiving unit will produce two pulses for delivery of corresponding pulsed steps to the stepping switch.

The primary and secondary contacts carried by the sweep arm are connected, by means of suitable connections, such as flexible leads, to circuitry by which the functions to be controlled by signals from such contacts, are thus properly controlled. Such circuitry will be disclosed hereinafter.

Conveniently the means to drive the rock shaft and the arm during time counting intervals, comprises a constant speed motor, together with gear or friction wheel drive connections from such motor to the rock shaft. By using a friction wheel drive in such connections, it is possible to effect clutching and unclutching operations by slight shifts of the driven element (comprising the friction wheel mounted directly on the rock shaft, together with such rock shaft and the sweep arm) back and forth, into and out of engagement with that friction wheel which is the driver and directly connected to the motor shaft. Such slight back and forth movements, while sufficient to produce the desired engagement and disengagement operations, are not sufficient to appreciably affect the needed accuracy of time count operations. Preferably, also, the disengagement of such clutching means comprises a spring, so that by use of a magnet to produce engagement when such magnet is energized, disengagement of the parts will occur automatically upon deenergizing such magnet.

Conveniently the stepping switch is one which includes a ratchet connected to the rotatably mounted element which carries the sweep contacts of the stepping switch, together with a hold-back pawl element engaging such ratchet to prevent any backward movement thereof. Since the time counting operation may be controlled for any number of steps of the stepping switch corresponding to the zone of the called station, and also corresponding to the amount of extra time for which prepayment is made, it is clear that, upon completion of any call such stepping switch may be, and probably will be, at a position other than the zero or starting position of such switch. Accordingly, I have made provision for restoring such switch to its starting or home or zero position at completion of each calling operation by a self-energizing pulse operation of the switch, which may be termed a "buzzer" operation. This buzzer operation will commence at completion of the call, and will continue until such stepping switch has rotated its sweep contact carrying element around to the zero position, whereupon another switch of the circuitry will be opened to terminate such self-pulsing operations. This will leave the switch at its zero or home position, ready to commence operations corresponding to insertion of pre-pay coins for a succeeding operation of calling.

In connection with the foregoing provision for return of the stepping switch to its zero or home position, I have also made provision for releasing the clutch at completion of such switch returning movement, to thus permit return of the sweep arm and rock shaft to its zero or home position, preparatory to use of such elements during a succeeding calling operation.

Referring now to FIGURES 26 to 37, inclusive, the following description of the timer unit thus described in general terms, is applicable:

A contact supporting plate 148 of insulating material carries the three sets of stationary contacts 149, 150 and 151, for the twenty-five cent zones, the twenty cent zones, and the fifteen cent zones, repectively. These sets of contacts are included in circular arcs drawn about a center of the plate 148, which center is defined by the opening 152 shown in various of the figures. The rock shaft 153 extends through such opening, the opening being of larger size than such rock shaft to accommodate slight lateral displacements of the shaft (and the sweep arm 154 secured thereto) during the clutching and unclutching operations, presently to be described. An adjustable stop 155 in the form of a stud threaded through a bracket 156 supported by the plate 148 limits the returning movement of the sweep arm and the rock shaft at the zero or home position of said parts being the zero time position from which time of the completed call is to be measured. It is here noted that such sweep arm and rock shaft are shown at their said home positions in various of the figures; and that time is counted by counterclockwise rock of said parts when viewed as in FIGURE 26 as shown by the arrow.

It is also seen from examination of FIGURE 26 that the first one of each of the sets of stationary contacts, 149, 150 and 151, being the starting contacts 157, 158 and 159, respectively, are all located at a position somewhat above (in FIGURE 26), the illustrated home position of the sweep arm. Such sweep arm carries the primary contact elements 160, 161 and 162, corresponding to the stationary contact groups 149, 150 and 151, respectively, and also carries the secondary contact elements 163, 164 and 165, also corresponding to the stationary contact groups 149, 150 and 151, respectively. These primary and secondary contacts extend down (towards the surface of the plate 148) and at an angle, so that as the sweep arm moves during its time counting and returning movements, a good engagement of each of such contacts 160 to 165 is produced against the stationary contacts to be thereby engaged. It is now noted that all of the stationary contacts lying at the right-hand or beginning position in FIGURE 26, and there designated by the digit 5 (minutes), are aligned substantially on a radial line from the axis of rotation. Also, that all three of the secondary contacts are of such lengths and so aligned that they will simultaneously engage with such just mentioned contacts of the three groups, 149, 150 and 151, so that, as the sweep arm reaches its position produced by lapse of 4¼ minutes from start, all of such secondary contacts engage such first stationary contacts of the three groups simultaneously. It is also seen that all three of the primary contacts are of such lengths and so aligned that they will simultaneously engage with such just mentioned contacts of the three groups, 149, 150 and 151, at the time the sweep arm reaches its 5 minute position, counting time lapse from the start of the operation.

The contacts 163, 164 and 165, secondary contacts, are connected by flexible leads to the circuitry presently to be explained, in such manner that engagement of that one of such secondary contacts which corresponds to the zone which includes the called station, and for which the base prepay has been made, engages such first or 5 minute contact, a warning signal is given to the caller, signifying that the originally pre-paid time of five minutes is approaching termination. At conclusion of the 5 minute interval, the primary contacts 160, 161 and 162 will engage such first stationary contacts; such primary contacts being connected by flexible leads, to the circuitry, in such manner that the call will be automatically terminated, unless prepay has previously been made for extra time.

It is here noted that the warning signal must be given prior to engagement of the primary contact 160, 161, or 162, with the next stationary contact of the series, to avoid conflict of signals emitted by the two sets of primary and secondary contacts. By using a warning signal time interval less than the time needed for the sweep arm to move the angular distance between successive stationary contacts, such conflict of signals is avoided. In the embodiment herein disclosed the warning signal is emitted forty-five seconds prior to expiration of the previously pre-paid time, whereas the time interval between successive stationary contacts is established as one minute.

As the sweep arm progresses beyond the 5 minute position the secondary contact 165 for the twenty-five cent group of stationary contacts will engage the next stationary contact of such group, followed by engagement of the primary contact 162 with such stationary contact, such stationary contact being one minute beyond the 5 minute contact, or at the 6 minute elapsed time position. If a prepay (of one nickel) had been made prior to engagement of such primary contact 162 with such additional one minute contact, a further extra minute of the call would be permitted without interruption. If more than one nickel had been inserted into the coin receiving unit, being a multiple of five cents, the time extension would have been proportionately longer, according to the charge of five cents per minute of additional time. Thus, when the called station is in a twenty-five cent zone, the circuitry is such that proper warning and cut-off signals are produced, as needed, by engagement of the primary and secondary contacts 162 and 165 with the stationary contacts of the group 149. Although, during such twenty-five cent zone operations the primary contacts 161 and 160, and the secondary contacts 164 and 163 are successively engaging the stationary contacts of the corresponding groups, still, under the condition that the call was made to a station of a twenty-five cent zone, and prepay was made to meet the base pay of twenty-five cents, the circuitry presently to be described is such that such engagements of such other primary and secondary contacts with stationary contacts will not interfere with or affect the intended and desired operations within the twenty-five cent zone. This condition of non-interference between the circuitries for the several zones is also of importance for the following reason:

Although the time intervlas between successive contacts of the twenty-five cent group, 149, that is, the intervals for travel of the rock shaft and arm from contact engaging position to contact engaging position, are all of one minute each, such time intervals for travel of said parts from contacting position to contacting position, for the two groups 150 and 151, are not one minute each; rather, for the group 150, the twenty cent zone group, they are one and one-quarter minute each, and for the group 151, the fifteen cent zone group, they are one and two-thirds minutes each. Therefore, as will presently appear, the primary and secondary contacts of all three groups do not simultaneously engage contacts of their respective groups, during a large swing of the rock shaft and arm, except at the successive five minute positions. Thus, it is noted that in the case of the group 149, there are five spaces between successive five minute contact positions, in the case of the group 150 there are four such spaces between successive five minute contact positions, and in the case of the group 151 there are three such spaces between successive five minute contact positions.

Below the plate 148, and connected thereto by suitable studs, there is a second base plate 166. The rock shaft 153 is tubular and is set down onto a stud 167 which has a flange 168 secured to its lower end. Such flange is secured to the face of a rock arm or bar 169. A stud 170 extends through both the rock bar 169 and the plate 166, having a flange 171 secured to its lower end, such flange being secured to the lower face of the plate 166, and constituting an ample rigid support for the stud 170 to retain it securely against shift with respect to such plate 166, and thus also to secure such stud against shift with respect to the plate 148. A thimble 172 is set over the stud and is secured to the upper face of the bar 169, as by welding. This thimble therefore serves as a bearing of the rock bar 169 with respect to the stationary plate 166, such bearing permitting slight rock of the bar with respect to the stationary parts, and thus allowing for slight displacement of the shaft 153 laterally of the hole 152 in the plate 148. Conveniently one end of such rock bar is extended through a block 173 secured to the plate 166, and slotted with a slot of sufficient length to permit the desired rock of the bar without interference. The opposite end portion of such rock bar (right-hand portion of FIGURE 27) is bent at right-angles and extends through a slot of the plate 166 to the opposite side thereof, extending thus to provide the lug 169$^a$ by which such rock bar is rocked in one direction. A stud 174 is secured to such lug 169$^a$, and a spring 175 has one end connected to such stud, and its other end connected to a bracket 176 secured to the face of the plate 166. The tension of such spring may be adjusted by adjustment of the nut 177 and the lock nut 178. A stop stud 179 set through the bracket 180 may be adjusted to limit the movement of the lug 169$^a$ in direction away from the observer of FIGURE 28.

A beveled edge friction drive wheel 181 is secured to the hollow shaft 153 to drive the same during time count. An enlarged hub 182 is secured to such hollow shaft; and a tension line 183 is wrapped partially around such hub, the end of such line being connected to the tension spring 184; the end of such spring is connected to an adjustable stud 185 extending through the bracket 186 secured to the plate 166. A nut 187 is threaded onto such stud to enable adjustment of the tension produced on the line 183. The foregoing parts are so related that the spring 184 urges rotation of the hollow shaft in direction to restore the arm 154 to its normal or home position. Drive of the beveled wheel in proper direction will rock the hollow shaft against urge of such spring 184 in the time count direction.

A small constant speed motor 188 is mounted on the lower face of the plate 166 (see FIGURE 29), such motor being shown in FIGURES 30 and 31, but due to the inversion of the unit in such figures the motor appears to be on the top faec of the plate 166. This motor unit includes a built in gear reducer which drives the output shaft 189, an outboard bearing element 190 supporting the projecting end of such shaft against deflection. This output shaft carries the beveled grooved wheel 191 at constant speed during motor energization. Such grooved wheel is in position such that a slight lateral shift of the beveled wheel towards the grooved wheel will produce sufficient frictional drive from the grooved wheel to the beveled wheel, to drive the shaft 153 and produce rock thereof, together with rock of the arm 154.

Examination of the so far described parts will show that the urge of the spring 175 shifts the hollow shaft 153 and connected parts, including the beveled wheel 181 in direction to carry such beveled wheel away from engagement with the grooved wheel, being the clutch disengaged position. This is the normal position of such parts.

Mounted on the plate 166 is the downwardly extending magnet element 192 (upwardly extending in FIGURES 27, 29, 30 and 31 since such figures are inverted). The armature 193 of such magnet is pivoted on the horizontally extending pin 194 set through the ears 195 and 196 of the plate 197 connected to the magnet frame 198, Energization of the solenoid 199 of such magnet will draw such armature down against a retracting force which tends to raise the armature into the position shown in various of the figures.

The lug 169$^a$ which comprises an end portion of the bar 169, is shown in FIGURES 28, 31 and 32, and others. A stem 199 extends from one side of the armature 193 to a position close to such lug 169$^a$ and close to the surface of the plate 166. To the lower end of such stem there is connected a stud 200 which aligns with and extends to the proximate edge of such lug 169$^a$. The arrangement is such that upon energization of the magnet the armature is drawn down, thus rocking such stem towards the lug 169$^a$, and forcing such lug rightwardly (when viewed as in FIGURE 31). Such rightward movement of the lug 169$^a$ results in rock of the bar 169 clockwise (when viewed as in FIGURE 32), against the tension of the spring 184, thus shifting the beveled wheel 181 into firm engagement with the grooved wheel which is driven by the motor. Immediately upon deenergization of the magnet 192 such stem 199 will be moved leftwardly by leftward movement of the lug 169$^a$, by retraction of the spring 175, with corresponding release of the bar 169 which will rock slightly counterclockwise (viewed as in FIGURE 32), to disengage the beveled wheel from the grooved wheel. Such condition of disengagement will continue as long as the magnet is deenergized. Such disengagement of the two wheels will also permit return rock of the hollow shaft 153 and the arm 154 to their base or home position as limited by engagement of such arm with the stop 155. Thus the parts will be restored to the zero time position, preparatory to a successive time counting operation.

Conveniently mounted on the plate 166 is the stepping switch designated in its entirety by the numeral 201. Such stepping switch may be of conventional form, that switch illustrated being a product of C. P. Clare & Co., of Chicago, Illinois, and illustrated in Sales Engineering Bulletin No. 121, and there designated as Type 11, Spring-driven Stepping Switch. Said stepping switch conventionally includes the magnet 202 of which the armature 203 is pivoted on the axis 204 for rock back and forth when viewed as in FIGURE 28. A rock arm 205 is connected to such armature and has pivoted to it the pawl element 206 by the stud 207 (see FIGURE 33). A stationary stop 208 limits rightward rock of such arm 205 and its pawl, under urge of a strong spring 209. Such spring's urge may be adjusted by adjustment of the stud 210 which is locked in adjustment by the lock nut 211. The pawl 206 is urged into engagement with a ratchet wheel 212 carried by the shaft element 213 of the movable contact carrier of the switch proper, presently to be explained, such urge being produced by the light spring 214. A light hold-back spring leaf 215 prevents retrograde movement of the ratchet wheel. The parts are so adjusted that whenever the magnet is energized the armature is drawn to the left (viewed as in FIGURE 33) far enough to let the pawl engage the next leftward tooth of the ratchet, such leftward movement being against the urge of the spring 209. As soon as deenergization of the magnet occurs, its armature is released, and the strong spring 209 forces such armature and the pawl rightwardly, thus advancing the ratchet wheel by spring action. Such rightward movement is limited by the stop 208 to ensure exactly one tooth distance of ratchet wheel advance, and during such one tooth advancement the light holdback spring 215 receives the next ratchet wheel tooth, to now retain the parts in such advanced position.

The stepping switch illustrated in various figures is provided with three decks of stationary contacts, and with at least one movable contact corresponding to each such deck of stationary contacts. Such three decks are shown at 216, 217 and 218 in various of the figures; and such decks of stationary contacts are stacked firmly together into a convenient unit. Each such deck carries twelve radial and inwardly extending contacts 219 (see FIGURE 28), and such decks of contacts are moulded into a corresponding block of insulating material, with connection tips of such contacts extending radially outward for convenient connection to circuitry. The first or lowest contact 220 of each deck (viewed as in FIGURE 28) extends close to the shaft of rotation and serves as a current input medium for the sweep contact or wiper of such deck, as presently to be explained. Thus eleven contacts of each deck are available for circuitry connections of output nature. It is here noted that each group or deck of contacts (twelve in number) occupies 120 degrees of arc; but that all three of the decks are in vertical alignment.

Corresponding to the three decks are the three wipers 221, 222 and 223, spaced one hundred twenty degrees apart. As the shaft element rotates each such wiper in turn contacts the eleven stationary contacts of its deck, the twelfth stationary contact comprising a current input brush as already explained. Reference to FIGURE 35 shows that the shaft element includes the tubular member 213, onto which is set the insulating tube 224. Set onto such tubular member 224 are, in succession, the insulating disk, 225, the metal sleeve 226, the insulating disk 227, the metal sleeve 228, the insulating disk 229, the metal sleeve 230, and the insulating disk 231. The tubular member 213 is provided with the shouldered enlargement 232 at its lower end, and a block 233 is set down onto such enlargement prior to assembling the various elements 224 to 231 onto the insulating tube and the tubular shaft element 213. After the foregoing parts have been assembled as shown in FIGURE 35, the insulating block 234 is set onto the stack, and finally the nut 235 is threaded onto the upper end of the tubular element 213, and drawn up tight. Thus, an assembly is produced which includes the three metal sleeves 226, 228 and 230, insulated from each other and from exterior conducting parts. The three wipers 221, 222 and 223 extend out from these three sleeves, being angularly displaced from each other as indicated in FIGURE 39.

The three input contacts for the three decks of contacts are designated 236, 236$^a$ and 236$^b$, and are shown by the arrows thus numbered in FIGURE 35. The arrangement of such stepping switch is thus such that, during the first third rotation of the wiper unit the stationary contacts, eleven in number of the top deck are electrified (through input from the brush 236), during the second third rotation of the wiper unit the secondary contacts, eleven in number of the middle deck are electrified (through input from the brush 236$^a$), and during the third portion of the rotation of the wiper unit the secondary contacts, eleven in number of the bottom deck are electrified (through input from the brush 236$^b$). Thus, at completion of the full 360 degrees of rotation of the wiper unit, all of the secondary contacts, 33 in number, of all three decks, have been successively electrified, and such wiper unit has returned to its base or home position, preparatory to a later operation.

The block 233 of FIGURE 35 may be the ratchet wheel 212 of FIGURE 33, or connected directly thereto. Thus, the delivery of successive pulses to the magnet 202 will produce successive advances of the wiper unit, corresponding to single teeth of the ratchet wheel.

The block 234 of FIGURE 35, is provided with a single high point 237 (see FIGURE 28), and such high point is shown in FIGURE 28 as standing at the base or home position of the wiper unit. The leaf spring contacts 238 and companion stationary contacts 239 and 240 at the sides of such spring leaf contact, are supported by suitable insulating block elements in position adjacent to the wiper unit. Such support is at location such that the high point 237 will engage the free end of the contact 238 just as the home position of the wiper unit is attained, thus forcing such contact 238 outwardly into engagement with the contact 240, and away from the contact 239 with which such contact 238 was formerly engaged, during the rotational advances of the wiper unit. These contacts comprise portions of the circuitry, presently to be described; and the movement of the wiper unit to its home position, with reversal of such spring leaf contact will produce signals to terminate certain operations.

Another spring leaf contact, 241 is supported by insulating means between the two stationary contacts 242 and 243 (see FIGURE 28), being normally in engagement with the contact 242. The armature 203 of the magnet 202 is connected to an extension 244 which reaches to a point close to such spring leaf contact 241, such extension being provided with an insulating terminal stud 245 which engages such spring leaf contact. This arrangement is such that while the magnet is unenergized such stud 245 releases the spring leaf contact to allow the same to retain its normal position of engagement with the stationary contact 242; but each time the magnet is energized, with corresponding shift of its armature, such arm is also shifted to move the spring leaf contact away from such contact 242 and into engagement with the contact 243. The circuitry is provided with means, including these contacts, such that, after a time counting operation has been concluded, and the units, including the stepping switch 201 are to be brought to their base or home positions, a circuit is produced which includes both the contacts 238 and 239, and the contacts 241 and 242, such that a pulsing operation is automatically produced, delivering successive pulses to the magnet 202 for a series of rapid stepping advances of the wiper unit until such unit reaches its base or home position. Thereupon such pulse delivering circuit will be opened by the shifting of the leaf contact 238 away from the contact 239, with the stepping unit in its home position. In connection with this operation it will be understood that for any completed circuitry opeartion the stepping switch will have been advanced at least to the five minute position; and in case of payment for excess time intervals, to a further position, not to exceed a total of thirty-five minutes. In any case, however, some further rotary advancing of such wiper unit will be necessary to bring it to its home position, and such further advancing will be produced, under proper control, by means of the self-pulsing operation just explained.

In various of the figures I have shown a connecting strip 246 supported by the plate 166. This connecting strip may be used as a convenient means for effecting connections between various of the terminals of electric elements of the timer unit, either to other terminals of such unit, or to terminals of other units of the circuitry.

*Timer internal connections*

Reference is now made to FIGURE 37 which shows the connections of the contacts of the timer to each other, and to directly related components of the timer unit. In this figure the contacts 219 are shown, for the three decks, alongside of each other in developed form. The stationary contacts for each deck are shown within a circular arc embracing 120 degrees; and the three wipers 221, 222 and 223 are shown extending radially outwardly from the wiper shaft carried rings 230, 228 and 226, respectively. The input contacts or brushes to such rings are shown at 236, 236$^a$ and 236$^b$. The wiper shaft is shown at its base or home position. Rotation will be in the direction shown by the arrows. Under these conditions, the following sequence of wiper engagement with such stationary contacts (corresponding to successive pulses deliveerd to the magnet 202), will occur. First the successive contacts 219 of deck No. 1 (lower deck) will be engaged by the wiper 221, thus successively engaging 11 of the contacts 219, and, as such wiper leaves such eleventh contact it has advanced through 120 degrees of movement. On the next received pulse to the magnet 202, the wiper 222 for the middle deck, No. 2, will engage the first one of the series of eleven contacts of the middle deck; and successive pulses to the magnet 202 will advance such wiper successively to the eleven contacts of its deck. Likewise, the next pulse to such magnet will bring the wiper 223 into engagement with the first (lowermost) contact of deck No 3, with successive pulses advancing such wiper until the eleventh contact of deck No. 3 has been engaged. The next pulse will return the parts to their base or home position, it being noted that a number, probably most, of the pulses will be produced by the self-pulsing operation, depending on how many extra coins (of nickel denomination) have been inserted into the coin receiving unit, for extra time. At conclusion of the above operations the cutoff of pulsing will occur.

It is here noted that all of the input brushes 236, 236$^a$ and 236$^b$ are connected together by the strap line 247, to which input current is supplied by the circuitry.

Next it remains to disclose how the stationary contacts 219 of the decks are connected to the stationary contacts 149, 150 and 151 of the timer, shown in FIGURE 26, and in the development of FIGURE 37. First, I will explain that each of the stepping switch contacts 219 of the three decks corresponds to the prepayment of a specified total amount of money. Thus, the base contacts 157, 158 and 159, of FIGURES 26 and 37, correspond to prepayments of twenty-five cents, twenty cents, and fifteen cents, respectively, depending on the zone to which the call is being made. Also, that each step of the stepping switch from such initial position, is made upon deposit of specified coin, such as a nickel, to enable extension of the call time beyond such prepaid interval by a time interval depending on which area or zone is being called. It has already been shown that each such additional nickel entitles the caller to one additional minute for a call to the twenty-five cent zone, that each such additional nickel entitles the caller to one and one-quarter minute additional time for a call to the twenty cent zone, and entitles the caller to one and two-thirds minutes additional time for a call to the fifteen cent zone. But the time counting arm 154 advances at uniform speed during timing of the call in any such case. Accordingly, the contacts of the three groups 149, 150 and 151, which correspond to the twenty-five cent zone, to the twenty cent zone, and to the fifteen cent zone, respectively, are connected to the successive contacts 219 of the stepping switch in the manner shown in FIGURE 37. Thus, the first contact 219 (at the bottom of the deck No. 1 series in FIGURE 37), connects straight over to the 5 minute contacts of all three groups, 149, 150 and 151, since the base times for all the zones are assumed to be 5 minutes in each case. Then, the next stepping switch contact 219 of the series, connects across to the 6 minute contact of the group 149, to the 6¼ minute contact of the group 150, and to the 6⅔ minute contact of the group 151; then the next contact of the stepping switch series 219 connects across to the 7 minute contact of the 149 group, twenty-five cent group, to the 7½ minute contact of the group 150, twenty cent group, and to the 8⅓ minute contact of the group 151, fifteen cent group. Accordingly, if the caller's call is to, say, the fifteen cent group, he shall be entitled to 3⅓ minutes extension of time by extra payment of two nickels, or a dime. Thus, in such case cutoff will not occur until a total time lapse of 8⅓ minutes, including the original payment, plus the extra time payment or payments.

It is not deemed necessary to describe the further connections between the various contact groups shown in FIGURE 37, as the principle on which the unit operates will now be evident.

The circuitry presently to be described includes units or components connected to the several warning signal brushes 163, 164 and 165, for the three zones, so that as soon as the warning signal brush which corresponds to the zone which was called comes into engagement with that contact 157, 158 and 159, or 149, 150 or 151, for such zone, which contact is at the time electrified by the stepping switch operation, a signal will be passed to the warning element (such as a lamp 245$^a$), to give the desired warning at the predetermined time interval, such as forty-five seconds, prior to expiration of such pre-paid time interval. This allows the caller ample time to make a further prepayment, should he desire to do so.

If no extra prepayment has been made by the time the brush 160, 161 or 162, as the case may be, comes into engagement with such so-electrified contact of the group 157, 158 or 159, or 149, 150 or 151, being the final cutoff brush for the zone then in use, a signal will be given through such brush, to discontinue the operation, cutting off the called station, and returning various components to their base or home positions or conditions, preparatory to the placing of a subsequent call.

When such cutoff occurs the circuitry will be altered to deliver a signal to the proper element to terminate energization of the magnet 192, thus permitting unclutching of the drive to the rock shaft 153, and permitting return of that shaft and the arm 154 to their base or home positions. These operations include the following:

A special contact 248, shown by dotted lines in FIGURE 29, and also shown in FIGURE 37, is located just beyond the high time count position of the timer unit, connected to the high point contact 463 of the stepping switch, deck No. 3, by a lead 249, and a lead 250 is carried from such high point contact 248 to the coil of a "Clutch Release Relay" 251, so that such relay is activated at the high point step of the stepping switch. (If desired, such special contact 248 of the timer unit and such line 249 may be eliminated, and connection made directly from the high point contact of the stepping switch to such relay coil, this arrangement being indicated by the dotted line 252 in FIGURE 40 connecting such high point contact of the stepping switch directly to such relay coil.) In either case, when the stepping switch attains its high point, just before cut-off of such switch, such high point generally being attained by the self-pulsing operation already referred to, the clutch relay will be activated, to discontinue the clutching operation by release of such clutch, thus permitting the rock shaft and arm 154 of the timer to be returned to their base or home positions by urge of the spring 184. In connection with the foregoing operation it is noted that in the relationship of elements shown in FIGURE 40, the high time count position of the parts (including the high pre-pay position of the stepping swtich) is attained prior to use of all of the steps of such stepping switch which are available. Thus there remains at least one of the high stepping switch positions available for production of the foregoing operation.

*Coin counting and control equipment*

The presently disclosed equipment includes a unit or units to receive the pre-pay coins, register the amount of prepay, signal such amount to proper components of equipment, hold such pre-paid amount, compare such amount with the base charge of the called station from the calling station, and reject such pre-paid amount in case it is less than such base amount, or hold such pre-paid amount while the call to the called station is completed, or reject it if such call is not completed; and, finally, to collect the pre-paid amount at completion of the call. Additionally, this equipment is such that if a further prepayment or prepayments is or are made for extra time intervals, such equipment shall determine the amount of such extra payment, and make provision for extension of the time interval thus prepayed. Conveniently, certain components of such equipment comprise a coin collecting device such as the Type 7207 Accumulator, manufactured by National Rejectors, Inc., of Chicago, Cook County, Illinois. I do not limit myself to such particular equipment, however, except as I may do so in the claims to follow; but I contemplate other equipment suitable for the present needs and functions.

Figure 1:
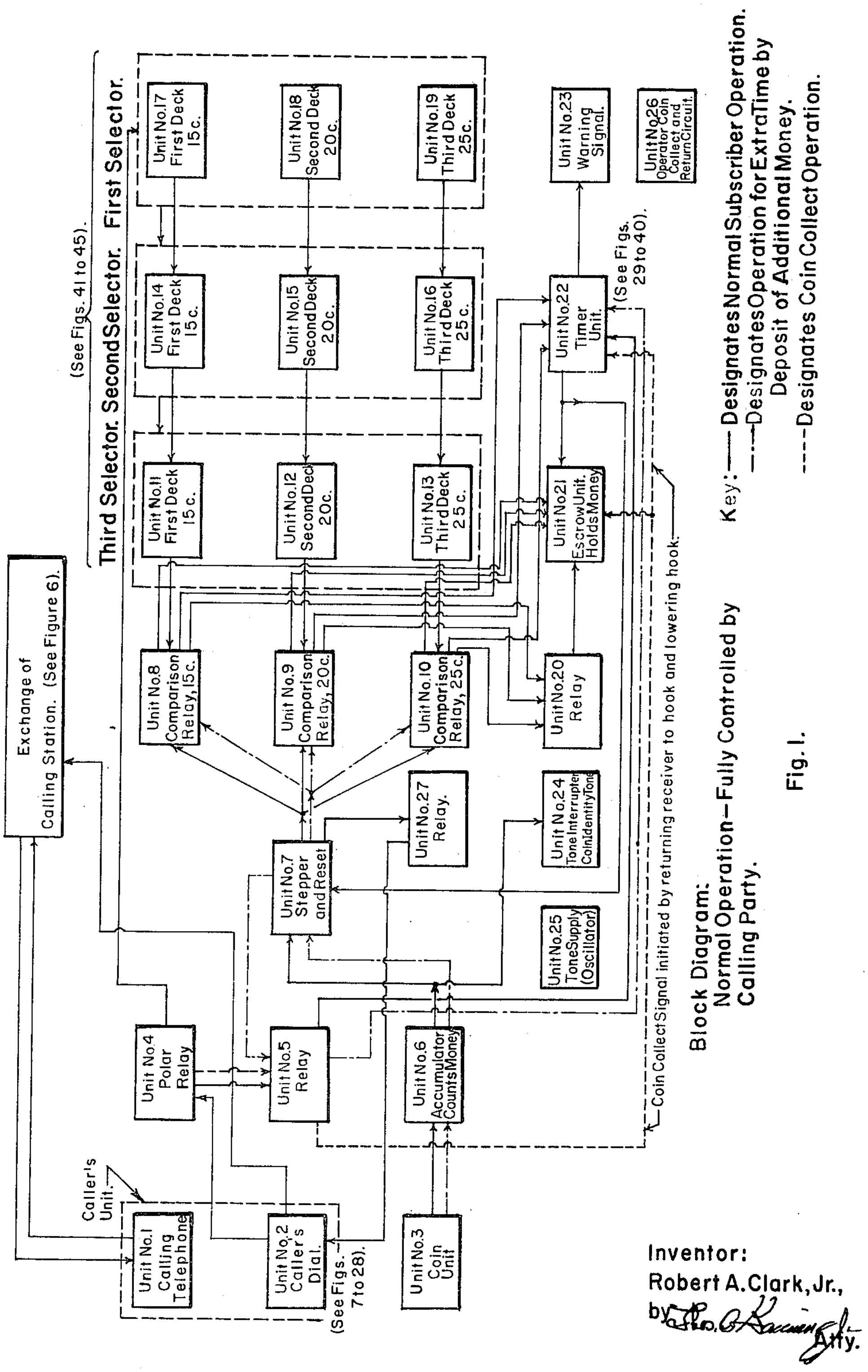
FIGURE 1 shows a schematic block diagram of one embodiment of the principal units of the present invention, when the units of such embodiment are used for dialing the called station directly by the calling party, and without intervention of the operator of the exchange from which the calling station is deployed; and in this figure the directions of the signals from one unit to another or others is or are shown by the arrow heads on the connecting lines.
Figure 2:
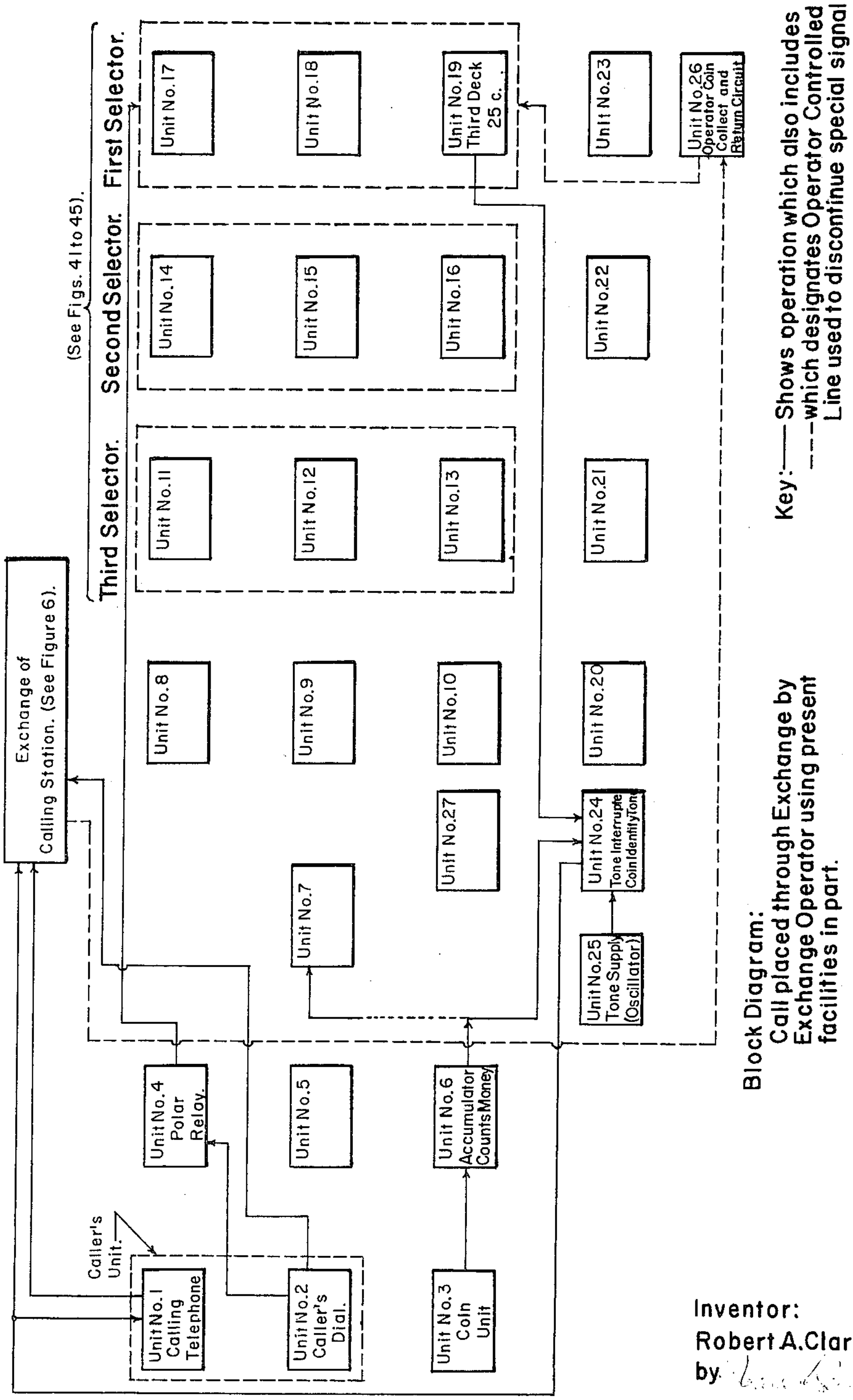
FIGURE 2 shows a schematic block diagram of the equipment shown in FIGURE 1; but in the present illustration such equipment is being used under the condition that the exchange operator has intervened and is performing the actual operations of calling the called station, and checking the deposit of coins of sufficient amount in value to comply with the base prepay charge between the calling and called stations.
Figure 3:
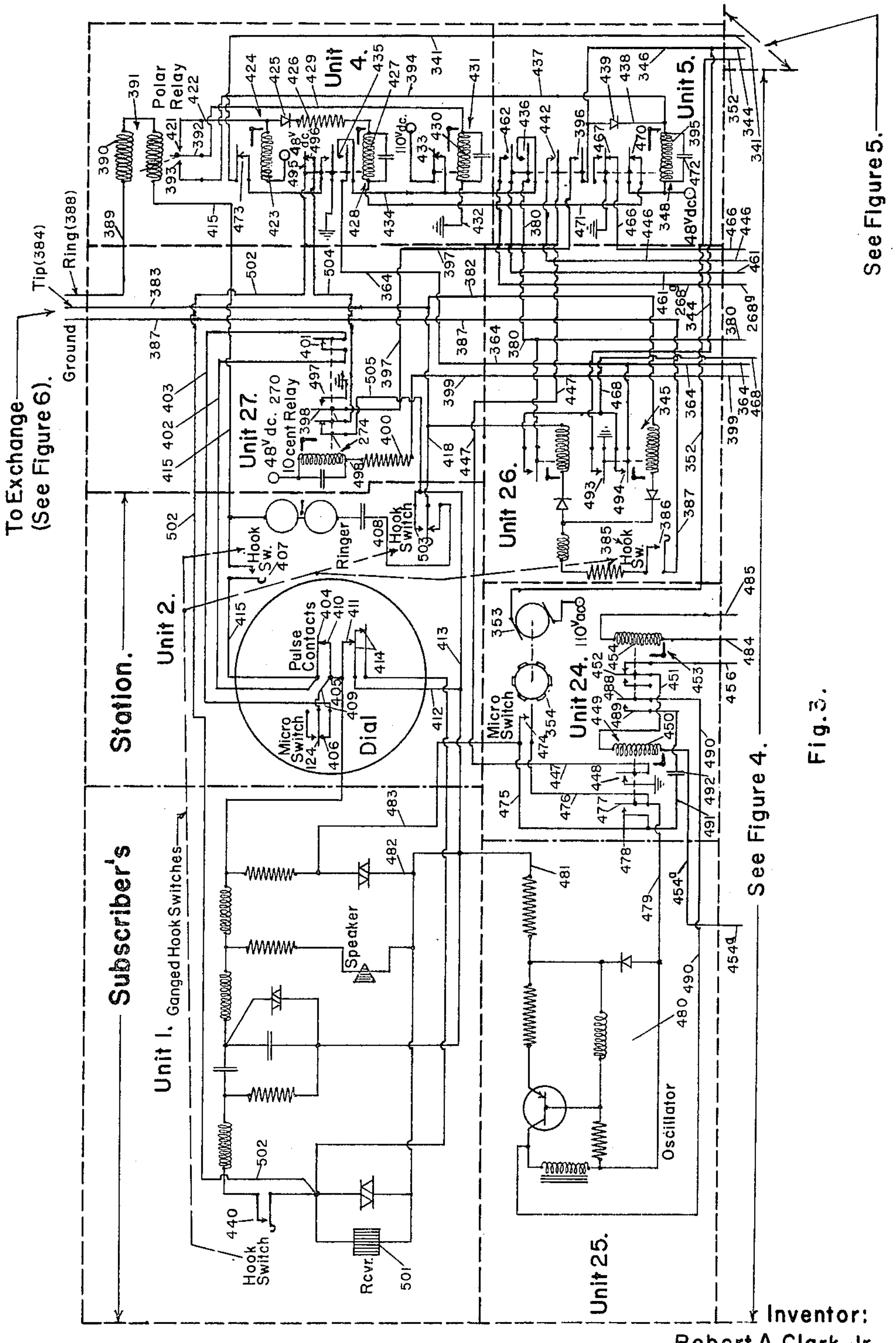
FIGURE 3 shows a wiring diagram of one embodiment of a portion of the complete equipment at the calling station, the wiring diagram of this figure being a portion of the total, and being usable in connection with the partial wiring diagrams of FIGURES 4 and 5.
Figure 4:
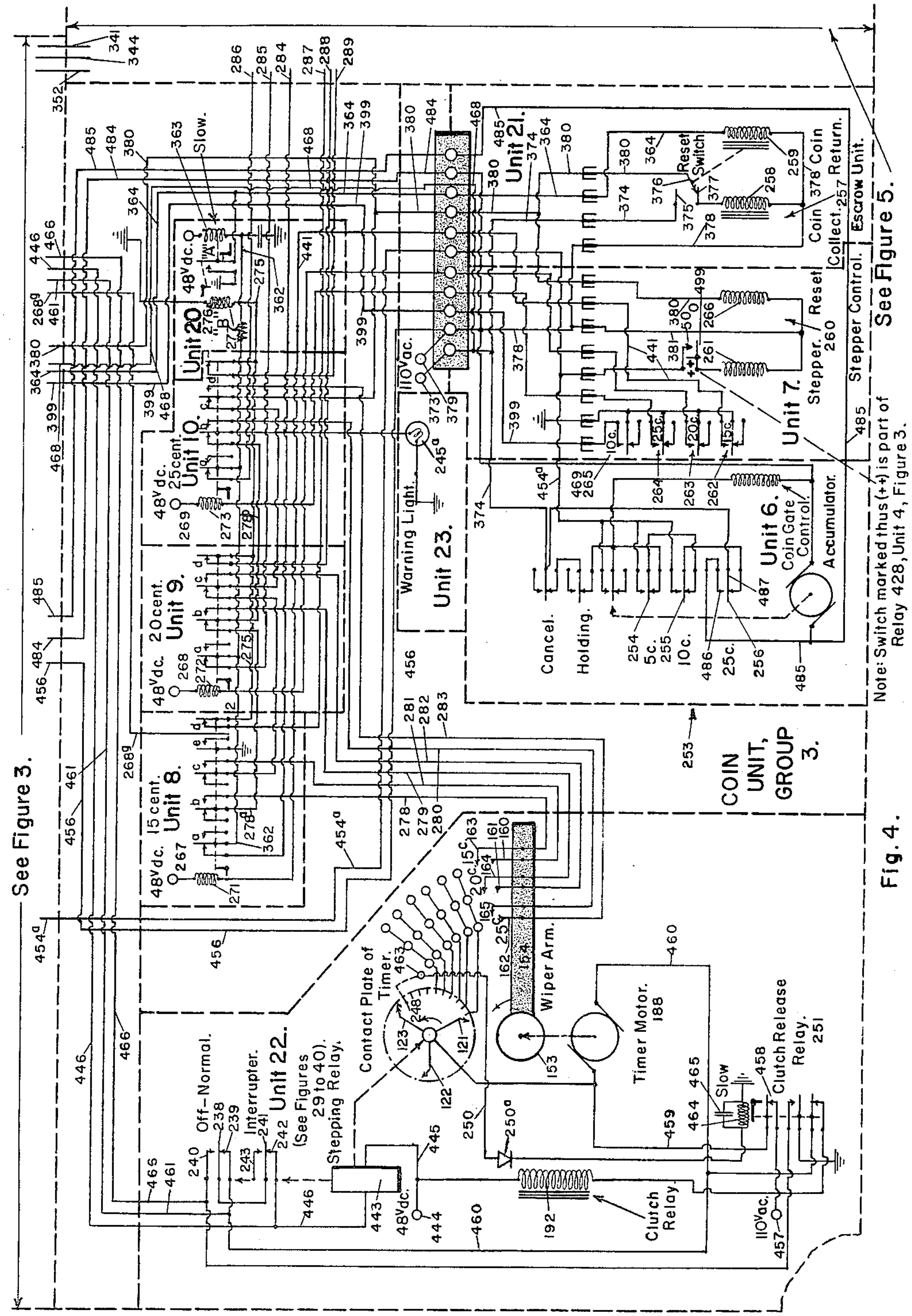
FIGURE 4 shows downward a continuation of the wiring diagram shown in FIGURE 3, being a portion of the wiring diagram directly below that shown in FIGURE 3; and this

It is not deemed necessary to illustrate the detailed construction of the coin unit group of components which is to be used; but in the circuitry presently to be described, shown in FIGURES 3, 4 and 5 which are sections of the total circuitry, I have shown, at 253 a group of components which, when using the circuitry shown in said figures, or equivalent circuitry, will produce the functions outlined just above. This section, 253, includes portions designated as Units 6, 7 and 21, the section 253 as a group being designated as 3. Unit 6, designated as "Accumulator" includes several switches 254, 255 and 256, corresponding to coins of five cent, ten cent, and 25 cent denominations, inserted into the coin receiver. Each of these switches will pass a signal corresponding to the coin of its denomination inserted, such signal actuating or activating other components of the circuitry. In case of need for prepay of amount greater than ten cents, by insertion of a combination of coins, the arrangement is such that a pulsed signal will be passed corresponding to each nickel beyond the denomination of the first inserted coin, up to a total of pulses corresponding to the number of nickels divided into such total requirement. In case of insertion of a ten cent piece two such pulses will be delivered; in case of insertion of a quarter, five such pulses will be delivered.

The so-inserted coins are received into an "Escrow" unit 257 in which they are held until it is determined that not enough coin value has been inserted to at least equal the base charge for the zone which includes the called station, or until it is determined that no answer is given to the call, or until the call has been completed and the caller's receiver is hung up on the conventional receiver hook; or until the pre-paid time interval has been fully consumed, so that the corresponding brush contact 162, 161 or 160 has come into engagement with the corresponding stationary contact of the timer unit, which stationary contact has been electrified by the steps of the timer's stepping switch corresponding to the total amount of money prepaid. In case the call has been completed by answering of the called party, at completion of such completed call the magnet 258 of the escrow unit 257 will be energized, to cause the previously inserted coin or coins to be collected into the collect coin receptacle. If, on the other hand, not enough money value of coins has been inserted to correspond with the base charge for the zone to which call is being made, the coins will be returned; or if, after calling the intended station no answer is made, so that the caller hangs up his receiver, the call being uncompleted, the inserted coin or coins will be returned by energization of the magnet 259 of such escrow unit 257.

The pulses previously referred to as corresponding in number to the number of nickels inserted into the coin receiver, are delivered to a component designated as Unit 7 in FIGURE 4. This Unit 7 includes a stepping switch 260 (not shown in detail but shown schematically in such figure). Such stepping switch 260 includes the stepper magnet coil 261 by which such switch is advanced one position upon receipt of each pulse from the switches 254, 255 and 256, corresponding to payments of five cents each. Thus, upon receipt of three pulses to the magnet coil 261, such stepping switch will advance to close the switch 262 corresponding to insertion of coins of the value of fifteen cents; upon receipt of four pulses to such magnet coil, such stepping switch will advance to position to close the switch 263 corresponding to insertion of coins of the value of twenty cents; and upon receipt of five pulses to such magnet coil, such stepping switch will advance to position to close the switch 264 corresponding to insertion of coins of the value of twenty-five cents. A further switch 265 of such stepping switch unit will be closed upon receipt of two pulses by such magnet coil 261, corresponding to a conventional ten cent call.

The stepping switch 260 of Unit 7 is also provided with a reset magnet 266 which, when energized, causes the stepping switch 260 to reset to its base or home position, preparatory to a succeeding calling operation.

*Comparison relays and functions*

There are what may conveniently be called a set of "Comparator" relays for the fifteen cent, the twenty cent, and the twenty-five cent switches 262, 263, and 264 just above referred to; and also a relay for the ten cent switch 265. These are the relays 267, 268 and 269, of the Units 8, 9 and 10, of FIGURE 4, and the relay 270 of the Unit 27, of FIGURE 3. Suitable connections are established between the switches 262, 263 and 264, and the magnets 271, 272 and 273 of such relays 267, 268 and 269, respectively; and between the switch 265 and the magnet 274 of the relay 270; such connections serving to energize the magnets of the respective relays when such switches 262, 263 and 264, and 265, are thrown into energizing positions.

It will now be evident that when coins amounting to twenty cents, for example, have been inserted into the coin receiving unit, the effect is to close the corresponding relay of such group of units (being, specifically, the relay 268 of Unit 9), thus reversing the tongues of such relay to establish corresponding circuitry closures. By closing such relay I mean shift of its magnet controlled element from its biased position into its non-normal position against its biasing which position it will then retain as long as its magnet is energized. Each of such relays 267, 268 and 269 is provided with four tongues *a*, *b*, *c* and *d* (being referred to as $267^a$, $267^b$, $267^c$, $267^d$, and $268^a$, $268^b$, $268^c$, etc.; and relay 267 of Unit 8 also includes a fifth tongue *e*. These tongues are biased to stand normally leftward (viewed as in FIGURE 4), and are shifted rightwardly when their magnet coils are energized. In their normally biased leftward positions such tongues *a* engage contacts connected to lines leading to other components; and such tongues *d* also engage contacts connected to a common line 275 leading to the magnet 276 of another relay 277, Unit 20. This relay 277 is purposely circuited for a time delay or slowed in its operation for a reason presently to be explained.

The relay 267 of Unit 8 is the "fifteen cent" relay, the relay 268 of Unit 9 is the twenty cent relay, and the relay 269 of Unit 10 is the twenty-five cent relay, as legended in FIGURE 4. The right-hand contacts for the tongues *b* of these relays connect, by the lines 278, 279 and 280, respectively to the warning brushes 163, 164 and 165 of the timer unit; and the right-hand contacts for the tongues *c* of these relays connect, by the lines 281, 282 and 283, respectively to the "cutoff" brushes 160, 161 and 162 of the timer unit. Accordingly, the warning signal and cutoff brushes of that pre-pay section of the timer unit (either fifteen cent, twenty cent or twenty-five cent) which correspond to the switches position of the stepper switch 262 (either fifteen cent, twenty cent or twenty-five cent) previously set by the signals of amount of coin prepay from the coin receiver switches 254, 255 and 256, will be conditioned to receive and pass signals to other components of the equipment when the timer has counted time to the timer contacts 151, 150 or 149, corresponding to the amount of such prepay which had been made. It is also to be noted that during the prepaying operation each of the switches 262, 263 and 264 of Unit 7, for fifteen cents deposit, twenty cents deposit and twenty-five cents deposit, respectively, will be closed up to the amount of the pre-pay for the zone in question, and will remain closed until proper release occurs by energizing of the reset magnet 266 of the Unit 7, up to the zone amount for which pre-pay was demanded. Thus, in the case of a twenty cent zone, both the fifteen cent and the twenty cent switches will be closed, and will remain closed until such purposeful release occurs. Therefore, such fifteen cent relay, 267 of Unit 8, will remain closed, once having been closed, until termination of the operation by energization of the reset magnet 266. A like condition will also be true of the twenty cent relay 268 of Unit 9, for the stated condition of deposit of twenty cents of pre-pay money.

Accordingly, since the fifteen cent relay 267 will always be closed for prepay for the requirements of any of the three zones (fifteen cent, twenty cent, or twenty-five cent), and will remain closed until purposeful termination of the operation, the contacts *e* of such fifteen cent relay 267 will remain closed for the duration of the operation, and will open by de-energization of the magnet coil 271 at termination of such operation. Likewise, for a twenty cent pre-pay both of the relays 267 and 268 will be closed and will remain closed until termination of the operation; and for a twenty-five cent prepay all of the relays 267, 268 and 269 will be closed and will remain closed until termination of the operation.

*Protection against false signal from lower pre-pay zone than the zone of prepay*

Now, although, as stated earlier in this study, the lines 278, 279 and 280 lead from the three relays to the corresponding brushes 163, 164 and 165 for the warning signals, and the lines 281, 282 and 283 lead from the three relays to the corresponding brushes 160, 161 and 162 for the cutoff signals, still, leaving the relays of lower denomination than the amount pre-paid in their closed positions does not deliver electrification to any of such warning signal or cutoff signal brushes but only delivers electrification to the brushes corresponding to the pre-paid amount of higher denomination, for which higher denomination the high pre-pay amount was made. Thus, the warning signal and the cutoff signal will not be delivered until that time has elapsed which corresponds to the prepay of the higher amount, and the pre-paid time covered thereby.

The functions just above referred to are secured by the following features of circuitry, shown between the successive relays 267, 268 and 269:

The tongue *b* of relay 267 connects by the line $278^a$ to the left-hand contact *b* of relay 268; and the tongue *b* of relay 268 connects by the line $278^b$ to the left-hand contact *b* of relay 269. Thus, for example, when the prepay of twenty-five cents has been made the warning signal line 278 for the fifteen cent zone has been broken at the *b* contact-tongue position of relay 268; and the warning signal line 279 for the twenty cent zone has been broken at the *b* contact-tongue position of relay 269; but the warning signal line 280 for the twenty-five cent zone is completed at the contact-tongue position *b* of relay 269. Accordingly, only the warning signal line corresponding to the twenty-five cent zone will be complete to the warning light $245^a$ of unit 23 (FIGURE 4).

Provisions similar to those just above explained have also been made respecting electrification of the lines 281, 282 and 283, for the cut-off signals, so that only that line which corresponds to the time zone for which prepay has been made will be completed to the corresponding cutoff brush of the timer unit.

*The zone selector stepping switches*

It was previously stated that the tongues *a* of the relays 267, 268 and 269 normally engage contacts connected to lines leading to other components. It is also true that the tongues *d* of such relays normally engage contacts connected to lines leading to other components. The said contacts to which the tongues *a* normally engage, connect by the lines 284, 285 and 286 to elements of the "Selector Units." It is also true that the contacts to which the tongues *d* of such relays normally engage, connect by the lines 287, 288 and 289 to elements of said selector units. Such selector units include stepping switches having decks of stationary contacts corresponding in number of the decks to the number of areas or zones for which provision has been made in the equipment, and also additional decks for other purposes as will presently appear. Each such deck of stationary contacts includes a sufficient number of such contacts to take care of the number of steps which may be produced by the dialing unit, including the 0 position previously explained herein. There is a number of such selectors to correspond to the number of digits (generally three) contained in the identifying code number of the exchange to which the called station is connected. Thus, the code number BU8 or 288 includes three digits; and accordingly, three selectors are included in the selector unit.

Reference is now made to FIGURES 38, 39, 40, 41 and 42 and to the typical strappings between the selectors are shown in FIGURES 43, 44 and 45, corresponding to the various exchange code numbers or identifications to be served.

The three stepping switches 290, 291 and 292 are conveniently mounted on the base plate 293. These are respectively the first, second and third selectors; the first digit of the identification being registered by a number of steps of the first selector corresponding to the digit position of the first identifying character, the second digit of such identification being registered by a number of steps of the second selector corresponding to the digit position of the second identifying character, and the third digit of the identification being registered by a number of steps of the third selector corresponding to the digit position of the third identifying character. It must here be remembered that, by examination of FIGURE 7 it is seen that the letter symbols A, B and C are simulated by movement to the 2 position of the dialing unit, that the letter symbols D, E and F are simulated by movement to the 3 position of such dialing unit, etc. Thus, for the exchange code identification BU8, (288) the first selector will be advanced two steps from its home position, the second selector will be advanced eight steps from its home position, and the third selector will also be advanced eight steps from its home position.

The illustrated stepping switches are of the same general design as such switches previously described herein. Accordingly, like parts of the selector stepping switches are numbered with the same numbers as used previously in the description of the timer unit stepping switch shown in FIGURES 31, 33, 34, 36, 37 and 38, but with the suffix *a* or *b* or *c* applied to each numeral of the first, the second and the third selectors, respectively. It is now noted that in the use of the stepping switch as a component of the timer unit, wherein provision is made to enable continuous stepping through a total of 33 steps, by bringing into use the three decks and the three wipers of that component in succession, all three of the input brushes to such wipers being strapped together by the line 250 (FIGURE 40). On the other hand, in the present use of such stepping switches as selector components, it is only necessary to provide for 11 steps to accommodate the total requirements from base or off position to the high or 0 position. Accordingly, since such 11 steps are embraced by only 120 degrees of stepping switch shaft rotation (being the 11 stationary contact positions) I have provided three wipers for each deck of stationary contacts, all of the wipers for each deck being spaced at 120 degrees spacing, and all of the wipers for each deck being connected together. Thus during a dialing operation and for the code symbol to which a given selector responds (for example, the first selector responds, in the previously suggested code of BU8 to the first symbol B) the three wipers of each deck of the first selector will advance 2 steps from their base position, but only one of such three wipers will be in service and engagement with the stationary contacts of the deck to which such wipers correspond during such stepping operation of such selector, the other two wipers of such deck of such selector also advancing 2 steps, but not being in engagement with any stationary contacts during such advance of 2 steps. A similar analysis will properly apply to the wipers of the second selector, but with advance of eight steps instead of two; and a similar analysis will also properly apply to the wipers of the third selector, but also with an advance of eight steps instead of two, since, in the cited example of BU8 it happens that eight steps are required for each of the code symbols U and 8. Thus, at completion of the dialing of BU8, all of the wipers of the first selector will have advanced two steps (or 2/33 of 360 degrees, namely, 21.8180 degrees), all of the wipers of the second selector will have advanced 8 steps (or 8/33 of 360 degrees, namely, 87.2720 degrees) and all of the wipers of the third selector will also have advanced 8 steps (or 8/33 of 360 degrees, namely, 87.2720 degrees).

At least one deck of stationary contacts of each selector is assigned to each of the pre-pay zones (as will presently be shown) and an additional deck or decks is or are provided in each selector for other functions ancillary to the switching operations proper. In the present case I have shown 2 decks for each of the three pre-pay zones, and one additional deck in each selector to enable proper time delays to be assured between completion of the pulsing of such selector (by the dialing unit), and return of the dialing unit's elements to their home position, and then commencement of the next dialing unit pulse-delivering operation, to avoid improper delivery of pulses of such next dialing operation to the selector which has just been stepped to its intended position. The provision of at least two decks in each selector for each pre-pay zone makes possible the accommodation of a greatly increased number of exchange code identifications by the equipment of such selectors. Such two decks per pre-pay zone arrangement is shown in FIGURES 5, 43, 44 and 45.

At completion of the entire selector operation the wipers of each selector are rapidly advanced (e.g., by self-pulsing operation) a number of steps necessary to complete the full 11 steps of a total movement of 120 degrees. Thus, in the cited instance of BU8, the wipers of the first selector will be thus advanced 9 steps (or 9/33 of 360 degrees, or 98.1810 degrees), the wipers of the second selector will be thus advanced 3 steps (or 3/33 of 360 degrees, or 32.7270 degrees), and the wipers of the third selector will also be thus advanced 3 steps (or 3/33 of 360 degrees, or 32.7370 degrees). Thus each selector is advanced to its home position, being one of three starting positions, preparatory to commencement of translation of the code identification of the succeeding call. It will of course be understood that the completion of the entire selector operation as above referred to, may be a termination due to deposit of insufficient money, or due to deposit of the wrong amount (in value) for the pre-pay zone dialed, or may be due to hanging up the receiver of the calling party, either at termination of a completed call, or due to nonresponse of the called party.

In view of the foregoing differences of use of the stepping switches of the selectors, as compared to the use of such switches in the timer, it is further necessary to provide three of the high points 237 on the block 234 of each selector stepping switch, to produce the cutoff operations at completion of the advancements of such selector stepping switches to succeeding home or base positions; specifically, when such advancements to the home or base positions are produced by self-pulsing operations.

Although I have above referred to the provision of seven decks in each of the stepping switches of each selector unit, it is to be noticed that in FIGURES 38 and 39 I have shown six decks for each of such stepping switches 290 and 292, and eight decks in the stepping switch 291. It will be understood, however, that in reality seven decks have been provided in each selector, in the embodiment specifically illustrated and described herein.

Reference is next invited to FIGURE 5 (right-hand portion) wherein I have shown, schematically and in development, the three stepping switches' stationary contacts and their wipers, it being noted that only one of the three wipers for each deck of each selector is there shown. The seven decks for each such selector are designated A, B, C, D, E, F and G, respectively. The several shaft elements by which the wipers are rotated stepwise are shown schematically by the bars of insulating material, 294, 295 and 296, for the several selectors, such bars moving up step-by-step instead of rotating, through eleven steps for each full operation from home position around to home position, it being assumed, in this showing, that each such bar returns to its lowermost position as its home position, preparatory to commencement of the next stepping operation.

The decks A and B, C and D, and E and F of the three selectors are used for the 25 cent zone, for the 20 cent area or zone, and for the 15 cent zone, respectively. The deck G of each selector is used for special purposes, as will presently appear. The wipers, one for each deck, are schematically shown as carried by the bars 294, 295 and 296, respectively, for the three selectors, such wipers engaging the stationary contacts of the several decks. These wipers are not numbered in FIGURE 5, due to lack of convenient space; but, with the exception of the wipers for the G decks, such wipers are numbered in FIGURES 43, 44 and 45. Said figures reproduce the stationary contacts and the wipers for the several decks and selectors, such wipers being numbered as follows: For the fifteen cent zone, FIGURE 43, first selector, wipers 297 and 298; second selector, wipers 299 and 300; third selector wipers 301 and 302; for the twenty cent zone, FIGURE 44, first selector, wipers 303 and 304; second selector, wipers 305 and 306; third selector, wipers 307 and 308; and for the twenty-five cent zone, FIGURE 45, first selector, wipers 309 and 310; second selector, wipers 311 and 312; and third selector wipers 313 and 314. In FIGURES 43, 44 and 45 I have also numbered the carriers for the various wipers just above defined, by the same numerals as are used in FIGURE 5.

In FIGURE 5 I have also shown the ratchet wheels for moving the wiper carriers, the magnets and pawls which constitute portions of the means by which such ratchet wheels are advanced step-by-step for like advancements of the wiper carriers, the self-pulsing contacts by which the magnet coils are supplied with pulses needed to advance the wiper carriers sufficient steps to bring said parts to their base or home positions at completion of a selector operation, and the cutoff contacts by which such self-pulsing operations are stopped when the base or home positions of the wipers have been attained. These contacts are numbered according to the numbering of like elements elsewhere.

*Sequential delivery of groups of pulses to the selectors in sequence*

Means must be provided for ensuring delivery of the pulses which come from the dialing unit, to the proper selectors, so that each selector will receive the pulses delivered by such dialing unit, which correspond to the first, or the second, or the third digit of the code identification of the called station. Thus, on the first dialing operation, the corresponding pulses must be delivered only to the first selector; on the second dialing operation, the pulses must be delivered only to the second selector; and on the third dialing operation the pulses must be delivered only to the third selector. All such pulses come to the selector unit over a single line, so provision must be made at the location of such selector unit to discriminate between the pulses which correspond to the three dialing operations, and ensure delivery of each set of dialed pulses only to that selector corresponding to the dialing sequence producing the pulses.

In FIGURE 5 the interrupter contacts and the cut-off contacts for the three stepping switches are numbered 241 and 238, respectively, with the suffixes *a*, *b* and *c*, respectively, corresponding to the first, the second and the third selectors.

The selector wipers which engage the seventh deck of contacts of such selectors, are numbered 315, 316 and 317, respectively, for the first, the second and the third selector, in FIGURE 5. The contacts of the groups G of the several selectors are severally subdivided into sections, 318, 319 and 320 (with suffixes *a*, *b* and *c* for the three selectors, respectively), as shown in FIGURE 5. These groupings 318 are connected directly together; the contacts of the groupings 319 are also connected directly together and to the groupings 318 by leads including the resistors 321; and the contacts of the groupings 320 are connected directly together and to the groupings 319 by leads including the resistors 322; such resistors 321 and 322 for the three selectors being provided with the suffixes *a*, *b* and *c* for the first, the second and the third selector, respectively. The groups 318 for the three selectors connect by the leads 323, 324 and 325, through resistors 326, 327 and 328, to the magnets 329, 330 and 331 of the relays 332, 333 and 334, respectively. The ends of such magnet coils opposite to such lead connections are grounded as shown in FIGURE 5. If found desirable, the time constants of the three relays 332, 333 and 334 may be increased by placement of suitable capacitors 335, 336 and 337 across the respective magnet coils, according to conventional practice. Such time constant increasing means would be supplemental to time delays also provided by the resistors 321 and 322 previously referred to.

Each of the relays 332, 333 and 334 includes the contacts illustrated in FIGURE 5, including the tongue 338 normally engaged to the contact 339, but reversible to engage the contact 340 when such relay is actuated by energization of its magnet, and after the expiration of the time delay to which such relay is adjusted. Such tongues and stationery contacts are provided with the suffixes *a*, *b* and *c*, according to previously explained practice. (The relay 334 does not need a contact 340, so none is shown for that relay.)

The dialed pulses return over the line 341, through instrumentalities presently to be explained. The first group of such pulses is delivered, through engagement of the contacts 338$^a$ and 339$^a$ of relay 332, to the stepper magnet 202$^a$ of the first selector, advancing the wiper carrier of such stepper by an amount dependent on the number of pulses delivered from the dialing unit for the first digit dialed. As soon as the wiper carrier of such first selector has advanced to the first contact position (produced by such group of pulses) the lead 323 is connected to potential supply (the wiper 315 of such first selector being supplied with potential supply as shown in FIGURE 5), thus delivering current to the magnet 324 of the relay 332; but, due to the time constant delay of such relay, its tongue is not immediately reversed, nor is it reversed for a time interval sufficient to ensure attainment of the highest position to which the wiper carrier may rise, being the top position. After expiration of such time delay, such relay will reverse its tongue, thus bringing its tongue 338$^a$ into engagement with the opposite stationary contact 339$^a$. This contact 339$^a$ connects, over the lead 342 with the tongue 338$^b$ of the relay 333, so that the next group of pulses delivered from the dialing unit and returning over the line 341 will come to the second selector magnet 202$^b$ to produce corresponding stepping advance of such second selector's wiper carrier to a position corresponding to the number of pulses produced by the dialing unit for the second digit dialed. Likewise, at completion of the pulsing time for the second group of dialed pulses, and corresponding advance of the second selector to its proper wiper carrier advanced position, the time delay provided for the operation of the relay 333 will expire, and such relay will reverse its tongue, to ensure delivery of the third group of pulses to the magnet 202$^c$ of such third selector. Thus, each selector will have its wiper carrier advanced from its base or home position by a number of steps equal to the number of pulses delivered by the dialing unit and corresponding to the digit which is represented by such selector. It is noted that at completion of the stepping operation for such third selector, its relay 334 will be opened, with disengagement of its tongue 338$^c$ from its stationary contact 339$^c$, and opening of the pulsing line until such third selector is returned to its base or home position by self-pulsing operations.

*Pulsing of the selectors to starting position*

Referring next to the self-pulsing operations by which the three selectors are returned to their base or home positions examination of FIGURE 5, taken in connection with the related FIGURE 3, will show that the line 344 may be grounded by activation of the relay 345 of Unit 26. Activation of such relay 345 may be produced by a signal arriving over the line 382 and the line 383 from the "Tip" line 384 which comes from the exchange to which the calling station is connected; but such signal can be effective only when the hook switch 385 is closed by absence of the receiver from its hook, according to conventional practice. Such closing of the hook switch 385 connects its contact 386 to the ground line 387, thus completing the activation of such relay 345 by a signal arriving over the tip line 384 from the exchange.

Additionally, such line 344 connects by lines including the line 346 with the relay 270 of the Unit 27, such relay 270 being the "ten cent" relay, and including the magnet 274 previously referred to. Such connections of the line 344 with such relay 270 include the relay 348 of the Unit 5, so that such line 344 may be grounded either by activation of the relay 345, or by activation of both of the relays 348 and 270. The operation which involves the relays 348 and 270 is as follows:

An operation by the exchange operator of the exchange to which the calling station connects will deliver a signal over the "ring" line 388 to the line 389 connected to the coils 390 of the polarized relay 391, such signal being of polarity proper to shift the tongue 392 of such polar relay into engagement with its left-hand stationary contact 393. Said contact connects by line 394 to the magnet coil 395 of the relay 348. The other end of such coil is supplied with input as shown in FIGURE 3. Energizing such relay 348 closes its contacts 396 which connect, respectively, with the line 346, and with the line 397 leading to the grounding contacts 398 of the ten cent relay 270. The magnet coil 274 of such relay 270 connects by a line 399 (including the delay resistor 400) to the contact of the ten cent switch 265 which switch is activated when coins of the value of 10 cents have been inserted into the coin receiving Unit, Group No. 3.

Since a ten cent call is conventionally of unlimited duration, and thus does not require intervention of either the selector units or the timer unit, it is proper to ensure that such selector units have been self-pulsed back to their home positions when the deposit of ten cents is made. In any case, such deposit, made as a part of a call to one of the three time zone exchanges, will thus activate such ten cent switch 265, thus ensuring restoration of the selectors to their base or home positions in the manner explained above.

Having grounded line 344, the self-pulsing operations needed to restore the selectors to their base or home positions may be performed. This is done as follows:

As soon as the first selector moves away from its base or home position its contacts $238^a$ reverse from their positions shown in FIGURE 5, thus connecting the pulsing contacts $241^a$ in condition for self-pulsing of such selector forward to its base or home position whenever the line 344 is grounded; but until that grounding occurs such self-pulsing may not occur, and the selector will remain in its position as set by the first digital group of dialed pulses. Likewise, the moving of the second and third selectors from their base or home positions by pulses received from the dialing unit, will set their contacts $238^b$ and $238^c$ into conditions to cause self-pulsing to occur for each such selector, but such operations cannot occur until grounding is provided for such operations. Such groundings are provided through the lines 349 and 350 in FIGURE 5, but only through the line 344 which has already been discussed. Accordingly, when such line 344 is grounded the first selector will self-pulse itself to its base position, then, due to reversal of its contacts $238^a$ grounding will be supplied for the self-pulsing of the second selector to its base position; and finally, due to reversal of the contacts $238^b$ of the second selector, grounding will be supplied to the third selector to enable self-pulsing of that selector to its base position. The attainment of base position of the third selector will cause restoration of its contacts $238^c$ to their position shown in FIGURE 5, thus terminating the ground connection for that selector.

*Ten cent call produces ground connection*

It was stated that, by dialing once from the O or high position of the dialing unit, the exchange operator may be directly called for any requirement, such as for placing a long distance call. Such single dialing operation, to such high dialed position opens the microswitch 124, thus removing the bridge from the pulse contacts 406, notwithstanding the continued closed condition of the contacts 401 of relay 274 (the ten cent relay), no deposit of coins having been made prior to calling the exchange operator. The return of the dialing unit then produces ten pulses which step the wiper carrier of the first selector to its high position. The stationary contact 351, shown in FIGURE 5 is then engaged by the wiper 309, which by examination of FIGURES 5 and 48 is seen to be grounded. Accordingly, such special dialing operation serves to ground the line 352. Such line 352 extends to the motor 353 of a microswitch interrupter element 354 to drive such element, thus causing the microswitch to be alternately shifted between its two switching positions, and thus periodically closing and opening a circuit for delivery to the exchange operator of characteristic signals, corresponding to notice that the call thus brought to her attention is coming from a pre-pay station, and then to advise her, by other characteristic signals, intermittent signals of various sound notes corresponding to denominations of coins inserted into the coin receiving unit. This feature will be further described hereinafter. Upon grounding the line 344, after the functions produced by or during the foregoing exchange operator controlled call, it is evident that such first selector will be self-pulsed by advance to its base or home position.

*The stepped positions of the selectors must produce circuitry matching the the code identification of the station being called*

Next it is seen that, when the three dialing operations which define the exchange to which the called station is connected, have been completed, the three selectors stand, for the time being, in positions corresponding to the three digits so dialed. Thus, such selector positions, taken as a group may be said to identify the code symbols of such exchange. The following is also true:

When dialing from any selected calling station, there are certain exchanges which, measured from such dialing or calling station, will fall into the fifteen cent zone—there are other certain exchanges which, measured from such dialing or calling station, will fall into the twenty cent zone—and there are other certain exchanges which, measured from such dialing or calling station, will fall into the twenty-five cent zone. When the call is placed through the exchange to which the calling station is connected with intervention of the operator at such exchange, such operator will request deposit of the proper proper prepay money, with information transmitted to her as to what coin denominations and how many of each, have been deposited. Then such operator will make or complete the circuitry to be called station. Such operations may be conducted by use of the presently being disclosed equipment; but when the call is placed without intervention of the exchange operator, means must be provided for testing the total value of the coins inserted into the receiving unit, and for comparing such total value with the base charge for the particular zone to which the call is being made, to determine whether or not sufficient amount of pre-pay has been made, before producing the call or completing it, automatically. The selector unit already described is used for, in part, conducting or enabling production of the necessary comparison between such total amount of prepay, with the base charge to the zone of the called station. In case sufficient amount of money has not been received into the money receiving equipment the comparison equipment will return the deposited money; in case a sufficient amount of money has been introduced, the necessary operations to proceed with and complete the circuitry to the called station will be conducted by the equipment, automatically. In order to understand the further operations conducted during the operations just defined a further study of the selector section, including the interconnections between the three selectors, must be made, as follows:

For each of the base charge zones the stationary contacts of the three selectors are connected together in a succession such that for any called station within that zone a circuit may be completed enabling the number of such called party within such zone to be called, and the call completed, providing, of course, that the base prepay amount of money has first been inserted into the receiving unit. Stated in another way; for each of the base charge amounts there is a group of exchanges, defined by the first three digits of the code dialing, any one of which exchanges may be reached by deposit of the corresponding base charge amount; and having reached such an exchange by proper dialing, that base charge having been prepaid, further dialing at the calling station of the four numbers assigned to the called party, will complete circuitry to the point of ringing such called party. Thus it next remains to disclose how, for each such base charge amount, proper connections are made through the three selectors, to produce the identification of the exchange of the called party. Here it is mentioned that although provision has been made in the present equipment, for these operations, including provision of the three selectors already described, like equipment, as far as the selectors for the called exchanges is concerned, is also included at the exchange to which the calling station is connected; and during the dialing of the first three digits to identify the exchange of the called party's receiver, such selectors in the exchange of the calling party are also being brought to the proper coded positions for the exchange of the called party. The exchange of the calling party also includes equipment responsive to the succeeding four digits dialed by the calling party, to reach the station number of the called party at his exchange as called by the first three dialing operations. Thus, although the equipment herein shown includes selectors to respond to the first three dialed digits in order to produce a setting corresponding to the exchange of the station being called, still it is not necessary to include in the equipment of the calling station, equipment responsive to the actual number of the called station, being the dialed numbers succeeding the three exchange code digits.

*Strapping between selectors and functions thereof*

Referring again to FIGURE 5, there is there shown a strap 355 extending from the contact 2ABC of the group F of the first selector, to the contact 4GHI of the group E of the second selector; and another strap 356 extending from the contact 4GHI of the group F of the second selector to the contact 6MNO of the group F of the third selector. Accordingly, when the wiper carrier 294 of the first selector is moved 2 steps to position of its wipers corresponding to the 2 position, and the wiper carrier 295 of the second selector is moved 4 steps to position of its wipers corresponding to the 4 position, and the wiper carrier 296 of the third selector is moved 6 steps to position of its wipers corresponding to the 6 position, a circuit will be produced through wipers of all three selectors corresponding to the code number 246, or any set of letters of the three groups which respectively include the 2, the 4 and the 6, provided that the wipers carried by the carrier 295 of the second selector, corresponding to the groups E and F are connected together. Such connection is made by the lead 359, shown in FIGURE 5; and like connections are provided between the wipers for the groups A–B, and for the groups C–D, being the leads 357 and 358, both carried by the carrier 295, FIGURE 5.

All of the wipers 297, 303 and 309, carried by the carrier 294 of the first selector are grounded by the flexible lead 360 (see FIGURE 5, and FIGURES 43, 44, and 45); and all of the wipers 298, 304 and 310, also carried by the carrier 294 of the first selector are connected by the flexible lead 361 to a positive source of current (see FIGURE 5, and FIGURES 43, 44 and 45). The wipers 301, 307 and 313, which engage the stationary contacts of the groups F, D and B of the third selector, respectively, connect by the lines 284, 285 and 286 to the contacts *a* of the relays 267, 268 and 269, which perform certain circuitry functions corresponding to the fifteen cent zone, the twenty cent zone, and the twenty-five cent zone, respectively. Said contacts *a* are normally closed as shown in FIGURE 4, thus connecting to the line 362 which leads to the magnet coil 363 of the relay 277 (Unit 20). Each relay 267, 268 or 269 (fifteen cent or twenty cent or twenty-five cent) is opened under control of one of the switching units 262, 263 or 264 corresponding to pulses produced by the insertion of coins aggregating either fifteen cents, twenty cents or twenty-five cents, as the case may be. Thus a signal arriving over either of such lines 284, 285 or 286 from the third selector group of the selector unit will be unable to pass to the coil 363 of the relay 277 of the Unit 20 for reversal of its contacts, when such signal corresponds to the condition that the proper amount of coins (value) has been introduced, corresponding to the group of selector contacts F, D or B from which such signal was derived. On the contrary, if the switch 262, or 263 or 264 has not been properly actuated by insertion of the proper amount of coins (value) for the intended call (either fifteen cents, or twenty cents or twenty-five cents as the case may be), the circuitry, including that through the three selectors will be completed, thus activating the magnet coil 363 to produce actuation of the relay 277 (Unit 20) and reversal of its contacts. (It is here noted that such relay 277 includes the two coils 276 and 363, both of which act on the common armature of such relay, so that energization of either such coil will actuate the relay for closing of its conacts, thus grounding the line 364, presently to be referred to.)

Again, the wipers 302, 308 and 314, which engage the stationary contacts of the groups E, C and A of the third selector, respectively, connect by the lines 287, 288 and 289 to the contacts *d* of the relays 267, 268 and 269 which connect by the common line 275 to the magnet coil 276 of such relay 277 (Unit 20). Study of the circuitry will show that a signal arriving over either of such lines 287, 288 or 289 will electrify the magnet coil 276 under the conditions that the proper amount (value) of coins has been inserted, corresponding to the prepay amount of the group of contacts of the third selector from which such signal over such line, was derived.

*Non-equality of pre-paid amount with signal positions of selectors grounds line 364*

It is now apparent that when there has not been inserted an amount in value of the coins to correspond to the base charge of the zone which includes the dialed station the relay 277 will be reversed, thus closing its contacts. Such contacts, when thus closed, ground the line 364. The functions produced by such grounding will be explained presently. On the contrary, when the proper amount in value of the coins has been inserted, such relay 277 will remain in its unactivated condition, and the ground will not be produced. The money will be held in escrow.

The relationship between the selectors on the one hand, and the relays 267, 268 and 269 (Units 8, 9 and 10) and the relay 277 (Unit 20), on the other hand, may also be expressed as follows: If the value of the coins inserted is other than the base charge for the pre-pay area or zone which is now dialed, the signal arriving from the third selector over one of the lines 284, 285, 286, 287, 288 or 289 will come to one of such relays which has not been activated by the functions produced by the so-inserted coins. Accordingly, such so-arriving signal from the third selector will come to a relay whose contacts *a* or *d* have not been opened. Thus such signal from the third selector will activate the solenoid 277 or 363 of such relay 276 (Unit 20), thus grounding the line 364 and causing the coin return element 259 of the escrow unit 257 to return the coins from escrow. Otherwise the coins will still be held in escrow subject to further operations.

*Direct result of grounding line 364*

The lower ends of both of the magnet coils 258 and 259 which produce the coin collect and coin return operations, respectively, connect to the line 378 which connects to an input terminal 379. The ground line 364 connects to the free end of the coin return control coil 259. Grounding of the line 364 will thus energize such coin return magnet coil 259. Nongrounding of such line 364 will leave such coil unergized, and the previously inserted coins will remain in escrow in such unit 251 (also designated as Unit 21 in FIGURE 4 and elsewhere).

*Examples of strapping between selectors and ancillary equipment*

At this point it is desirable to examine the "Strapping" of the several selectors above referred to, as follows, (reference being made to FIGURES 43, 44 and 45):

In each of such figures the groups of contacts A–B, C–D, and E–F, are shown schematically (one such group being shown in each of such figures), conveniently as a vertical group, thus corresponding to the verticality of the groups shown in FIGURE 5; but in FIGURES 43, 44 and 45 I have located the three groups for the three selectors alongside of each other, with the groups from the first selector shown at the left-hand sides of the figures, the groups from the second selector shown in the mid-portions of the figures, and the groups from the third selector shown in the right-hand portions of the figures. Then the strappings extend generally horizontally from contact group to contact group, as strapping is needed or desired. Also, in these three figures the wipers are shown at the lower ends of the several groups, but the contacts of the groups are shown as reading downwardly, instead of upwardly as in FIGURE 5. Thus, such wipers are actually shown in their base positions but the indicia and numbering of the contacts are shown in reverse as compared to the showings of FIGURE 5. However, the dialing positions or identifications of the several contacts are shown, so that the figures may be properly read.

Also, in these three FIGURES, 43, 44 and 45, I have shown the Unit 20 (see FIGURE 4) previously referred to, in block form, together with its magnet coils 276 and 363, and the lines which connect the wipers of the respective selectors to the relays of the Units 8, 9 and 10 (of FIGURE 4), and I have also, in FIGURES 43, 44 and 45, shown such lines as connecting directly to the magnet coils 276 and 363, without intervention of such relays of the respective Units 8, 9 and 10, for purposes of simplification in the showings of FIGURES 43, 44 and 45. It will thus be understood that although such lines are shown in FIGURES 43, 44 and 45 as being directly connected to such magnet coils, actually there are interposed in such connections the relays of such Units 8, 9 and 10, whereby such lines are either connected to such magnet coils, or are broken so that they are thus, for the time being incomplete, depending on the nonactivation or activation of the relays of such Units 8, 9 and 10, corresponding to insertion of the correct or incorrect (insufficient) amounts (values) of coins into the coin receiver. Also, in each of such FIGURES 43, 44 and 45, I have shown an armature movable contact adjacent to each of such magnet coils. In actuality there may be a single such armature actuated contact, for both of the magnet coils, as shown in FIGURE 4 (Unit 20) such single actuated contact being actuated to its engaging position when either of the magnet coils 276 or 363 is energized.

In such FIGURES 43, 44 and 45 I have also shown the batteries 365 and 366 connected to the terminals of such magnet coils opposite to the connections of the lines, the polarities thus connected to the lines being positive in one case, and negative in the other. It is also noted that in the showing of FIGURE 43 the wiper 298 (first selector), is connected to that pole of the battery 365 opposite to the battery pole to which magnet coil 276 is connected, by the line 367; that in FIGURE 44 the two batteries are numbered 365$^a$ and 366$^a$, respectively, and the wiper 304 (first selector), is connected to that pole of such battery 365$^a$ which is opposite to the battery pole to which the magnet coil 363 is connected, by the line 368; and that in FIGURE 45 the two batteries are numbered 365$^b$ and 366$^b$, respectively, and the wiper 310 (first selector), is connected to that pole of such battery 365$^b$ which is opposite to the battery pole to which the magnet coil 276 is connected, by the line 369. Thus such FIGURES 43, 44 and 45 constitute schematic showings of the circuitry through the three selectors, provided by the strappings to be disclosed, and through the lines and coils of the relay of the Unit 20, being controlled by the selectors, under such strapping.

Examination of such strappings shows that in each case (of the three FIGURES 43, 44 and 45), there are two sets of strappings shown, each extending between the first and third selectors. Also, that each such strapping extends through the second selector, and is completed only when the wiper carrier of that selector is at the stepped position which corresponds to the second digit of the exchange code number to which the called station connects (such code number comprising the first three digits of the entire called station identification). The strappings of each such set include diodes or other one-way valves 370, for the set of strappings extending from the first selector to the third selector; and diodes or other one-way valves 371 for the set of strappings extending from the third selector to the first selector. In the showings of such figures there are some of such diodes at each side of the second selector. Such diodes or the like, enable use of certain of the stationary contacts and wipers for strappings in both directions, through the second selector, with proper discrimination produced by the diodes to ensure shutting out improper signals in either direction. In some cases resistors such as shown at 372 may be introduced into certain of the stripping connections, to enable additional signals to be passed under proper combinations of the settings of the three selectors, without improper interpretations of such additional signals or confusions between signals.

With such provisions for two or more sets of strappings between the three selectors, for each group of exchanges lying within a specified base prepay charge, it is possible to handle a great number of exchange code numbers through a single set of selectors, thus greatly widening the usefulness of the equipment. However, with provision of two or more sets of three selectors each, and provision for discriminating between such sets, it is possible to handle any number of different exchange code numbers automatically, each such set of three selectors being properly strapped.

*Grounding of line 364 also re-sets units 6 and 7*

Referring again to the coin return and coin collect units 258 and 259 (see FIGURE 4 Unit 7) a two position switch 376 is provided having the contacts 375 and 377 between which such switch element 376 may be moved. An operating connection is provided between such switch 376 and the magnet of the coin return unit 259; this arrangement being such that normally the switch element 376 stands in the contact 377 engaging position shown in FIGURE 4, but when the coil of 257 is energized its magnet shifts such switch element into engagement with the other contact 375. The switch element 376 connects by the line 380 to one end of the reset coil 266 of the stepping switch which acted to set the switches 262, 263, 264 and 265 according to the pulses produced at insertions of the coins. The contact 375 connects by the line 374 with one terminal 373 of current input. The free end of the coil 266 connects by the line 381 with the line 378, which in turn connects to the other input terminal 379. It thus appears that grounding of the line 364 serves, not only to produce coin return, but, through momentary shift of the switch element 376, to also produce operation of the stepping switch reset elements of the coin counting equipment, to ensure return of such stepping switch to its home or zero position. Thus the parts are returned to their home position preparatory to the succeeding coin inserting and registering operation. On the other hand, by connecting the line 380 to the input terminal opposite to the terminal 379 current will be supplied simultaneously to the coil 258 of the coin collect magnet, and to such reset coil 266 of the stepping switch, thus also resetting such stepping switch to its home position simultaneously with the coin collect operation.

*Ten cent deposit removes short across pulsing contacts of dialing unit*

It was previously shown that deposit of ten cents in the coin receiving unit activities the ten cent switch 265 (see FIGURE 4), which operation serves at the same time to activate the ten cent relay 274, Unit 27 (see FIGURE 3). Such activation of such relay 274 serves also to open its contacts 401, which connect over the lines 402 and 403 to the contact 404 of the dialing unit pulsing contacts 405, and by the line 409 to the terminal of the tongue of the microswitch 124 provided on the dialing unit (see FIGURE 8, et seq.); and to the stationary contact 406 of such microswitch, respectively. This arrangement is such that energization of such relay 274 thus serves to remove the short on the pulsing contacts of the dialing unit, otherwise produced by such relay contact element 401.

*Pulsing circuitry*

The pulses produced by such dialing unit are delivered to the exchange to which the calling station is connected and there actuate conventional equipment for connecting to the exchange identified by the code signals which have been pulsed (the first three digits), and also the following four signals pulsed (being the number of the called party based on such coded exchange number). Connection from the calling station to its exchange is effected by the closing of the hook switches 407 and 408 when the receiver is raised; and the necessary ground connection is also produced by closing of the hook contacts 386 of the hook switch 385 already referred to, such ground connection being made over the line 387. One of the pulsing contacts 404 connects to the ring line 388 leading to the exchange, over the connection 415 from the pulsing contact 404 through the hook switch 407 (receiver removed), to the coils 390 of the polarized relay 391, and thence to such ring line 388. The other pulsing contact 410 connects by a lead 405 to the contact 411 which comprises a portion of the dialing unit (see FIGURES 8, 9, 19 and 20, and others). Said contact 411 is engaged by the pin 412 carried by an insulating bushing 413 in the main gear 109 of the dialing unit. When said main gear (and the dialing plate 100) are in their normal or home positions the contact 411 is shifted leftwardly (see FIGURE 8) from another contact 414 to separate such contacts. However, during the pulsing operation the main gear is at a position counterclockwise from such home position so during such pulsing operations said contacts 411 and 414 are engaged. They are thus alternately disengaged and engaged, being engaged whenever the dialing plate is not at its home position, and disengaged whenever the dialing plate is at its home position. They are thus engaged during the pulsing operations, and are thus shown in FIGURE 3 for better understanding of the operations and the circuitry.

Figure 6:
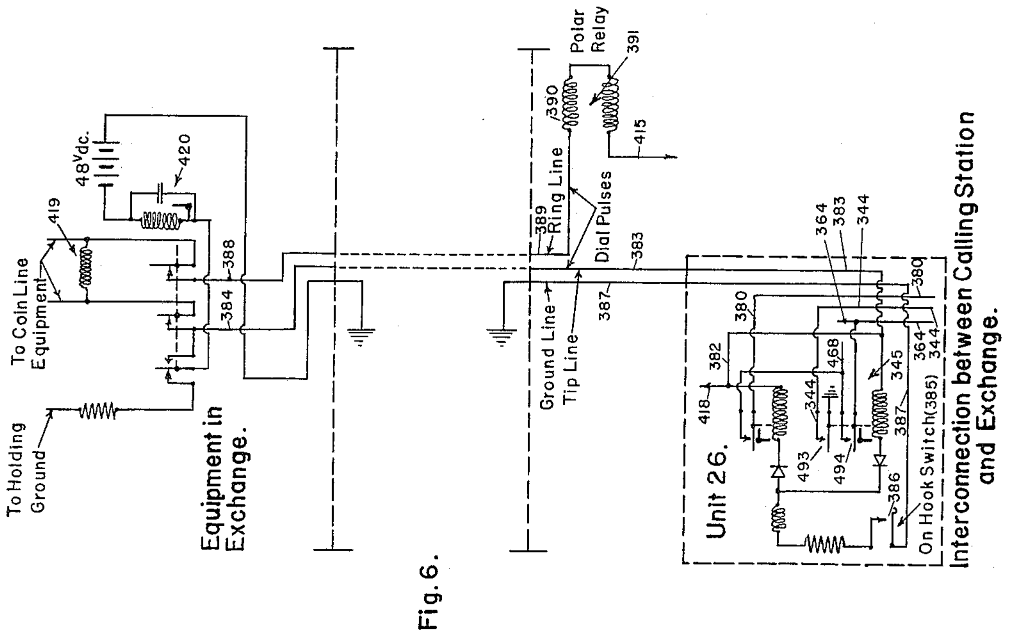
FIGURE 6 shows a portion of the circuitry contained in the exchange to which the calling station in question is connected, to facilitate understanding of the functioning of the presently disclosed calling station equipment.

The contact 414 connects by lines 412 and 413 to the closed hook switch 408 (receiver raised), over the line 418 to the tip line 383. Thus the pulsed signals are delivered to the proper equipment of the exchange shown schematically by the coil 419 in FIGURE 6. But it is also noted that the closing of the hook switch contacts 386 and grounding to the line 387 produces activation of the relay 420 in the exchange, thus providing 48 v. D.C. over the tip and ring lines 384 and 388. Also this operation causes current to flow through the coils 390 of the polarized relay, in direction to shift the tongue 392 of that relay to the right side contact 421. Such contact 421 connects over the line 422 with the coil 423 of the relay 424 which is included in the Unit 4, and, through the diode or other one-way valve 425 and the resistor 426, to the coil 427 of the relay 428; and the tongue 392 of the polarized relay 391 connects over the line 429 with the coil 430 of the relay 431, the other end of such coil 430 being grounded over the line 432. The relays 428 and 431, in addition to the relay 424, are included in such Unit 4. When energized and activated, such relay 431 opens its contacts 433, thus removing potential from the line 434.

The coin return line 364, previously referred to, is also controlled by the contacts 435 of the relay 428, which contacts control connection to the grounding line 434 just referred to. Accordingly, such coin return line 364 is under control of both of the relays 428 and 431. The coin collect line 380 (which connects to the switch 376, FIGURE 4), is controlled by the contacts 436 which comprise a portion of the relay 348, Unit 5, FIGURE 3. Accordingly, activation of the coin collect operation involves activation of one of the relays, 348 (its contacts 436), and non-activation of the other of the relays, 431 (leaving its contacts 433 engaged for grounding). Relay 428 is provided with means to enlarge its time constant for slow release, adjusted so that such relay 428 releases after release of relay 431, whose time constant is the shorter of the two relay time constants.

*Ten cent call*

I have previously disclosed that deposit of ten cents into the coin receiver will activate the switch 265 ("Ten Cent" switch), to ground the line 399 which extends from the coil of relay 274 (ten cent relay), thus opening the contacts 401 of that relay. Accordingly, such deposit of ten cents will remove the short across the pulsing contacts, so that effective pulsing may be produced. Such grounding is effected over the line 469 (FIGURE 4). It has also been shown that such pulsing will be passed to the proper equipment contained in the exchange to which such calling station is connected. Accordingly, the desired station may be called for a ten cent local call by conventional pulsing of the dialing unit. When such a conventional ten cent call is made there is no limit to the time during which such call may be continued.

During the above described pulsing operations the polarized relay 391 was likewise receiving pulsed impulses and thus the relay 424 was also being correspondingly activated, by pulses. These pulsed movements of such relay 424 served to cause corresponding pulses over the line 341 to the selectors to advance such selectors successively to positions (for the first three code digits) exactly corresponding to the pulsed positions of the code interpreting pulses received by the selectors for code digits of the called exchange. Also, the selectors of the calling exchange were not then used for any special purpose, such as I have previously explained herein; but they were used during the ten cent call so placed. Accordingly, at the termination of such so-placed ten cent call such selectors must be self-pulsed over to their base or home positions, preparatory to their use during a succeeding call.

*Call not answered (not completed). Calling party restores his receiver to its hook*

The replacement of the receiver on its hook will result in opening the hook switches 385, 407 and 408. First consider the operations produced when the called party has not answered, and the calling party hangs up his receiver. In this operation the coins are to be returned to the calling party from escrow, and the selectors are to be self-pulsed over to their home positions. The restoration of the receiver to its hook will open all said hook switches. Opening hook switches 407 and 408 removes the short between the tip and ring lines, thus releasing the polarized relay. Its tongue will then stand in its central position free from both of the stationary contacts 393 and 421. This will open circuits to relays 424, 428 and 431. Relay 431 is provided with a shorter time delay constant than relay 428. Therefore, after relay 431 releases its tongue to close its contacts 433 relay 428 will continue for a further time interval after returning the receiver to the hook, to apply potential connection to the line 364 which leads to the coin return magnet 259.

Activation of the coin return element will also shift the switch 376 to the contact 375, thus applying potential to the re-set magnet 266 of the coin-counting unit. That unit is provided with means to reset the coin counting elements to base or home position when such magnet 266 is activated. Thus the coins will be returned and the coin counting unit will be returned to its base or zero position. At conclusion of the time delay of the relay 428 said relay will reverse its contacts, thus removing potential from the line 364 to permit restoration of the coin return magnet 259 to unenergized condition, with corresponding return of various parts to their base or zero positions. Line 364 may be termed the coin return line for convenience of nomenclature.

*Called party takes his receiver from its hook. Call completed*

Next, consider the conditions which will exist if the called party removes his receiver from the hook and answers the call. When the called party answers the call, the raising of his receiver from its hook produces a reversal of polarity between the tip and ring lines 384 and 388, such reversal being produced by suitable and conventional elements at the exchange of the calling party. This will operate the polar relay to shift its tongue 392 to the left-hand contact 393. Such left-hand contact connects by the line (394) 437 to the end of the magnet coil 395 of relay 348, the other end of such coil being connected to potential. At the same time, due to disconnect of the polar relay tongue from the right-hand contact 421 to the left-hand contact 393, relays 424 and 428 will be released to normal conditions, but relay 431 will remain activated. Contacts 398 of relay 274 (Unit 27) connect by the line 397 with holding contacts 396 of relay 348, so that, once such relay has been shifted to its activated position, such holding contacts apply a holding ground to its magnet coil, including the contacts 398 of such relay 274. Thus, as long as such relay 274 remains activated, the relay 348 will also remain activated. Thus, relay 348 is, for the time being, under control of relay 274, the ten cent relay. Such holding circuit includes the lead 438 between the contacts 396 and the line 437 (394). To avoid improper reverse flow of current the diode or other one-way valve 439 is included in such lead. I have previously shown that the ground line 344 by which the selectors are enabled to self-pulse back to base or home positions, is controlled by such contacts 398 (of relay 274), and 396 (of relay 348), such ground line 344 being connected to the line 346. Accordingly, when the called party answers (with consequent shift of the polar relay tongue 392 to the left-hand contact 393) ground is applied to the line 344 to cause self-pulsing of the selectors to their home positions.

*Call terminated, called party hangs his receiver on its hook*

Upon termination of the completed call the calling party will hang up his receiver. This will open contacts of hook switches 440 (left-hand portion of FIGURE 3), 407, 408 and 385. These operations will remove all connections to ground, and disconnect from the tip and ring lines extending to the exchange to which the calling party is assigned. Also, the polar relay will be released and its tongue 392 will move to its central position, free from both contacts 393 and 421. This operation will open all connections at the position of such polar relay. Relay 431 being thus released its contacts 433 will apply 110 v. A.C. to line 380 (over line 434, both of relays 431 and 348 having been released by the complete opening of the polar relay contacts), and such electrifying of line 380 will activate the coin collect magnet 258 and the stepper reset magnet 266 (of Unit 7). Such activation of the re-set magnet 266 also releases the stepper relay for the ten cent operation, 265 (among other relays), thus also releasing relay 274 (Unit 27) and removing ground from the line 397, and also closing contacts 401 (of such Unit 27), thus restoring the short across the pulsing contacts 404 and 410 (microswitch contacts 124–406 being normally closed together). Thus the call has been completed.

*Pre-pay zone operation. General statement*

Next to be considered is the series of operations which are produced when a call is made to a station within a zone of prepay (measured from the calling station), so that a sufficient amount in value of coins must be delivered to the coin receiving equipment to meet the base charge for such area or zone. I have previously explained the operations attendant on the deposit of ten cents which is the assumed amount for a local call, as to which no time limit is prescribed, so that the operations of the timer and other equipment are not involved in such a call. Accordingly, it is unnecessary to repeat the operations already described, insofar as they are applicable to such a prepay zone operation as now to be discussed. It is first to be noted that since the selectors shown in FIGURE 5, and elsewhere are stepped for all operations to positions corresponding to the first three digits dialed, and since the strappings between such selectors correspond to specific exchanges which are identified by the codings, it is at once seen that whenever a set of such first three digits is dialed, such selectors will automatically determine which pre-pay zone includes the dialed exchange, thus affording a medium whereby determination may be and is made as to whether or not sufficient value or money has been received by the coin receiver to at least meet the base pre-pay requirements of the exchange which has been thus coded by such dialing. If the call was however dialed to the code of an exchange lying within the ten cent zone, such comparison is not necessary, and the coin sensing and determining and rejecting unit will, if the ten cents has been inserted, complete the call by signals originating at the area of the ten cent switch 265, already considered. Neverthless the selectors will, in the case of such a ten cent call, be stepped to positions of the three selectors corresponding to the coded signals and pulses. But the subsequent circuitry operations needed to complete such ten cent call will be produced without the interposition of analysis from the selectors to determine the sufficiency of the pre-payment. And such so coded signals will also be received by the equipment as the caller's station exchange (and elsewhere) to produce the operations needed to carry the call through to the called exchange (being the coded exchange), and to then produce connection to the number of the called station, under such called exchange control.

By way of example, assume that the called station lies within the fifteen cent zone. The operations produced in such case will follow those outlined for the case of deposit of ten cents for a local call, but with the following further operations:

Deposit of coins aggregating fifteen cents will cause the stepper unit 260 Unit 7, to operate to close the switch 262 (fifteen cent switch). A signal will then pass over the line 441 to the magnet coil 271 of the fifteen cent relay, 267, thus activating such relay. Such activation will close contacts *b* for the fifteen cent warning light brush 163 of the timer; and will also close contacts *c* for the cutoff signal brush 160 of the timer. Closure of such contacts *c* will condition the circuitry leading to the coin collect line 380 so that, in the absence of deposit of a further prepayment, at the termination of such original five minute pre-pad interval, a signal, originating at the timer contact for five minutes-fifteen cents, will be delivered over such line 380 to collect the original pre-payment coins. Such signal will also activate the reset magnet 266 to restore the unit 7, including its switch actuating elements, to base or original position, preparatory to the succeeding sequence of events. It is, however, now noted that such operations have been predicated on the assumption that during the dialing the coded first three digits were for a station connected to an exchange within the fifteen cent area or zone. Otherwise the selector components would have intervened to prevent such operations beyond the time of completion of such dialing. Therefore, it is necessary to next determine what other operations are produced during such dialing. These other operations, involving comparison of the amount of the original pre-pay, with the code number of the dialed exchange, are as follows:

*Pre-pay zone; subsequent operations*

When the first three digits (code number of the called exchange) have been pulsed, the three selector wiper carriers have been advanced to positions corresponding to the pulses delivered during such first three digit dialing operations. If the wiper carriers have then been set to positions such that, according to the fifteen cent strapping between the selectors, a circuit is produced through such selector wipers and strapping a signal will be delivered to the line 284 or 287, as the case may be, depending on such fifteen cent strapping; and such signal will proceed to either the *a* contacts or the *d* contacts of the fifteen cent relay, 267 (Unit 8), but will there find such contacts open, since the deposit of the original fifteen cents produced operations to activate such relay, and thus to open such two sets of contacts. Such sets of contacts being thus open, no signal will be sent to either of the coils 363 or 276 of the relay 277 (Unit 20), and thus the line 364 will not be grounded at the location of such relay. Grounding of such line 364 is needed to activate the coin return magnet 259 of the escrow unit (Unit 21), so the coins will remain in escrow, pending further developments. If, on the other hand, the dialing had been such that the dialed digits were the code number of a twenty cent zone exchange, either the line 285 or the line 288 would have been electrified, these lines leading, respectively to the *a* and the *d* contacts of relay 268 (Unit 9), twenty cent relay; and since coins aggregating twenty cents had not been inserted into the coin receiver, the switch 263 (twenty cent) would not have been closed, nor would the coil 272 of such twenty cent relay 268 have been energized. Thus, under such conditions the pairs of contacts (*a* and *b*) of such relay 268 would remain closed (each pair), and the coil 363 or 276 of the grounding relay 277 would have been energized to establish grounding of the line 364 at the position of such relay. Such line grounding would have activated the coin return magnet 257 of the escrow unit, thus returning the coins. Such activation of the coin return magnet would also have shifted the switch 376 from its position shown in FIGURE 4 into engagement with the contact 375, thus establishing circuitry to supply 110 v. A.C. to the reset magnet 266 of the Unit 7, to allow return thereof, together with return of the stepper 261 to base or zero position, with corresponding return of the switches 262, 263 and 264 to open condition.

*Original over-payment beyond base charge to called zone*

The foregoing illustration of various operations is based on the assumption that the deposited coins aggregate either the correct value for completion of the call, or are not enough to serve such purpose; and in the former case the call will be completed to the stage of ringing the called party—in the latter case the call will not be completed to such point and the coins will be returned, and resetting of various components will be produced. It remains to show what will happen under the condition that coins aggregating more than the base charge for the called zone, have been inserted. For example, assume the condition that the base charge is fifteen cents, and that twenty cents was inserted into the coin receiver; the following further conditions would then apply:

Deposit of the twenty cents would activate the stepper 260 (Unit 7) to close the twenty cent switch 263, having also closed the fifteen cent switch 262. Accordingly, both of the relays 267 (fifteen cent) and 268 (twenty cent) would be activated and remain in activated condition during the operations incident to the dialing of the exchange for the fifteen cent zone. Thus, too, both of the sets of *b* and *c* contacts of such relays would be reversed from their positions as shown in FIGURE 4, to close their tongues against the right-hand stationary contacts. Those tongues are, however, connected to the stationary contacts of relays of higher money values, sequentially; thus, although the tongue *b* of relay 267 closes against its right-hand stationary contact, leading to the warning signal brush 163 (for base charge of fifteen cents), still such right-hand contact of such relay is not then connected to the warning signal $245^a$, since the tongue of the contacts *b* of relay 268 has been shifted rightwardly (by the twenty cent switch 263). Thus no warning signal is passed to the warning unit (light $245^a$, FIGURE 4), by engagement of the brush 163 with the five minute set of contacts of the timer (see FIGURE 40). However, due to the rightward position of the tongue *b* of relay 268, the warning signal will be given by engagement of the brush 164 (for the twenty cent zone), with the five minute contact of the timer. Thus, although twenty cents has been prepaid for a fifteen cent zone call, the warning signal will be given forty-five seconds prior to expiration of the first five minute interval. However, the following exploration is now pertinent:

*Delivery of pulses to timer for added-time payments*

At completion of the original five minutes the cut-off brush 160 will engage the five minute contact of the fifteen cent group of contacts of the timer, which contact is then under electrification by the stepping switch wiper 221 (see FIGURE 40). Such electrification is produced concurrently with completion of the call by the removal of the called party's receiver from the hook of his telephone unit. Such operation serves, as I have previously stated, to activate equipment in the exchange of the calling party whereby the polarities of the tip and ring lines 384 and 388 (see FIGURE 3) are reversed, thus reversing the position of the tongue 392 of the polar relay 391, bringing such tongue against the left-hand contact 393 of that polar relay. This operation activates the relay 348 over the line (394) 437 (see FIGURE 3). Relay 348, thus activated closes, among others, the contacts 442 of such relay. Current for pulsing the stepping relay or magnet of the timer, shown at 443 (FIGURE 4), is supplied from the input connection 444 over the line 445. The opposite terminal of the stepping unit pulser connects by the line 446 with one of the contacts 442 just referred to. The other of such contacts connects by the line 447 with one of the contacts 448 under control of the relay 449 (Unit 24, FIGURE 3). The other such terminal contact 448 is grounded as shown. Activation of the relay 449 is produced by electrification of its magnet coil 450. One terminal of such coil connects by the line 451 with one of the contacts 452 of the relay 453, which relay contacts 452 are normally closed as shown in FIGURE 3. Thus activation of the relay 453 opens such contacts 452, thus releasing the relay 449, and removing the ground from the line 447. The initial pulse was delivered when the tongue 392 of the polar relay was set over leftwardly, and the opening of the contacts 448 of relay 449 conditions such relay 449 for delivery of another pulse each time the relay magnet is energized by supply of a pulse to the coil 450. Such added pulse is delivered to such coil 450 corresponding to each added nickel received into the receiving unit, as follows:

One terminal of the magnet coil 450 connects by the lead 454ª to the group of switches 254, 255 and 256; such group of switches connects to 110 v. A.C. input 373 by the lead 374; and the other input 379 connects by the line 456 to the contact with which the tongue 452 of the relay 453 makes contact. Thus the energizing of the magnet coil 450 of the relay 449 is under control of the coin actuated switches as well as the relay 454. This arrangement is such that each time a nickel is received into the coin receiving equipment, the five cent switch 254 is operated to produce a pulse in the magnet coil 450, thus also producing a pulse through the circuit which includes the timer stepping switch elements. Accordingly, by inserting nickels from time to time (or dimes or quarters, each of which produces a number of pulses corresponding to the value of such higher denomination coin than five cents, such number of pulses equalling the number of nickels equivalent to such coin of higher denomination) these added pulses serve to advance the wipers of the stepping switch one contact of such switch corresponding to each added nickel of value. The result of such operations is corresponding increase of the time during which the conversation may be continued without cutoff being automatically produced. Such pulses thus produced by the insertion of extra coins for extra time, do not affect the positions of the selectors shown in FIGURE 5; and such selectors retain their dialed positions until cutoff finally occurs.

*Control of timer motor operations*

It is also necessary to energize the timer motor 188 to start its operation when the call is completed by the answer of the called party, evidenced by the raising of his receiver from its hook; and such timer motor operation must continue as long as the call continues (assuming that it is a call from one of the zoned areas, and is for fifteen or more cents base time charge); and such timer motor operation must terminate when the called party's receiver is returned to its hook, or until cutoff occurs automatically by expiration of the prepaid time interval. Also, timer motor operation must continue through extra time prepaid intervals which were evidenced by pre-payment for extra time. Such timer motor operations are produced as follows:

110 v. A.C. is supplied for the timer motor from the input terminal 457 (see FIGURE 4) (also FIGURE 37, and elsewhere), to one of the contacts 458 of the clutch release relay 251 previously referred to, the other of such contacts 458 connecting by the line 459 to one motor terminal. The other motor terminal connects by the line 460 to the line 461 which extends to one of the pair of contacts 462 of the relay 348. Said relay is under control of the left-hand contact 393 of the polar relay 391. Thus, when the called party removes his receiver from its hook, such contacts 462 close (due to reversal of the polar relay, and harmonious activation of the relay 348 (Unit 5)), and such contacts 462 remain closed as long as the called party retains his receiver off its hook. The other contact of said pair 462 connects by the line 268ᵍ with the contact of the contacts *e* of the fifteen cent relay 267 (Unit 8). The tongue contact of such pair is grounded (see FIGURE 4). Accordingly, prepay of fifteen cents accompanied by raising of the called party's receiver from its hook, will commence operation of the timer motor, and such operation will continue until expiration of the pre-paid time interval (including extra prepaid intervals), or until the receiver is returned to its hook.

*Operation of clutch of time drive*

Reference was made earlier herein, to the provision of the clutch release relay 251 (shown in FIGURES 4 and 37). Upon termination of timer motor operation the rock shaft and arm, 153–154, of the timer unit will have been advanced to some rocked position proportional to the total elapsed time up to termination of the motor operation, and measured from the time of removal of the called party's receiver from its hook. It is necessary to release the clutch unit (comprising the wheels 181 and 191 (see FIGURES 27 to 31, etc.)) in order to permit return of the tubular shaft 153 and such arm 154 to base positions, without actually driving the motor in reverse through the high ratio gear reducer with which it is provided. Release of such clutch is produced by termination of current feed to the solenoid 192, thus permitting the spring 184 to effect the desired return of parts to their base positions. Supply of current to such clutch solenoid is under control of the clutch release relay, as follows:

The high time position contact 248 of the timer (and/or the high pulsed position contact 463 of the stepping switch component of the timer unit) connects by the line 250 to the coil 464 of the relay 251, the free end of such coil being grounded as shown in FIGURES 4 and 37. Accordingly, when the stepper switch component of the timer unit attains its high stepped position, such relay 251 is activated. Examination of FIGURES 4 and 40 will also show that such relay is provided with a time delay in the form of the capacitor 465 connected across the terminals of the coil, to reduce the rate of magnetic decay when energization of the coil is terminated. Such time delay is made sufficient to ensure clutch release until the hollow rock shaft and arm combination 153–154 has been returned to base position. The activation of the self-stepping operations of the timer unit stepping switch to attain its high position (after termination of the call, or at cutoff, or otherwise) is produced as follows:

A line 466 (see FIGURE 4) connects the stationary contact 240 of the off-normal switch of the stepping switch, to the stationary contact of the pair of contacts 467 of relay 348 (Unit 5). The tongue of such pair is grounded. Accordingly, when the polar relay is released (by return of the calling party's receiver to its hook), with consequent movement of the tongue 392 of the polar relay to its central position, and separation of such tongue from the left-hand contact 393, the magnet 395 of relay 348 (Unit 5) is de-energized. Then, after the slight delay produced by the capacitor 472 the tongue of such pair 467 will engage its stationary contact to ground the line 466. Thereupon the tongue 241 of the interrupter of the timer stepping switch (Unit 22, FIGURE 4) will be grounded (such stepping switch off-normal contacts being then in the off-normal position). At once self-pulsing will commence and will continue, to thus pulse such timer stepping switch around to its base or zero position. There the off-normal leaf 238 will be separated from the contact 240 to discontinue such self-pulsing operation. The timer stepping switch has thus been restored to its base or zero position. There the off-normal leaf 238 will be separated from the contact 240 to discontinue such self-pulsing operation. The timer stepping switch has thus been restored to its base or zero position, ready for the succeeding timing operation.

Such self-pulsing of the timer stepping switch to its base or zero position has also caused the wiper 223 (see FIGURES 37 and 4) to wipe and engage the high contact 463, to thus release the clutch by the operations already disclosed. The restoration of both the timer stepping switch and its rock arm to their base or zero positions have thus been produced by a signal derived from the polar relay, and incident to the restoration of the calling party's receiver to its hook.

*Operation of "intervened" call*

It remains next to disclose the operations, functions, and circuitry which are brought into play to enable an "intervened" call to be made, by the intervention of the operator of the exchange to which the calling party is connected. These operations, and the manner of performing them are as follows:

To call the operator for such a call the calling party dials his dialing unit once by dialing from the 0 position (FIGURE 7). That is the high dialing position, and when the finger dial plate 100 is rotated from the 0 position clear around to the finger stop 103, the microswitch 124 is reversed, as previously explained when disclosing the construction of the dialing and pulsing unit; such microswitch reversal being shown in FIGURES 14 to 18, inclusive, so that the contacts 124–406 of such microswitch (Unit 2, FIGURE 5) are thus separated during the returning movement of the dial plate to its base or home position. During this returning movement ten pulses are delivered. These will be transmitted to the First Selector (see FIGURE 5) from the relay 424 (Unit 4, FIGURE 3), which relay is itself pulsed by reason of the tongue 392 of the polar relay having been shifted to the right-hand contact 421, and pulsing against such contact as the dialing pulses occur. From such relay 424 the pulses are delivered from its contacts 473, over the line 341, to the first selector, according to the operations previously described. Thus such first selector will be advanced ten steps, to bring its wiper 309 (see FIGURES 5 and 45) into engagement with the stationary contact 351 of the 25 cent group of stationary contacts B. Such wiper is grounded, so its engagement with the stationary contact 351 grounds such contact. The line 352 leads from such contact 351 to one side of the motor 353 (see FIGURE 3) which motor drives the pulser disk 354. Such disk, when rotated, regularly breaks and makes contact by pulsing the microswitch 474, between the lines 475 and 476 which, in turn lead to the tongue and to the stationary contact, 477 and 478, respectively, of the relay 449. Such relay has been previously referred to. The oscillator 480 produces a wave and frequency to produce a hum, when properly interpreted, which identifies the calling station as a pre-pay station. Such hum is periodically interrupted by and during the rotation of the disk 354 under drive of the motor 353.

*Coin denomination signals*

It is now noted that when the exchange operator answers the call produced by the stepping of the first selector to its high or 0 position, she soon hears the identifying tone produced by the oscillator 480, thus pulsed. Thus she is notified that the call comes from a pre-pay station, and knows that her subsequent operations should conform to those proper for handling such a call through the presently disclosed equipment. Being thus notified she may proceed to obtain from the calling party the information respecting the location of the party to be called, and may advise the calling party as to the value in coins to be inserted into the coin receiving equipment to cover the base pre-pay charge for the call to be made. It is then necessary that the exchange operator be informed as to the denominations and numbers of coins which shall be inserted by the calling party, to meet such base pre-pay charge. The equipment and operations to inform the exchange operator respecting such requirements are as follows:

The coins which may be inserted into the receiving equipment include nickels, dimes and quarters. I have previously shown that insertion of a nickel produces, through the components of the accumulator section (Unit 6, FIGURE 4), a single actuation of the five cent switch 254, that insertion of a dime produces two actuations of such switch 254, as well as one actuation of the ten cent switch 255, and that insertion of a quarter produces five actuations of the switch 254 and one actuation of the twenty-five cent switch 256. I avail myself of the actuations of the switches 254 to signal insertion of nickels (and dimes—two pulses—) and actuations of the switch 256 to signal insertion of quarters, such signals being used to produce effects in the oscillator circuit to vary the tones (waves and frequencies emitted by such oscillator) whereby the tones transmitted to and heard by the exchange operator identify the insertions of nickels and/or quarters, to thus inform such operator as to the denominations and numbers of the inserted coins. The operations produced by insertions of nickels are as follows:

It has been shown that insertion of a nickel produces a pulse in the magnet coil 450 of the relay 449 (see FIGURE 3), (Unit 24). Accordingly, the tongue 477 of such relay 449 is momentarily engaged with the stationary contact 478 each time a nickel is inserted into the receiving equipment. The tongue 477 connects by the line 479 to one side of the oscillator 480. The other side of such oscillator connects by the lines 481, 482, 483 and 475 to the other or stationary contact 478. Thus, each time the relay 449 is energized, bringing its tongue 477 annd stationary contact 478 together, a shorting is produced over a portion of the oscillator circuitry. This correspondingly modifies the tone wave and frequency produced by the oscillator during such shorting operation, and thus informs the exchange operator each time a nickel is inserted.

The operations produced by insertions of quarters are as follows:

The relay 453 (Unit 24, FIGURE 3), previously referred to, includes its magnet coil 454. One end of such coil connects by the line 484 with one input terminal 379 (see FIGURE 4); the other end of such coil connects by the line 485 with the stationary contact 486 of the twenty-five cent switch 256; and the tongue 487 of such switch connects by the line 374 with the other input terminal 373 (see FIGURE 4). Accordingly, each time a quarter is received into the coin receiving equipment, a pulse is delivered to the magnet coil 454 of such relay 453. This momentarily engages the tongue 488 of such relay with the stationary contact 489. Such tongue connects by the line 490 with one portion of the oscillator circuitry; and such stationary contact connects by the line 491 including capacitor 492, with another portion of the oscillator circuitry. Thus, alternate activations and nonactivations of the relay 453 produce correspond modifications of the wave forms and frequencies emitted by the oscillator, to identify insertions of quarters into the equipment.

It is noted that such activations of the relay 449 as have been above defined in connection with the production of identifying tones, while being audible to the operator of the exchange to which the calling party is connected, do not deliver corresponding pulses to the stepping switch of the timer. This is true since when such identifying tone signals are produced by such coin insertions, during an operation in which the exchange operator intervenes (now being described), the tongue of the polar relay is not engaged with the left-hand contact 393 (see FIGURE 3), so that the relay 348 (Unit 5) is then unenergized. Thus the contacts 442 of such relay 348 (by which grounding of the pulses which advance the stepping switch is produced, is needed), remain separated, so that no such grounding is produced.

*Coin return or collect operations*

It next remains to show how, in case insufficient value of coins has been inserted and reecived in escrow in the Unit 21 (FIGURE 5), to cover the base charge for the station to be called, or in case of nonresponse to a valid call to such called station, or for other reason, the operator may signal the return unit (259, Unit 21), to cause return of the escrowed coins. On the other hand, it further remains to show how, when the call has been completed by response of the called party and is now finally terminated, the exchange operator may signal the coin collect unit 258 (Unit 21), to deliver the escrowed coins to the collect receptacle. These operations are as follows:

First, the operations to produce return of the escrowed coins:

By applying negative polarity 110 v. D.C. to the tip line 384–383 (see FIGURE 3), relay 345 is activated to close contacts 493, thus grounding line 344 which leads to the ground terminal of the self-pulsing contacts of selector 238a (see FIGURE 5). Thus such selector is self-pulsed over to its zero or home position, with concurrent removal of ground connection from the motor 353 which was driven to pulse the disk 354 (see FIGURE 3). Application of such negative polarity to the tip line will result in activating the polar relay to shift its tongue 392 to the right, and into engagement with the stationary contact 421. This will activate relay 428 to close its contacts 435, the tongue of which connects to the line 364 leading to the return unit 259 (Unit 21), (FIGURE 4). Accordingly, such tip application of negative polarity will result in return of the inserted coins. On the other hand, by applying positive polarity 110 v. D.C. to the tip line 384–383 (see FIGURE 3), relay 348 (Unit 5) is activated to close its contacts 436. The tongue of such contacts connects to the line 380 leading to the switch 376 which then supplies connection to the coin collect unit 258 (Unit 21), to produce collect of the coins. At this operation such electrification also includes the reset element 266 of the stepper control (Unit 7), thus ensuring resetting of such coin counting equipment as necessary to its zero or base position, preparatory to a succeeding coin operation.

*Operator call to calling party in case of deficiency of prepayment*

The following important feature of operation is to be noted in connection with the foregoing intervened operation in which the exchange operator is involved. It is frequently necessary to call back the calling station after completion of the call, to request insertion of further coins to cover an unpaid balance due for the call, above that amount originally inserted. Examination of the circuitry of FIGURES 3 and 6 will show that restoration of the calling party's receiver to its hook merely serves to open the pulsing circuit (by opening the hook contacts 407 (see FIGURE 3), and the talking circuit (by opening the hook contacts 440); and serves to close the hook contacts 408 (to enable ringing the station to receive an incoming call). These operations do not affect the ability to use the tip and ring contacts over the lines 384–383, and 388–389, respectively; the ringing lines then not requiring use of the hook contacts 407, 385 and 440, and the hook contacts 408 being engaged by return of the calling station's receiver to its hook. Accordingly, it is possible to again call the calling station to request payment of the deficiency, and, having thus recalled the calling party and requested insertion of coins to cover the deficiency, it is further possible for the exchange operator to listen to the signals produced by insertion of the deficiency coins, to see whether or not the full deficiency has been covered.

It is noted that such operations as just above outlined do not require operations of selector 1 to its high position, nor operations of any of the three selectors from their zero positions; do not require any operations of the timer; do not require operation of any of the dial pulsing equipment, nor of various other components of the circuitry. Furthermore, the exchange operator may hold the line under her control as long as may be necessary to enable her to make efforts to have the deficiency covered, or to ensure coin collection.

*Additional functions, including additional pay during course of conversation with called party*

It has been shown how the engagement of any one of the timer wipers 160, 161 or 162 (for the 25 or other cent zone) with any one of the stationary contacts which may be electrified, will transmit a signal through the corresponding Unit 8, 9, or 10, to the coin collect unit 258 and to the reset and stepper units 261 and 266 to collect the coins and return the switches 262, 263, 264 and 265 to open circuit positions, as shown in FIGURE 4. Relay 428 (Unit 4, FIGURE 3) includes another pair of contacts including the tongue 495 and the stationary contact 496 which are normally engaged but are open circuited when the magnet 427 of such relay is energized. Such energization terminates when the called party answers and removes his receiver from its hook, thus close-circuiting such contacts 495–496, and leaving them in close circuited condition as long as the called party retains his receiver on its off-hook position.

Relay 274 (Unit 27, FIGURE 3) includes a pair of contacts, including the tongue 497 and stationary contact 498, which are normally engaged, but are open-circuited as long as the magnet of such relay is energized. This is the ten-cent relay, connected by the line 399 with one terminal of the ten-cent switch 265 (Unit 7, FIGURE 4). Thus, such relay 274 is energized when a coin is received into the coin receiving unit, and will remain energized until either a coin return or a coin collect operation occurs; whereupon such ten-cent switch 265 is opened, as previously stated herein, this also deenergizing the relay 274, and closing the contacts 497 and 498 thereof together.

The relay 428 (Unit 4, FIGURE 3), also includes a pair of contacts including the tongue 499 and the stationary contact 500 which are normally open-circuited, as shown at the showing of Unit 7, FIGURE 4; it being noted that, for purposes of simplification these contacts, which comprise a portion of such relay 428 have been shown in a location close to the stepper element 261 of such Unit 7. It is thus to be understood that such contacts are normally in open-circuit position, as shown in FIGURE 4, but that whenever the magnet 427 of such relay 428 is energized such contacts are closed-circuited. Such energization thus occurs by the original actuation of the polar relay to shift its tongue 392 to the right (FIGURE 3). This is also the position of such polar relay until completion of the call by the answer of the called party, evidenced by the raising of his receiver from its hook. Thus, all stepping operations incident to the original coin counting and signalling are produced while such contacts 499 and 500 are engaged, the polar relay being held with its tongue rightwardly until response by the called party. The following comments are pertinent to this operation:

If the calling party receives a warning signal during the course of the conversation, and decides to extend the time before cutoff will occur, and in consequence deposits further money into the coin receiver, the pulse or pulses produced incident to such further payments are obtained without need of pulsing the stepper unit 261 (Unit 7, FIGURE 4); said further pulses being produced through the instrumentality of the relays 449 and 453 (Unit 24, FIGURE 3) and over the lines 447, switch contacts 442 (of relay 348, Unit 5), and lines 446 to the stepper element 443 of the timer unit (Unit 22, FIGURE 4). Thus the reversal of the polar relay to its left-hand contact 393, incident upon the raising of the called party's receiver from its hook, does not prevent proper functioning of parts needed to step the timer stepping switch to a higher money count position.

*Cutoff signal from timer prevents further conversation between calling and called stations, and terminates connections*

Next, I have provided connections between the receiver 501 (FIGURE 3), and the stationary contact 496 of the relay 428, by the line 502, from the tongue 495 of such relay 428 to the tongue 497 of the relay 274, and from the stationary contact 498 of such relay 274, to the top contact 503 and the line 413, by the lines 504 and 505, respectively. Accordingly, the following functions and operations and conditions will obtain:

The engagement of the timer cutoff wiper with an electrified contact of such timer will pass a signal over the lines 283 (or 282 or 281) to the then engaged contacts *c* of the relay 269, 268 or 267, as the case may be, of the relay Unit 10, or 9, or 8, as the case may be, to the line 380, and thus to the reset element 266 of the Unit 7, FIGURE 4; and this will, in turn open the contacts of the ten cent switch 265 (Unit 7, FIGURE 4). This will, in turn release relay 274, Unit 27, FIGURE 3, thus allowing the contacts 497 and 498 to engage. Since the raising of the called party's receiver from its hook produced reversal of the polar relay, to remove its tongue 392 from its right-hand stationary contact 421, relay 428, Unit 4, FIGURE 3, is still in its unenergized condition, and its contacts 495 and 496 are engaged. Thus, a short is placed across the receiver of the calling party's set, so that a conversation cannot be carried on until such short is removed by a further operation. Such short could be removed from the calling party's receiver only by some operation which would energize the relay 274 (ten-cent relay, Unit 27, FIGURE 3) to separate the contacts 497 and 498 of that relay. Such relay energization could only be effected by a continuing signal received over the line 399 from the switch 265 of the Unit 7, FIGURE 4; but such switch cannot be operated by the stepper element 261, due to the fact that the contacts 499 and 500 of the relay 428 are open (Unit 4, FIGURES 3 and 4). Such contacts 499 and 500 will remain open until the called party hangs up his receiver, and will remain open even then until a completely new call is instituted by the calling party, to thus throw the tongue of the polar relay over to its right-hand contact 421, preparatory to going through the complete operation of making prepayment, etc.

Thus the actuation of elements by the cutoff signal from the timer brings the circuitry to a condition such conversation in either direction can proceed no longer, and further conversation can only be had by starting a new series of operations of the equipment, including insertion of coins of the value of at least the base charge for a call to the zone of the called station.

I claim:

1. A pre-pay calling station to call a selected exchange in a zone of exchanges all of which exchanges have the same established base pre-pay charge amount, each exchange of such zone having an assigned code number, such calling station including means to emit signals identifying the code number of a selected exchange in such zone, means to emit a signal corresponding to the base pre-pay to the zone of the called exchange, coin receiving, accumulating, and value determining means, means in connection with said coin means to emit a signal identifying the value of coins received and accumulated by said coin means, identification signal comparing means constituted to emit a comparison signal, connections from the coin value identifying signal emitting means to the identifying signal comparing means, connections from the means which emits a signal corresponding to the base pre-pay charge to the zone of the called station, to the signal comparing means, and means constituted to emit a comparison signal identifying equality or nonequality of the coin value corresponding to the signal from the coin means, with the base-pre-pay-charge-amount signal emitting means.

2. Means as defined in claim 1, together with means to return coins from said coin accumulating means, said coin return means including signal responsive means to cause the coin return means to return the coins, and connections between the comparison signal emitting means of the comparing means, and the signal response means of the coin return means, constituted to deliver a signal to such responsive means corresponding to the signal emitted by the comparison means.

3. Means as defined in claim 2, wherein the signal delivered to the coin return response means corresponds to nonequality of the identified coin value with the identified base-pre-pay-charge-amount.

4. A plural zone, time control, pre-pay telephone station constituted to establish talking connections to called stations which are included in a plurality of zones having different base pre-pay amounts from such pre-pay station, including; means corresponding to the base pre-pay amount for each zone, constituted to receive and count coins so received, including signal producing means constituted to produce identifying signals corresponding to the receipt of coins of value equal to the base pre-pay amount for each of the zones; relay means for each of the zones; connections from each identifying signal producing means to the corresponding zone relay, constituted to activate such relay when a signal is produced identifying the count of coins in amount equal to the base pre-pay for such zone; means to return the received and counted coins; switch means including sets of contactors movable to positions corresponding to dialed groups of pulses and constituted to establish local circuits through such switch means corresponding to and individual to the identifying digits and the sequential order of such digits, for a plurality of called exchanges in each of the pre-pay zones; input and output terminals for the local circuits of the zones; and means to activate the coin return means when the activated relay corresponds to a zone having a base pre-pay less than the base pre-pay of the zone of the local circuit established by the dialed groups of pulses which identify the exchange of the called station.

5. A plural zone, time control, pre-pay telephone station constituted to establish talking connections to called stations which are included in a plurality of zones having different base pre-pay amounts from such pre-pay station, including; means to receive and count coins; escrow means to hold the counted coins; means to dial the exchange of the called station to produce pulses identifying said exchange; means including means responsive to said pulses constituted to determine the zone which includes said exchange; means to establish a local circuit corresponding to said zone; means including said local circuit to compare the value of the coins so received and counted, with the base pre-pay rate of said zone; means to return the coins when the counted value thereof is less than said base pre-pay rate for said zone; and means to retain the coins in the escrow means when the value thereof is at least equal to the base pre-pay rate for said zone.

6. A plural zone, time control, pre-pay telephone station constituted to establish talking connections to called stations which are included in a plurality of zones having different base pre-pay amounts from such pre-pay station; including relay means for each of the zones; coin receiving, counting and signalling means; connections from such signalling means to the relay means, constituted to activate the relay for the zone having its base pre-pay equal to the coin count so signalled; means to call a station within such zone; an overtime payment coin receiving and signalling unit to receive coins for payment for successive overtime intervals and to emit a signal for each such overtime payment; means to emit a signal when the called party answers; time count means having sets of stationary contacts, each set corresponding to one of the pre-pay zones and having its contacts spaced apart by amounts corresponding to overtime payments for such zone; connections and means between the overtime payment signalling means, and the stationary contacts of the sets, constituted to successively electrify contacts of each set progressively in the time count direction; a wiper carrier mounted for movement in time count direction and having a wiper for each zone constituted to successively engage the stationary contacts for such zone during time count movement of the wiper; means to move the wiper carrier in time count direction from a starting position, at uniform speed; means responsive to the signal which is emitted when the called station answers, constituted to start the wiper carrier moving means; connections between the wipers and the relays for the zones corresponding to such wipers, and the talking circuits, constituted to terminate such talking circuits concurrently with engagement of the wiper for the zone, with the electrified stationary contact of the set corresponding to such zone.

7. A pre-pay dialing call telephone station including; a dial type pulse producing unit including pulsing contacts and also including second switch contacts which are moved to open circuit position when the dailing element is moved to its high dialing position and are moved to closed circuit position when the dialing element is returned to its low dialed position; a coin receiving and signalling unit; a signal emitting, operator calling, unit; a pulse operated stepping switch including a contact at the high stepped position of said stepping switch; and a coin signalling unit responsive relay having a pair of normally closed contacts; together with a bridging circuit across the pulsing contacts, with the relay switch contacts and the dialing unit second switch contacts included in series relation in said bridging circuit; means including the coin receiving and signalling unit, to cause the relay switch contacts to move to open circuit position when a coin is received and signalled; preparatory to dialing a local call; and means including the second defined contacts of the pulsing unit when in open circuit position to deliver the pulses to the stepping switch for movement of said switch to its high stepped position, element together with connections between said high stepped position element and the signal emitting, operator calling, unit, preparatory to making an operator intervened call.

8. A pre-pay telephone station including in combination; dial plate pulse producing means including pulsing contacts constituted to deliver groups of pulses; a coin receiving and signalling element constituted to receive a coin for a local call and emit a corresponding signal; a relay, connections between the signal emitting means, and the relay, constituted to activate the relay when the signal is received by said relay; shunt connections bridged across the pulsing contacts and including contacts of said relay, and also including contacts of second switch means which is in operative relation to the dial plate, said relay contacts and said second switch contacts being in series connection in said shunt; a stepping switch including step producing means and connections between the pulsing contacts, and said stepping switch, constituted to receive pulses from the pulse contacts and to step said stepping switch to an output signal producing contact; means to generate and emit an operator calling signal when the stepping switch is moved to said output signal producing position, and to transmit said signal to the exchange operator; means to move the contacts of said second switch to open circuit position when the dial plate is moved to its high dialing position for production of a number of pulses during return of said dial plate to its low position, sufficient to move the stepping switch to its aforesaid output signal producing contact position, including means constituted to return the contacts of said second switch to closed circuit position when the dial plate returns to its low position.

References Cited by the Examiner

UNITED STATES PATENTS

| | | | |
|---|---|---|---|
| 2,000,804 | 5/1935 | Wehren | 179—6.3 |
| 2,041,964 | 5/1936 | Sandalls | 179—6.3 |
| 2,224,702 | 12/1940 | Seidel | 179—6.3 |
| 2,251,301 | 8/1941 | Sobotta et al. | 179—6.31 |
| 2,623,950 | 12/1952 | Ungor | 179—6.3 |
| 2,676,209 | 4/1954 | Joel | 179—6.31 |
| 2,700,069 | 1/1955 | Pharis et al. | 179—6.3 |
| 2,761,900 | 9/1956 | Joel | 179—6.3 |
| 3,019,294 | 1/1962 | Esperseth et al. | 179—6.3 |

ROBERT H. ROSE, *Primary Examiner.*

L. MILLER ANDRUS, WALTER L. LYNDE, *Examiners.*